(12) United States Patent
Collins et al.

(10) Patent No.: US 8,950,132 B2
(45) Date of Patent: Feb. 10, 2015

(54) PREMANUFACTURED STRUCTURES FOR CONSTRUCTING BUILDINGS

(75) Inventors: Arlan E. Collins, Seattle, WA (US);
Mark L. Woerman, Seattle, WA (US)

(73) Assignee: Innovative Building Technologies, LLC, Seattle, WA (US)

( * ) Notice: Subject to any disclaimer, the term of this patent is extended or adjusted under 35 U.S.C. 154(b) by 0 days.

(21) Appl. No.: 12/796,603

(22) Filed: Jun. 8, 2010

(65) Prior Publication Data

US 2011/0296769 A1 Dec. 8, 2011

(51) Int. Cl.
*E04H 1/00* (2006.01)
*E04H 3/00* (2006.01)
(Continued)

(52) U.S. Cl.
CPC . *E04B 1/24* (2013.01); *E04B 1/003* (2013.01); *E04B 2/7411* (2013.01); *E04B 2/7448* (2013.01); *E04B 2/82* (2013.01); *E04B 2/90* (2013.01); *E04B 2001/2481* (2013.01); *E04B 2001/2484* (2013.01); *E04H 1/04* (2013.01)
USPC .......................................... 52/236.3; 52/234

(58) Field of Classification Search
USPC .............. 52/79.1, 79.12, 79.14, 236.3, 236.6, 52/236.7, 79.5, 236.8, 745.03, 745.02, 52/741.1, 175
See application file for complete search history.

(56) References Cited

U.S. PATENT DOCUMENTS 1,883,376 A 10/1932 Meier et al.
2,419,319 A 4/1947 Lankton
(Continued)

FOREIGN PATENT DOCUMENTS

AU 2005200682 B1 5/2005
CN 02137279 3/2008
(Continued)

OTHER PUBLICATIONS

Riusillo, M.A., "Lift Slab Construction: its History, Methodology, Economics and Applications." Jun. 1, 1988, ACI—Abstract.
(Continued)

*Primary Examiner* — Brian Glessner
*Assistant Examiner* — Paola Agudelo
(74) *Attorney, Agent, or Firm* — Dorsey & Whitney LLP

(57) ABSTRACT

The present premanufactured structures for constructing buildings comprises a construction system for an energy efficient multi-story building with a plurality of standard single or mixed units. The multi-story building is constructed using premanufactured structures comprising: a plurality of non-weight bearing walls, the plurality of non-weight bearing walls with finished exterior including all electrical, insulating, plumbing and communications components that are premanufactured at a site distant from a building site, and the plurality of non-weight bearings walls are attached to a plurality of floor and ceiling slabs and interfacing with each other to enclose the plurality of units of the building; a plurality of interior components that are premanufactured at the site distant from the building site to connect to inside portions of the non-weight bearing walls; and a plurality of exterior components that are premanufactured at the site distant from the building site to attach to exterior surfaces of the building. The plurality of non-weight bearing walls, the plurality of interior components, and the plurality of exterior components are installed and connected together to provide the energy efficient multi-story building with the plurality of units with different floor plans, and optionally, a retail level with underground parking.

24 Claims, 42 Drawing Sheets

(51) Int. Cl.
  *E04H 5/00* (2006.01)
  *E04H 6/00* (2006.01)
  *E04H 14/00* (2006.01)
  *E04B 1/24* (2006.01)
  *E04B 1/00* (2006.01)
  *E04B 2/82* (2006.01)
  *E04B 2/90* (2006.01)
  *E04H 1/04* (2006.01)
  *E04B 2/74* (2006.01)

(56) References Cited

U.S. PATENT DOCUMENTS

| | | |
|---|---|---|
| 2,562,050 A | 7/1951 | Lankton |
| 2,686,420 A | 8/1954 | Youtz |
| 2,871,544 A | 2/1959 | Youtz |
| 3,017,723 A | 1/1962 | Von Heidenstam |
| 3,052,449 A | 9/1962 | Long et al. |
| 3,053,015 A | 9/1962 | Graham |
| 3,221,454 A | 12/1965 | Togni |
| 3,245,183 A | 4/1966 | Tessin |
| 3,388,512 A * | 6/1968 | Newman .................. 52/64 |
| 3,490,191 A | 1/1970 | Ekblom |
| 3,579,935 A | 5/1971 | Regan et al. |
| 3,590,393 A | 7/1971 | Hollander |
| 3,594,965 A | 7/1971 | Saether |
| 3,604,174 A * | 9/1971 | Nelson, Jr. ................. 52/601 |
| 3,638,380 A * | 2/1972 | Perri .................. 52/79.12 |
| 3,707,165 A | 12/1972 | Stahl |
| 3,713,265 A * | 1/1973 | Wysocki et al. ......... 52/745.14 |
| 3,721,056 A * | 3/1973 | Toan .................. 52/236.6 |
| 3,722,169 A | 3/1973 | Boehmig |
| 3,727,753 A | 4/1973 | Starr |
| 3,742,666 A | 7/1973 | Antoniou |
| 3,755,974 A | 9/1973 | Berman |
| 3,762,115 A | 10/1973 | McCaul, III |
| 3,766,574 A | 10/1973 | Smid, Jr. |
| 3,821,818 A | 7/1974 | Alosi |
| 3,853,452 A | 12/1974 | Delmonte |
| 3,906,686 A | 9/1975 | Dillon |
| 3,921,362 A | 11/1975 | Ortega |
| 3,926,486 A | 12/1975 | Sasnett |
| 3,971,605 A | 7/1976 | Sasnett |
| 3,974,618 A * | 8/1976 | Cortina ............... 52/745.14 |
| 4,050,215 A | 9/1977 | Fisher |
| 4,078,345 A | 3/1978 | Piazzalunga |
| 4,107,886 A | 8/1978 | Ray |
| 4,142,255 A | 3/1979 | Togni |
| 4,171,545 A | 10/1979 | Kann |
| 4,178,343 A | 12/1979 | Rojo, Jr. |
| 4,221,441 A | 9/1980 | Bain |
| 4,226,061 A | 10/1980 | Day, Jr. |
| 4,280,307 A | 7/1981 | Griffin |
| 4,314,430 A | 2/1982 | Farrington |
| 4,325,205 A | 4/1982 | Salim |
| 4,327,529 A | 5/1982 | Bigelow, Jr. |
| 4,341,052 A | 7/1982 | Douglass, Jr. |
| 4,435,927 A | 3/1984 | Umezu et al. |
| 4,441,286 A * | 4/1984 | Skvaril .................. 52/79.1 |
| 4,447,996 A | 5/1984 | Maurer, Jr. |
| 4,477,934 A * | 10/1984 | Salminen .................. 4/663 |
| 4,507,901 A | 4/1985 | Carroll |
| 4,513,545 A | 4/1985 | Hopkins, Jr. |
| 4,528,793 A | 7/1985 | Johnson |
| 4,646,495 A * | 3/1987 | Chalik .................. 52/236.8 |
| 4,655,011 A | 4/1987 | Borges |
| 4,856,244 A | 8/1989 | Clapp |
| 4,919,164 A | 4/1990 | Barenburg |
| 5,076,310 A | 12/1991 | Barenburg |
| 5,205,091 A | 4/1993 | Brown |
| 5,307,600 A | 5/1994 | Simon, Jr. |
| 5,359,820 A | 11/1994 | McKay |
| 5,402,612 A | 4/1995 | diGirolamo et al. |
| 5,412,913 A * | 5/1995 | Daniels et al. ............. 52/79.13 |
| 5,459,966 A | 10/1995 | Suarez |
| 5,471,804 A | 12/1995 | Winter, IV |
| 5,493,838 A | 2/1996 | Ross |
| 5,509,242 A | 4/1996 | Rechsteiner et al. |
| 5,528,877 A | 6/1996 | Franklin |
| 5,628,158 A | 5/1997 | Porter |
| 5,660,017 A | 8/1997 | Houghton |
| 5,678,384 A | 10/1997 | Maze |
| 5,697,189 A | 12/1997 | Miller |
| 5,699,643 A | 12/1997 | Kinard |
| 5,724,773 A | 3/1998 | Hall |
| 5,755,982 A | 5/1998 | Strickland |
| 5,850,686 A | 12/1998 | Mertes |
| 5,867,964 A | 2/1999 | Perrin |
| 5,870,867 A | 2/1999 | Mitchell |
| 5,987,841 A | 11/1999 | Campo |
| 5,997,792 A | 12/1999 | Gordon |
| 6,000,194 A | 12/1999 | Nakamura |
| 6,073,401 A * | 6/2000 | Iri et al. .................. 52/79.1 |
| 6,076,319 A | 6/2000 | Hendershot |
| 6,086,350 A | 7/2000 | Del Monte |
| 6,154,774 A | 11/2000 | Furlong |
| 6,243,993 B1 | 6/2001 | Swensson |
| 6,244,008 B1 | 6/2001 | Miller |
| 6,260,329 B1 | 7/2001 | Mills |
| 6,301,838 B1 | 10/2001 | Hall |
| 6,308,465 B1 | 10/2001 | Galloway et al. |
| 6,308,491 B1 | 10/2001 | Porter |
| 6,393,774 B1 | 5/2002 | Fisher |
| 6,481,172 B1 | 11/2002 | Porter |
| 6,484,460 B2 | 11/2002 | VanHaitsma |
| 6,625,937 B1 | 9/2003 | Parker |
| 6,651,393 B2 | 11/2003 | Don |
| 6,837,013 B2 | 1/2005 | Foderberg et al. |
| 6,922,960 B2 | 8/2005 | Sataka |
| 7,143,555 B2 | 12/2006 | Miller |
| 7,389,620 B1 | 6/2008 | McManus |
| 7,395,999 B2 | 7/2008 | Walpole |
| 7,444,793 B2 | 11/2008 | Raftery et al. |
| 7,467,469 B2 | 12/2008 | Wall |
| 7,484,339 B2 | 2/2009 | Fiehler |
| 7,676,998 B2 | 3/2010 | Lessard |
| 7,694,462 B2 | 4/2010 | O'Callaghan |
| 7,721,491 B2 * | 5/2010 | Appel .................. 52/169.7 |
| 7,748,193 B2 | 7/2010 | Knigge et al. |
| 7,908,810 B2 | 3/2011 | Payne, Jr. et al. |
| 7,921,965 B1 | 4/2011 | Surace |
| 8,109,058 B2 | 2/2012 | Miller |
| 8,234,833 B2 | 8/2012 | Miller |
| 8,251,175 B1 | 8/2012 | Englert et al. |
| 8,322,086 B2 | 12/2012 | Weber |
| 8,359,808 B2 | 1/2013 | Stephens, Jr. |
| 8,424,251 B2 | 4/2013 | Tinianov |
| 8,539,732 B2 | 9/2013 | Leahy |
| 8,555,581 B2 | 10/2013 | Amend |
| 8,621,806 B2 | 1/2014 | Studebaker et al. |
| 8,769,891 B2 | 7/2014 | Kelly |
| 2002/0059763 A1 | 5/2002 | Wong |
| 2002/0170243 A1 * | 11/2002 | Don et al. .................. 52/79.7 |
| 2003/0005653 A1 * | 1/2003 | Sataka .................. 52/236.3 |
| 2003/0101680 A1 * | 6/2003 | Lee .................. 52/745.2 |
| 2003/0140571 A1 | 7/2003 | Muha et al. |
| 2003/0167712 A1 | 9/2003 | Robertson |
| 2004/0103596 A1 | 6/2004 | Don |
| 2005/0081484 A1 | 4/2005 | Yland |
| 2005/0108957 A1 * | 5/2005 | Quesada .................. 52/143 |
| 2005/0188632 A1 | 9/2005 | Rosen |
| 2005/0198919 A1 | 9/2005 | Hester, Jr. |
| 2005/0210764 A1 | 9/2005 | Foucher et al. |
| 2005/0235581 A1 | 10/2005 | Cohen |
| 2005/0247013 A1 | 11/2005 | Walpole |
| 2006/0021289 A1 * | 2/2006 | Elmer .................. 52/200 |
| 2006/0096202 A1 | 5/2006 | Delzotto |
| 2006/0117689 A1 | 6/2006 | Onken et al. |
| 2006/0179764 A1 | 8/2006 | Ito |
| 2006/0248825 A1 | 11/2006 | Garringer |
| 2007/0074464 A1 | 4/2007 | Eldridge |
| 2007/0107349 A1 | 5/2007 | Erker |
| 2007/0157539 A1 | 7/2007 | Knigge et al. |
| 2007/0163197 A1 | 7/2007 | Payne et al. |

(56) References Cited

U.S. PATENT DOCUMENTS

| | | |
|---|---|---|
| 2007/0209306 A1 | 9/2007 | Andrews et al. |
| 2007/0294954 A1 | 12/2007 | Barrett |
| 2008/0057290 A1 | 3/2008 | Guevara et al. |
| 2008/0104901 A1 | 5/2008 | Olvera |
| 2008/0168741 A1 | 7/2008 | Gilgan |
| 2008/0178542 A1 | 7/2008 | Williams |
| 2008/0282626 A1 | 11/2008 | Powers, Jr. |
| 2008/0289265 A1 | 11/2008 | Lessard |
| 2008/0295450 A1 | 12/2008 | Yogev |
| 2009/0100769 A1 | 4/2009 | Barrett |
| 2009/0113820 A1 | 5/2009 | Deans |
| 2009/0134287 A1 | 5/2009 | Klosowski |
| 2009/0165399 A1* | 7/2009 | Campos Gines .............. 52/79.1 |
| 2009/0205277 A1 | 8/2009 | Gibson |
| 2009/0293395 A1 | 12/2009 | Porter |
| 2010/0064601 A1 | 3/2010 | Napier |
| 2010/0186313 A1 | 7/2010 | Stanford et al. |
| 2010/0229472 A1 | 9/2010 | Malpas |
| 2010/0263308 A1 | 10/2010 | Olvera |
| 2010/0325971 A1 | 12/2010 | Leahy |
| 2010/0325989 A1 | 12/2010 | Leahy |
| 2011/0023381 A1 | 2/2011 | Weber |
| 2011/0056147 A1 | 3/2011 | Beaudet |
| 2011/0296778 A1 | 12/2011 | Collins et al. |
| 2011/0296789 A1 | 12/2011 | Collins et al. |
| 2011/0300386 A1 | 12/2011 | Pardue, Jr. |
| 2012/0151869 A1 | 6/2012 | Miller |
| 2013/0067832 A1 | 3/2013 | Collins et al. |
| 2013/0133277 A1 | 5/2013 | Lewis |
| 2014/0013695 A1 | 1/2014 | Wolynski et al. |
| 2014/0047780 A1 | 2/2014 | Quinn et al. |
| 2014/0059960 A1 | 3/2014 | Cole |
| 2014/0069035 A1 | 3/2014 | Collins et al. |
| 2014/0083046 A1 | 3/2014 | Yang |
| 2014/0130441 A1 | 5/2014 | Sugihara et al. |

FOREIGN PATENT DOCUMENTS

| | | |
|---|---|---|
| EP | 1739246 A1 | 1/2011 |
| EP | 2281964 A1 | 2/2011 |
| GB | 1045078 A2 | 10/2000 |
| JP | H0130985 A | 1/1991 |
| JP | 10234493 | 9/1998 |
| JP | 2000144997 A | 5/2000 |
| JP | 2008073434 | 4/2008 |
| JP | 2008110104 | 5/2008 |
| KR | 20060066931 B1 | 6/2006 |
| WO | WO 97/22770 | 6/1997 |
| WO | WO 2007/059003 | 5/2007 |
| WO | WO 2010/030060 | 3/2010 |

OTHER PUBLICATIONS

International Search Report and Written Opinion of the International Searching Authority for PCT Application No. PCT/US2011/001039 mailed on Oct. 5, 2011.

"Beam to column connection", TATA Steel, http://www.tatasteelconstruction.com/en/reference/teaching_resources/architectural_studio_reference/elements/connections/beam_to_column_connections, Jul. 9, 2014, pp. 1-4.

"Emerging Trends 2012 Executive Summary", Urban Land Institute, Ch. 1, 2011, pp. 3-13.

"How to Soundproof a Ceiling—Soundproofing Ceilings", http://www.soundproofingcompany.com/soundproofing-solutions/soundproof-a-ceiling/, Apr. 2, 2014, pp. 1-7.

Borzouie, Jamaledin, et al., "Seismic Assessment and Rehabilitation of Diaphragms—Technical report", http://www.nosazimadares.ir/behsazi/15WCEE2012/URM/1/Roof.pdf, Dec. 31, 2011, pp. 1-86.

"Structural Insulated Panel", Wikipedia, http://www.en.wikipedia.org//wiki/Structural_insulated_panel, Aug. 15, 2014.

"Structural Insulated Panels", SIP Solutions, http://www.sipsolutions.com/content/structural-insulated-panels, Aug. 15, 2014.

"US Apartment & Condominium Construction Forecast 2003-2017", Jun. 2012, Statista, Inc.

Azari, et al., "Modular Prefabricated Residential Construction—Constraints and Opportunities", PNCCRE Technical Report #TR002, Aug. 2013, pp. i-90.

Giles, et al., "Innovations in the Development of Industrially Designed and Manufactured Modular Concepts for Low-Energy, Multi-Story, High Density, Prefabricated Affordable Housing", Innovations in the Development of Industrially Designed and Manufactured Modular Concepts, 1-15.

Gonchar, "Paradigm Shift—Multistory Modular", Architectural Record, Oct. 2012, pp. 144-148.

Kerin, et al., "National Apartment Market Report—2013", Marcus & Millichap, 2013, 1-9.

McIlwain, "Housing in America—The Next Decade", Urban Land Institute, 2010, pp. 1-28.

McIlwain, "The Rental Boost From Green Design", Urban Land, Jan. 4, 2012, pp. 1-3.

Shashaty, Andre, "Housing Demand", Sustainable Communities, Apr. 2011, pp. 14-18.

Sichelman, "Severe Apartment Shortage Looms", Urban Land, http://urbanland.uli.org/capital-markets/nahb-orlando-severe-apartment-shortage-looms/, Jan. 13, 2011, pp. 1-2.

Stiemer, S F., "Bolted Beam-Column Connections", http://faculty.philau.edu/pastorec/Tensile/bolted_beam_column_connections.pdf, Nov. 11, 2007, pp. 1-16.

* cited by examiner

COMPONENTS USED TO CREATE A STUDIO UNIT 300B

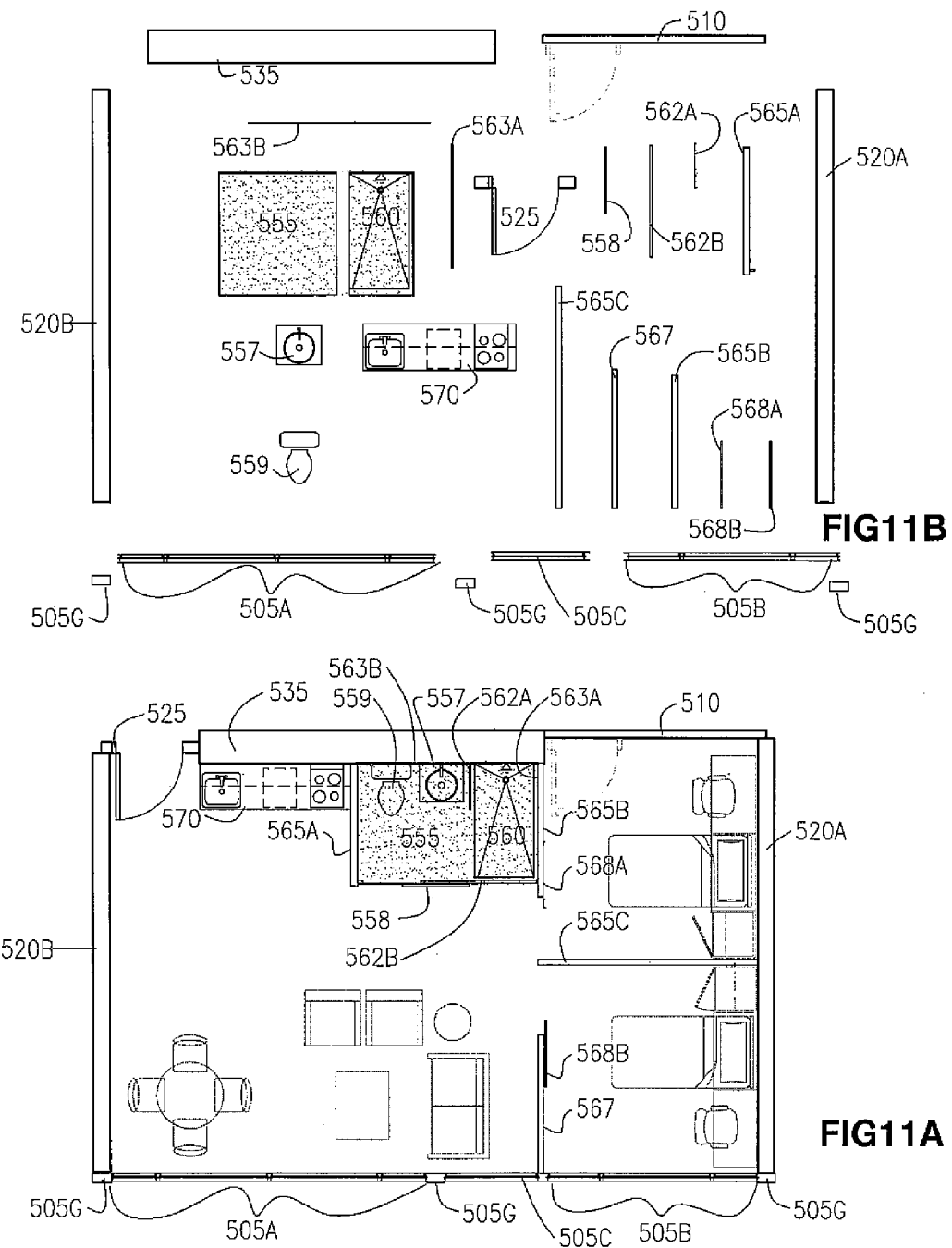
COMPONENTS USED TO CREATE 2-BEDROOM UNIT 300E

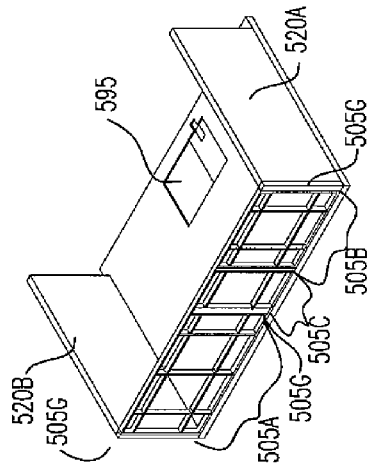
FIG. 13A
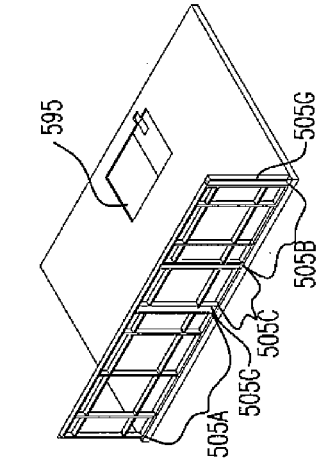
FIG. 13B
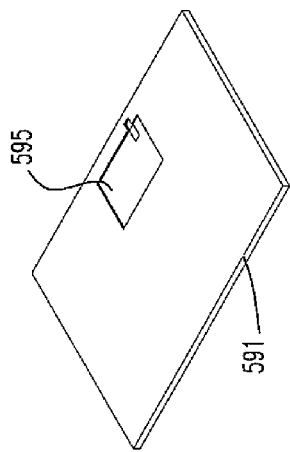
FIG. 13C
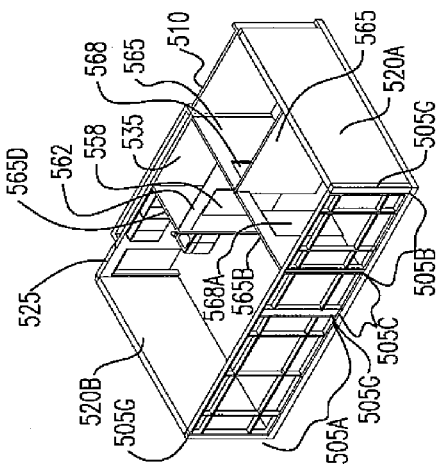
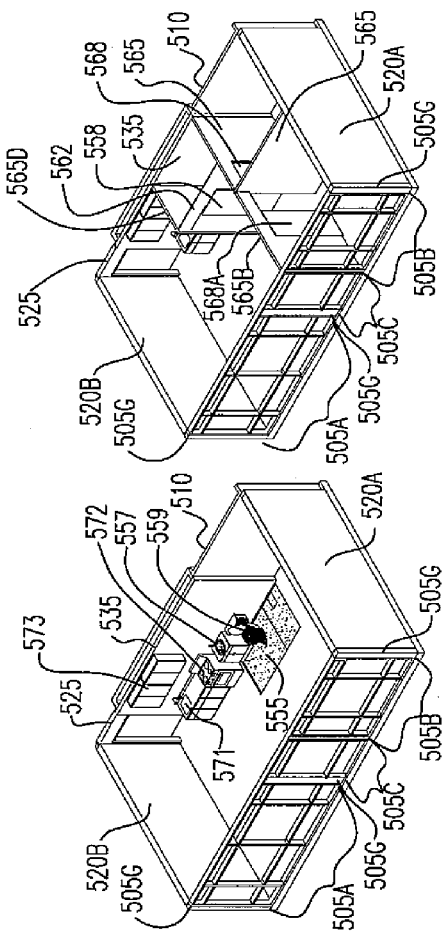
FIG. 13D
FIG. 13E
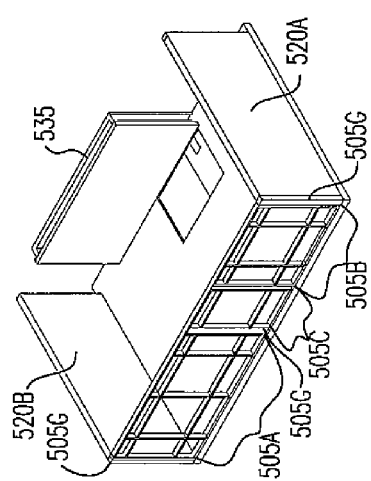
FIG. 13F

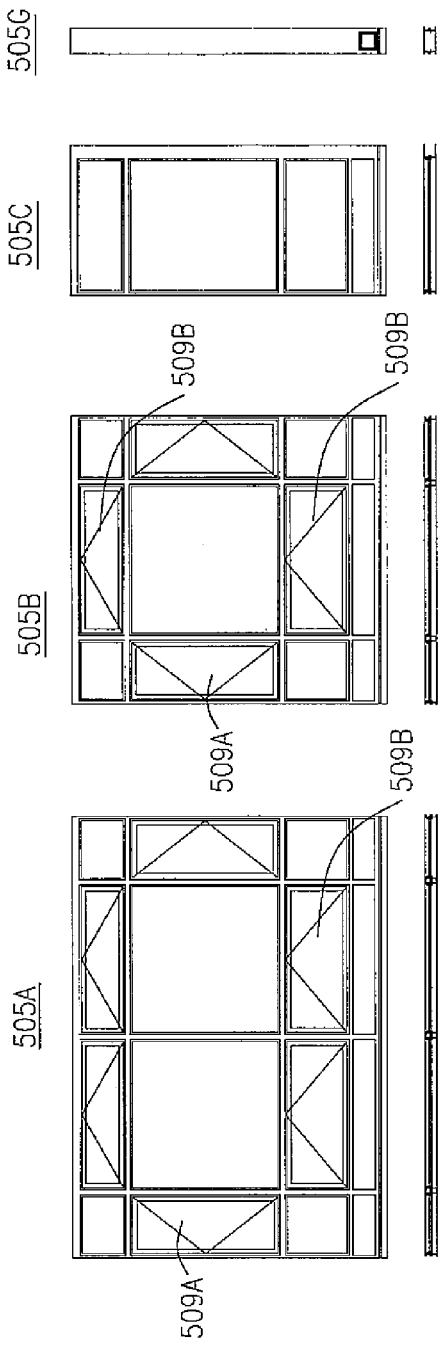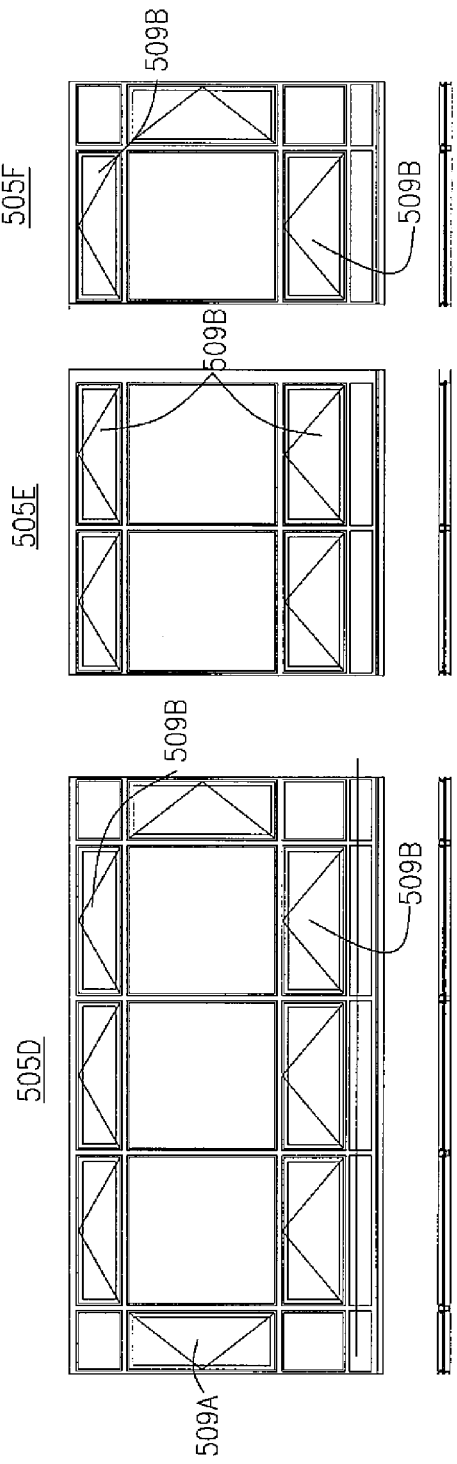

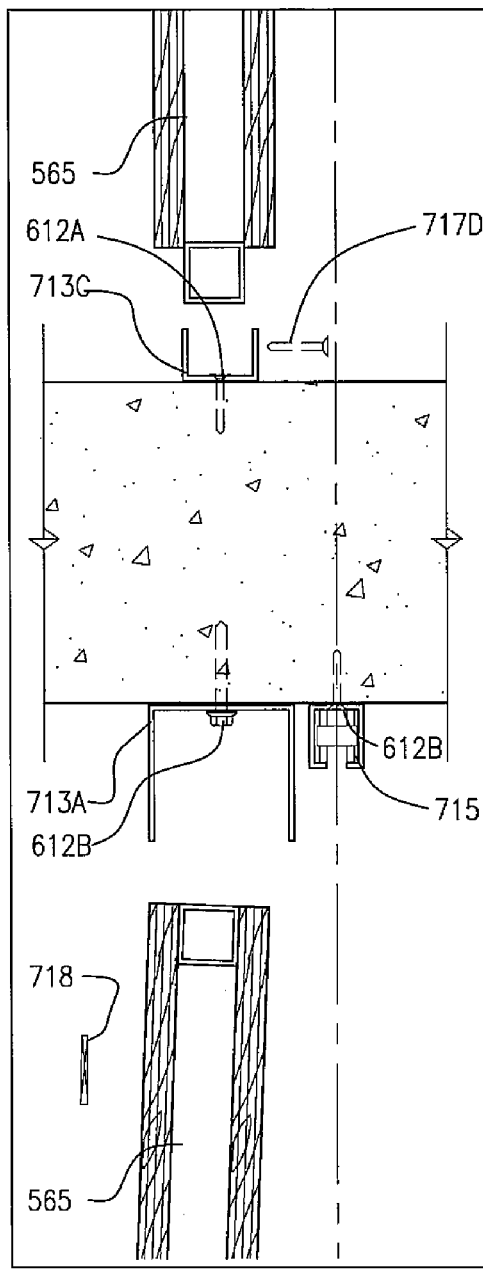
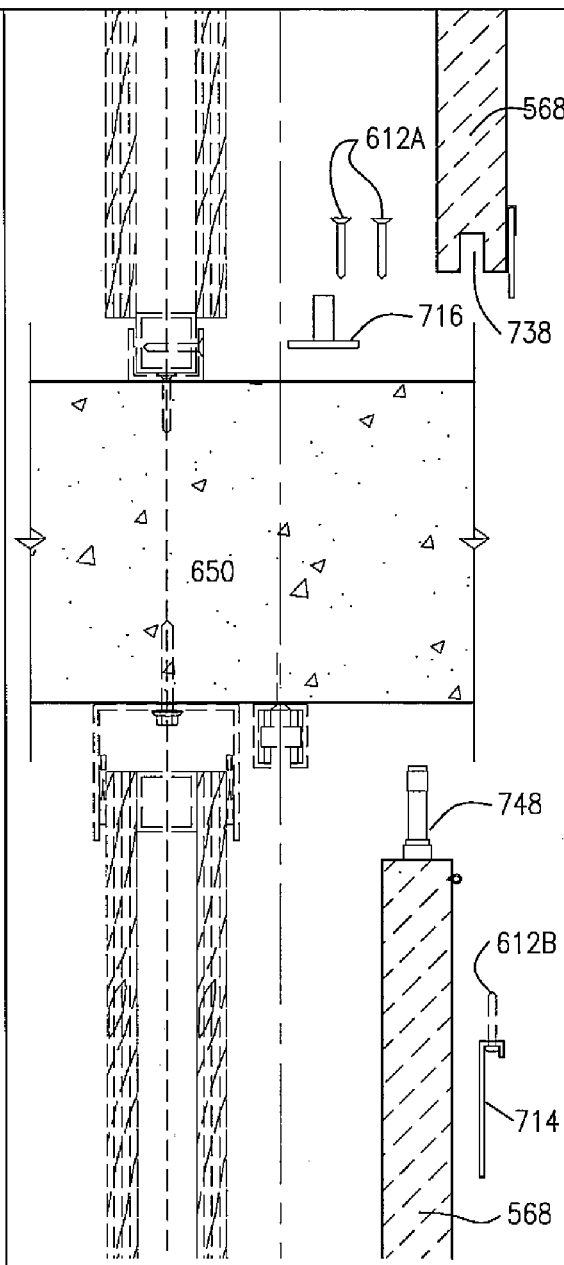
FIG. 18A  FIG. 18B

FLOOR PLAN

ELEVATION VIEW

PREMANUFACTURED STRUCTURES FOR CONSTRUCTING BUILDINGS

BACKGROUND OF THE INVENTION

1. Field of the Invention

The present invention relates generally to the construction industry, and relates more specifically to a construction system and method for constructing multi-story buildings including high-rise buildings using premanufactured structures.

2. Description of Related Art

Conventional building construction methods have focused on the cost and efficiency advantages of having construction mostly manufactured at the manufacturing plants or factories. Current construction techniques that use manufactured housing structures include building modules of a certain room to be delivered to a construction site. Manufactured housing techniques offer some advantages over on-site construction methods. For example, construction for manufactured housing may be carried out year round regardless of the weather since manufacturing within a factory or plant can occur indoors. Manufactured housing methods also require less time to complete construction since assembly lines are more efficient than requiring less streamlined field work on-site.

However, it is not always cheaper to manufacture the modules at a manufacturing plant or factory to be delivered to the construction site for further integration and finishing on-site. Handling of modules can be extremely difficult, time-intensive and cost-prohibitive since there are weight and craning issues. Shipping modular structures or spaces can raise transportation issues due to weight and space problems. Due to sizes of the modules, trucks may only fit one to two modules at the most to deliver to the construction site. Lifting the modules to and from the trucks require huge cranes at the manufacturing plants as well as at the construction sites.

On-site construction is conventionally preferred for building high-rise and multi-story buildings because manufactured housing techniques are not adapted for building such building structures. Therefore, the present invention utilizes manustructures or premanufactured structures to overcome the limitations of utilizing manufactured housing structures or modules in constructing high-rise and multi-story buildings.

The advantages of the present invention is a construction system and method using as many repetitive and self-sustaining construction methods and as many preassembled and prefinished components as possible. Preassembled and prefinished components are constructed in a manufacturing facility, transported to the construction site and permanently installed within the structure in conjunction with other components to create a fully finished, comfortable and weather-tight living environment.

Standardizing the components and constructing them in a manufacturing facility certainly provide the advantages of reduced materials waste, reduced energy costs and increased labor productivity. The initial assembly of the components may eventually become automated, but currently has the advantage of being carried out by less skilled labor under the supervision of highly qualified managers. Given that assembly will occur in an environmentally controlled setting, the quality of the product can be closely monitored. The potential for mold or materials damage due to exposure may be reduced by the present invention.

The present invention construction system and method results in rapid construction of multi-story buildings with institutional grade construction quality by saving time and money that takes half the time of conventional construction approaches for truly sustainable multi-story buildings.

Therefore, the present invention overcomes the disadvantages and limitations associated with multi-story modular construction and conventional construction methods to yield an energy efficient structure that can be constructed at a highly accelerated schedule at a low cost and continue to operate with very low maintenance expenses. The present invention is directed to a construction system and method for building structures of three or more stories comprised of premanufactured, preassembled, and prefinished components requiring little or no additional finishing after leaving the factory. The present invention may be used to build residential, hospital, institutional, or any multistory buildings alike for creating an energy efficient, inexpensive, and flexible building for quick assembly for multiple purposes.

BRIEF SUMMARY OF THE INVENTION

The present premanufactured structures for constructing buildings comprises a construction system for an energy efficient multi-story building with a plurality of units, the building being constructed using premanufactured structures comprising: a plurality of non-weight bearing walls, the plurality of non-weight bearing walls with finished exterior including all electrical, insulating, plumbing and communications components that are premanufactured at a site distant from a building site, the plurality of non-weight bearings walls attached to a plurality of floor and ceiling slabs and interfacing with each other to enclose the plurality of units of the building; a plurality of interior components that are premanufactured at the site distant from the building site to connect to inside portions of the non-weight bearing walls; and a plurality of exterior components that are premanufactured at the site distant from the building site to attach to exterior surfaces of the building; wherein the plurality of non-weight bearing walls, the plurality of interior components, and the plurality of exterior components are installed and connected together to provide the energy efficient multi-story building with the plurality of units with different floor plans, and optionally, a retail level with underground parking.

The premanufactured structures are used to construct multi-story buildings with a plurality of units comprising a plurality of standard single units or a plurality of mixed units, the mixed units comprising studios and one to multiple bedrooms. The multi-story buildings can also have a combination of residential and retail levels.

The plurality of non-weight bearing walls comprises: premanufactured, prefinished and preassembled exterior window walls comprising windows, insulation and weather seal; premanufactured, prefinished and preassembled end walls comprising electrical wiring, vapor barrier, insulation, studs for framing and sound barrier, and fire-rated interior and exterior surfaces; premanufactured, prefinished and preassembled exterior walls comprising electrical wiring, vapor barrier, insulation, studs for framing and sound barrier, and fire-rated interior and exterior surfaces; premanufactured, prefinished, preassembled and prewired demising walls comprising electrical wiring, insulation, studs for framing and sound barrier, and fire-rated interior and exterior surfaces; premanufactured, prefinished, preassembled, prebundled and preplumbed interior plumbing walls comprising electrical and communications connections for adjacent walls, electrical service panel, kitchen and bath wall plumbing, fans, and toilet mounting support with a water resistant, interior surface; and premanufactured, prefinished and preassembled exterior plumbing walls comprising electrical wiring, vapor barrier, insulation, plumbing chase, studs for framing, and sound and air barrier with a water resistant and fire-rated exterior surface; wherein the non-weight bearing walls are attached to a plurality of floor and ceiling slabs at top and bottom portions of the non-weight bearing walls and interfacing with each other to enclose the plurality of units in providing the energy efficient multi-story building.

The plurality of interior components comprises: precast, preformed and prefabricated bathroom floor pans wherein preformed recess of the plurality of floor and ceiling slabs for each unit receives the bathroom floor pans; preassembled, prewired and prefinished entry doors wherein the entry doors are installed between at least two non-weight bearing walls and attached to the plurality of floor and ceiling slabs at top and bottom portions of the entry doors; premanufactured, configurable, removable and adjustable interior partitions installed on interior sides of the non-weight bearing walls of the plurality of units for separating showers, kitchens, bathrooms, bedrooms and other living areas of the each unit; and premanufactured, prefinished and preassembled kitchen and bathroom components installed on interior plumbing walls of the plurality of units; wherein the bathroom floor pans are installed into the preformed recess before installation of the interior plumbing walls and exterior plumbing walls; and wherein the entry doors, the interior partitions, the kitchen and bathroom components are installed after installation of the interior and exterior plumbing walls but before installation of the plurality of exterior components.

The kitchen and bathroom components comprise: premanufactured, prefinished and preassembled kitchen unit with cabinets, countertops, preinstalled plumbing, plumbing connections, electrical wiring, vent ducting, and exhaust fans and light fixtures; premanufactured, prefinished and preassembled bathroom vanity with at least one sink and preinstalled plumbing; and premanufactured and preassembled cabinets with integral exhaust fans and light fixtures; wherein the premanufactured, prefinished and preassembled kitchen units, the bathroom vanities and the cabinets are installed on inner sides of the interior plumbing walls after installation of the interior and exterior plumbing walls, the entry doors, and the interior partitions but before installation of the plurality of exterior components.

The plurality of exterior components comprises roof components and prefabricated, prebundled exterior walkways with preassembled sections to support railing and decking for rapid installation. The roof components are comprised of premanufactured, prefinished and preassembled parapet walls comprising studs for framing, fire-rated exterior surface with corrugated siding, and integral flashing to prevent water penetration, the roof components are installed on roof slabs on top of the building after installation of the plurality of interior components but before assembly of the exterior walkways.

The present invention further utilizes recycled products and materials and incorporates alternative energy sources and methods of environmental control. Water collection and retention, and use of solar panels for heat and power are also incorporated in the manner best-suited for the local conditions and energy efficiency.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWING(S)

The accompanying drawings, which are incorporated in and constitute a part of this specification, illustrate various exemplary embodiments.

Figure 10A:
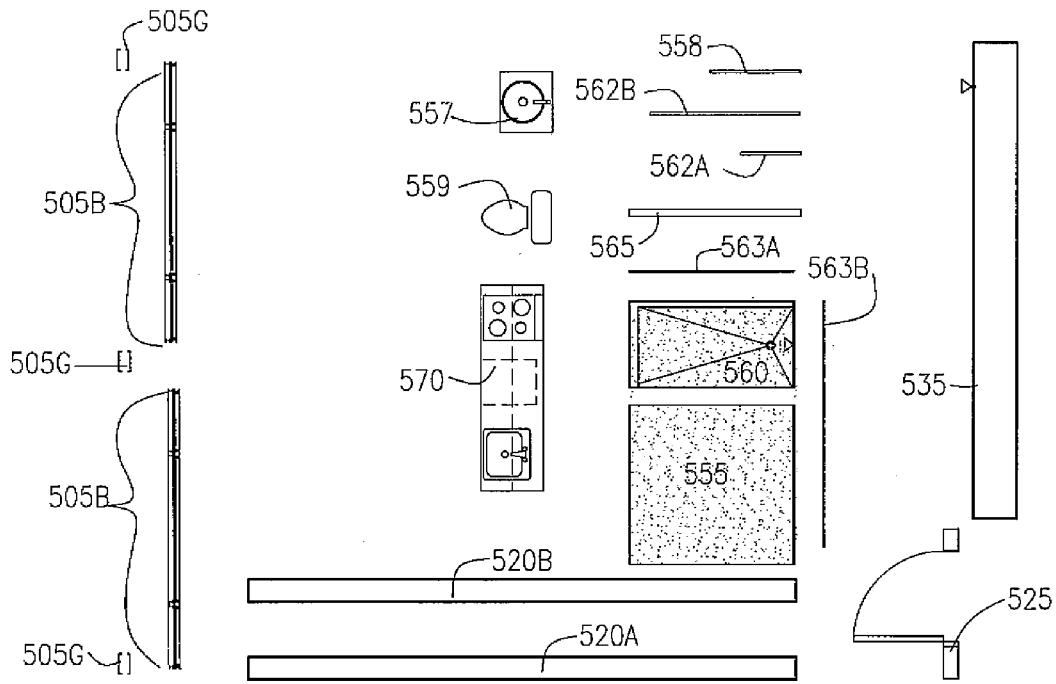
Figure 10B:
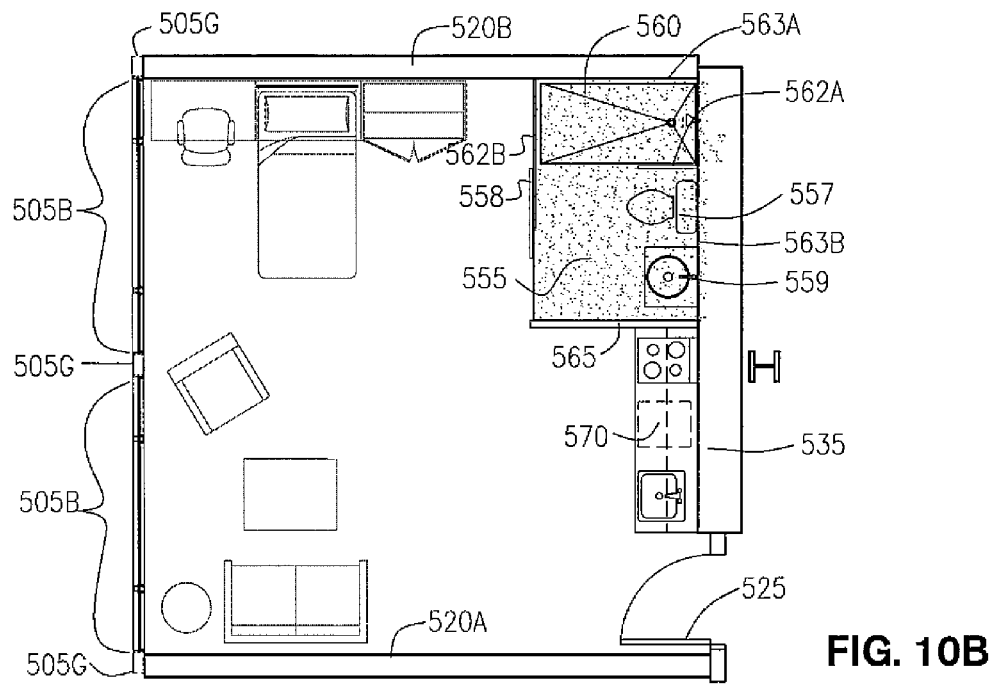

FIGS. 10A-B illustrate a components plan of an exemplary studio unit for various walls and components before and after assembly.

FIGS. 11A-B illustrate a components plan of two different exemplary two-bedroom units for various walls and components before and after assembly.

FIGS. 12A-F illustrate a perspective view of different phases of assembling an exemplary studio unit.

FIGS. 13A-F illustrate a perspective view of different phases of assembling a two-bedroom unit.

FIGS. 14A-G illustrate side and top views of the exterior window wall assemblies for various units.

Figure 15:
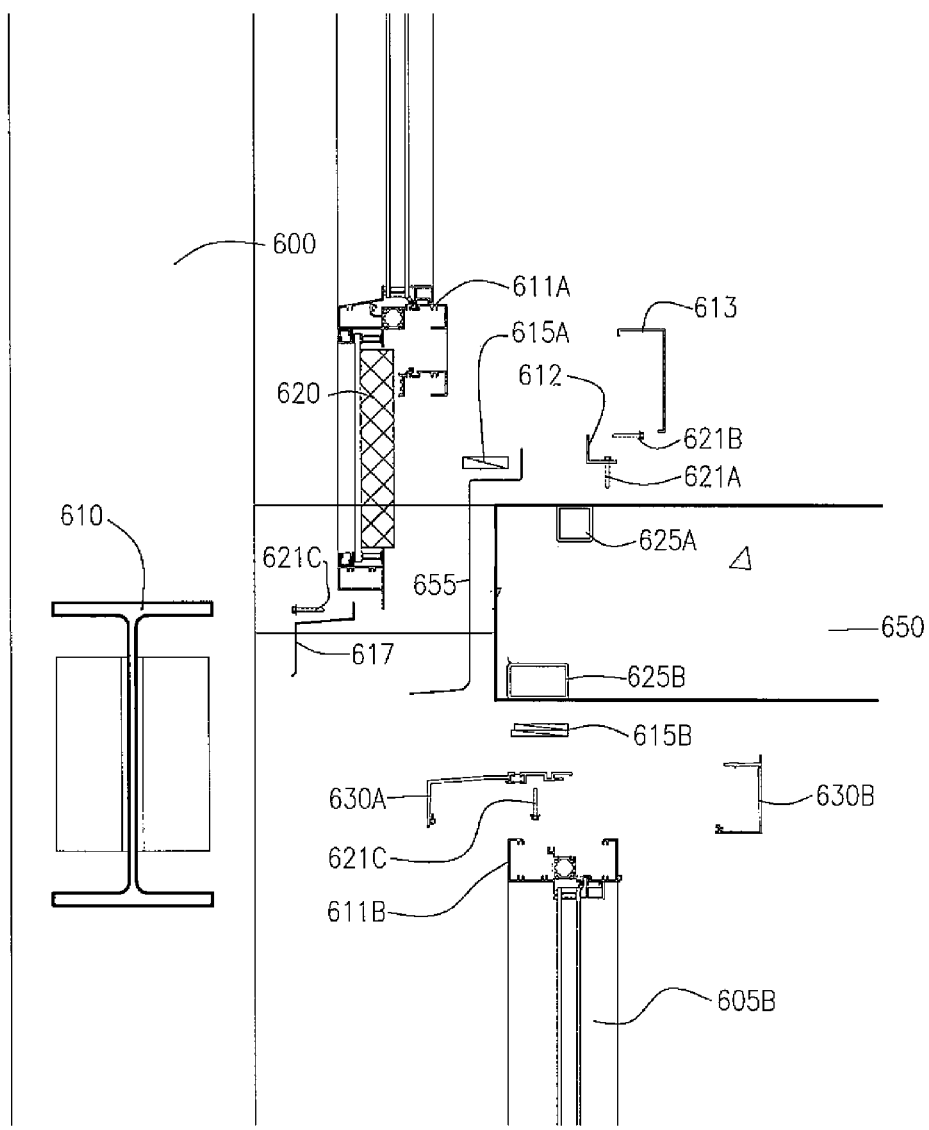
Figure 16:
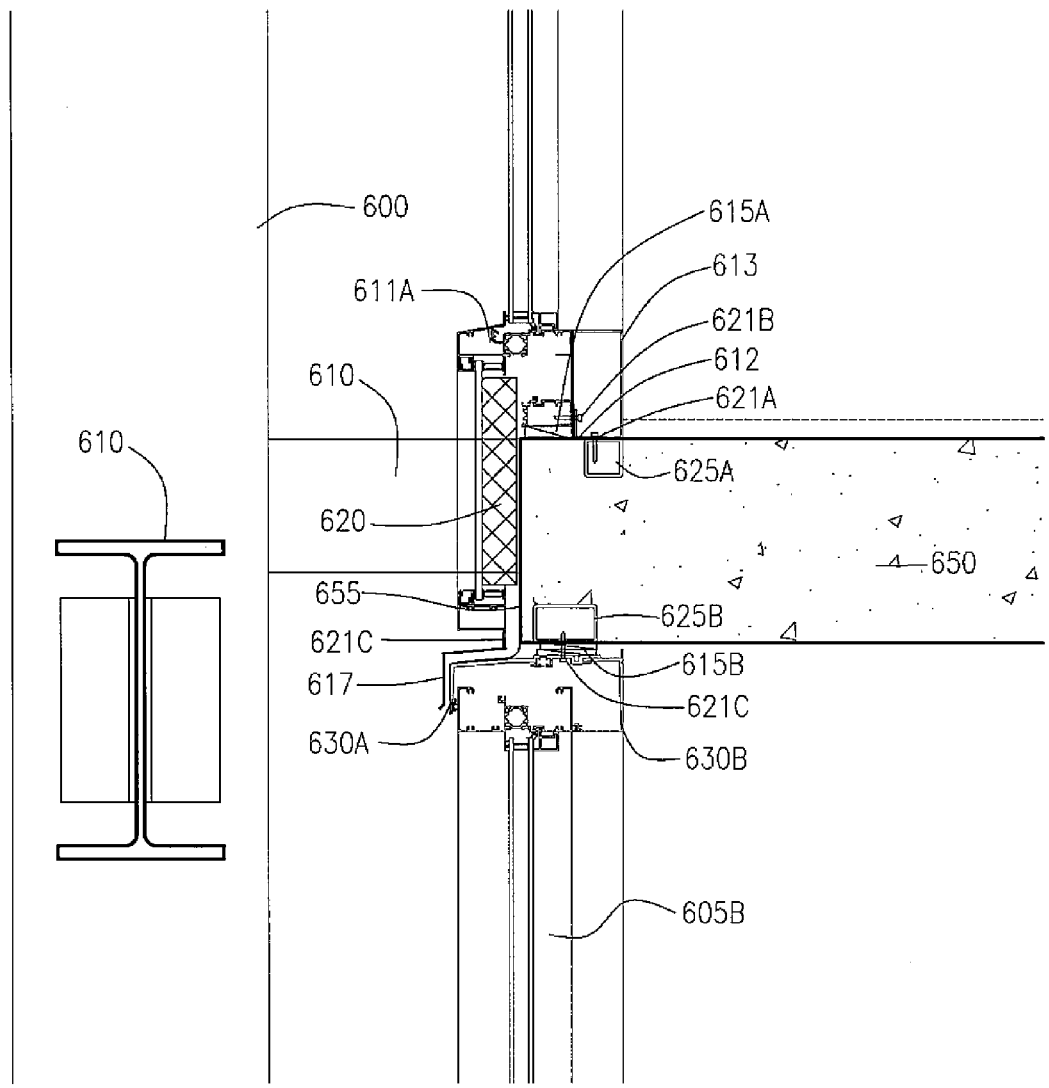

FIGS. 15-16 illustrate sectional details of structural members for attaching exterior window walls to the structural frame and slab.

FIG. 17-18 illustrate cross-sectional details of interior partitions and bedroom doors before and after attaching to the floor and ceiling slab.

Figure 19:
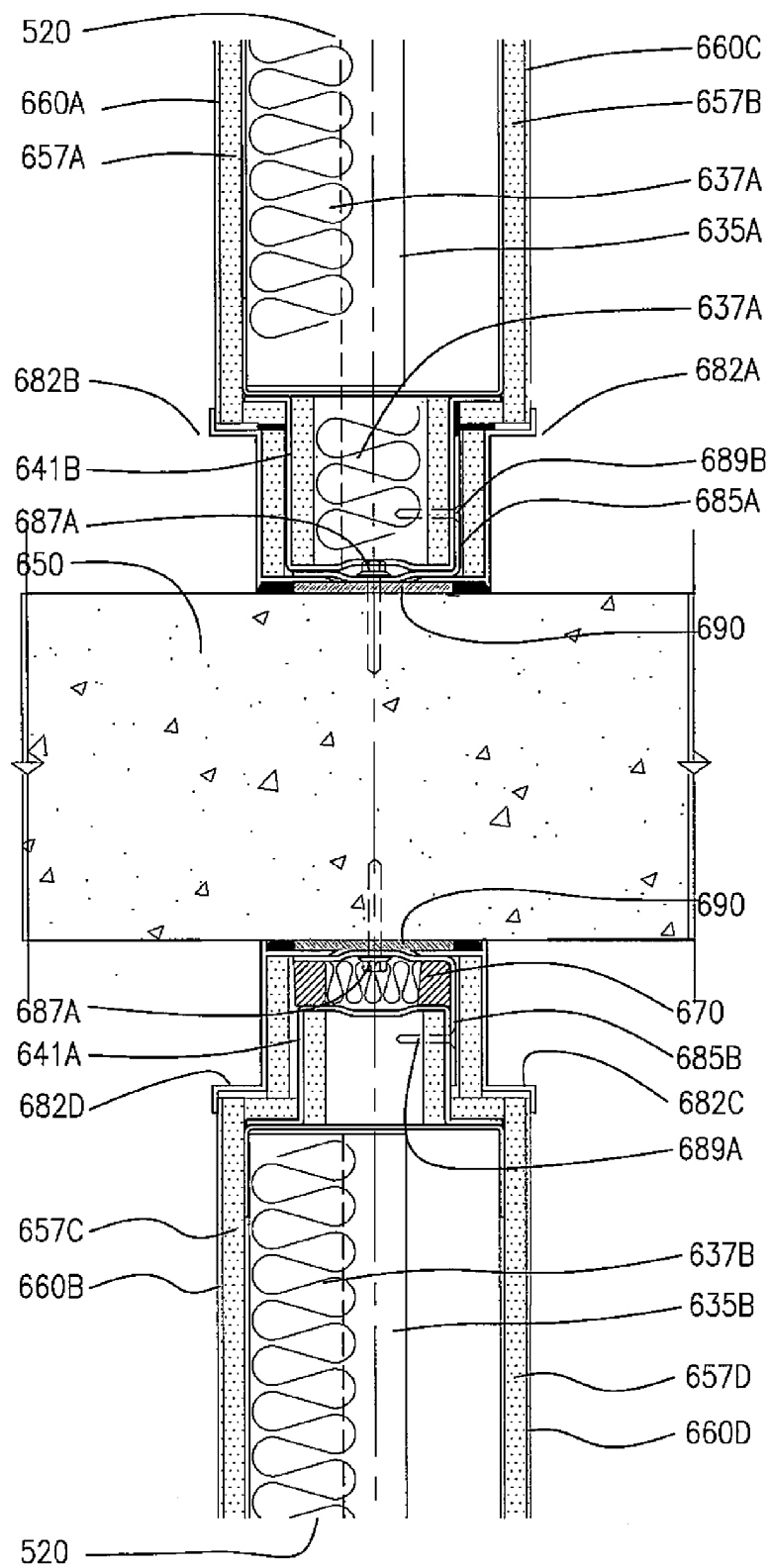

FIG. 19 illustrates cross-sectional details of demising walls attached to the floor and ceiling slab.

Figure 20A:
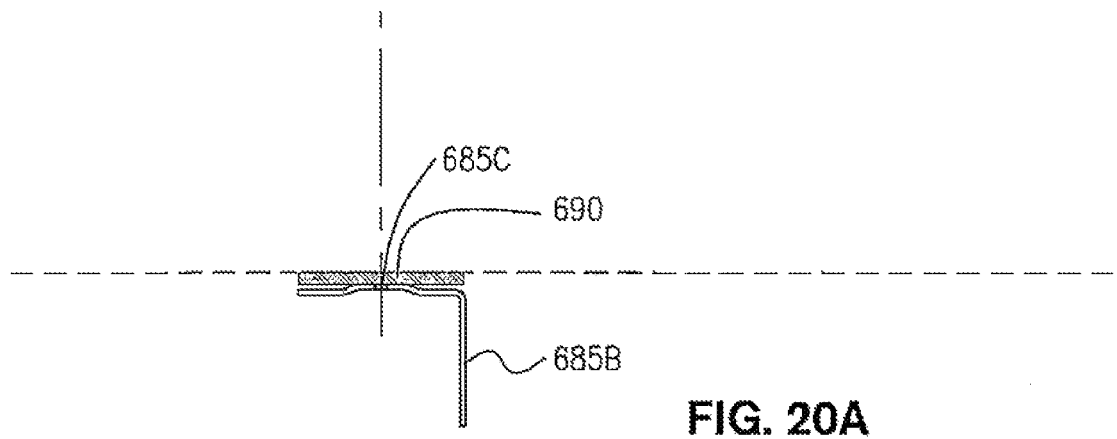
Figure 20B:
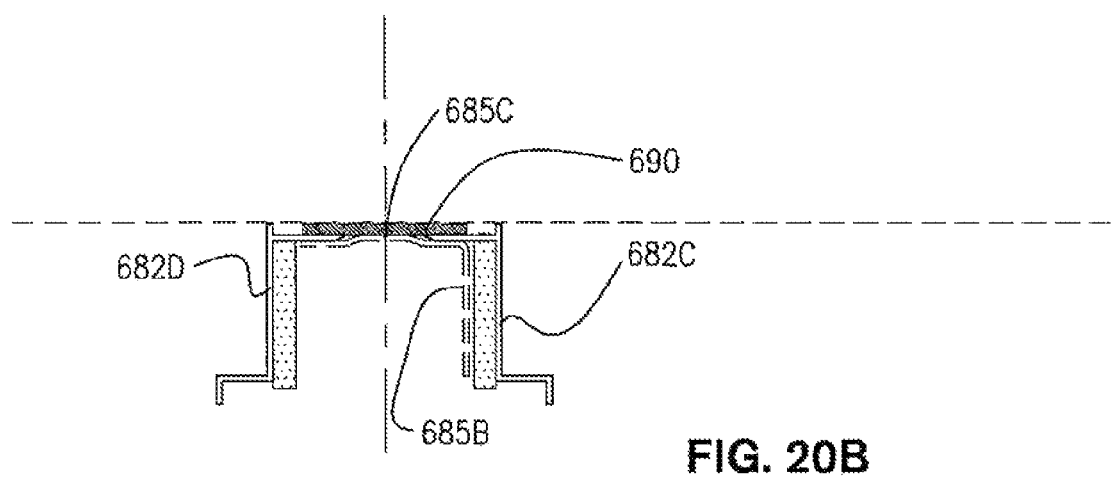
Figure 20C:

FIGS. 20A-C illustrate sectional details of structural members at a head portion before attaching the demising wall to the floor and ceiling slab.

Figure 21:
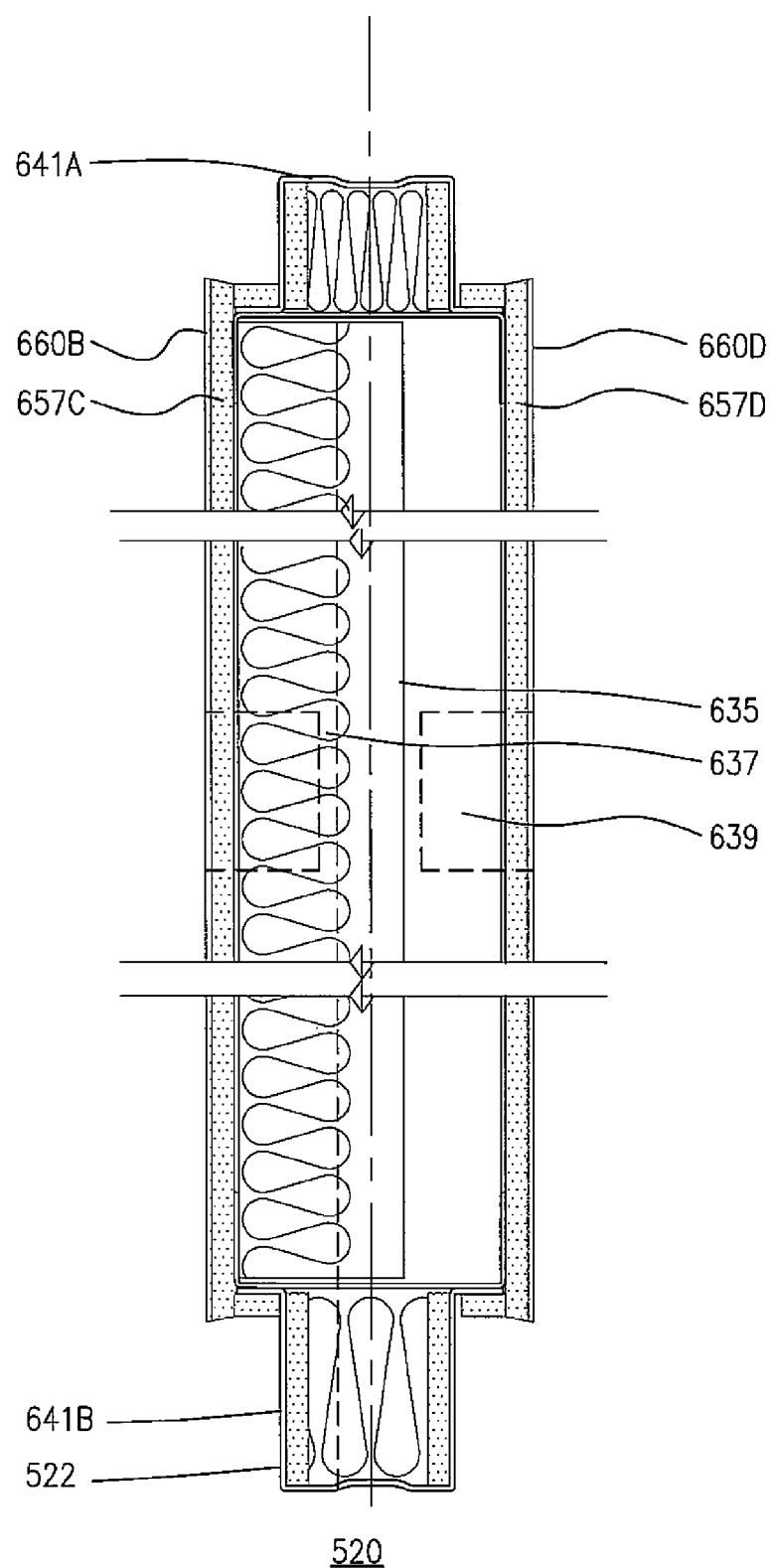

FIG. 21 illustrates cross-sectional details of a demising wall before attaching to the floor and ceiling slab.

Figure 22A:
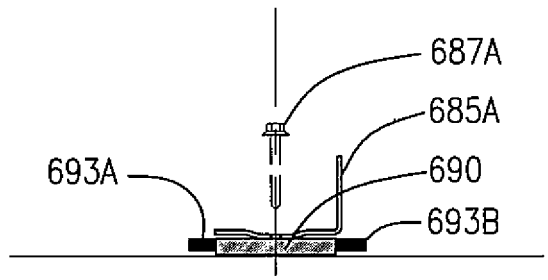
Figure 22B:
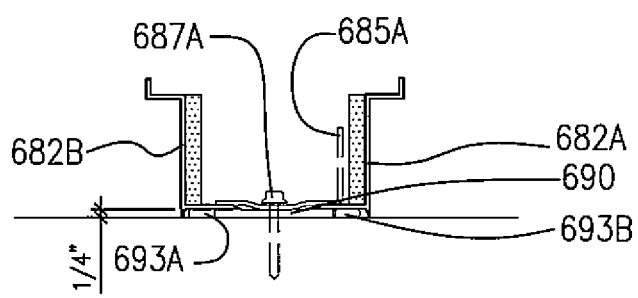
Figure 22C:
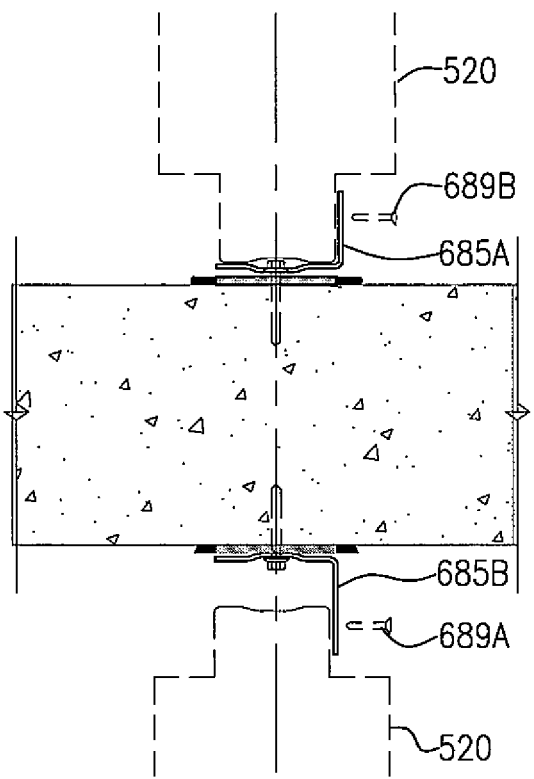

FIGS. 22A-C illustrate sectional details of steps to secure the demising walls to the floor and ceiling slab.

Figure 23:
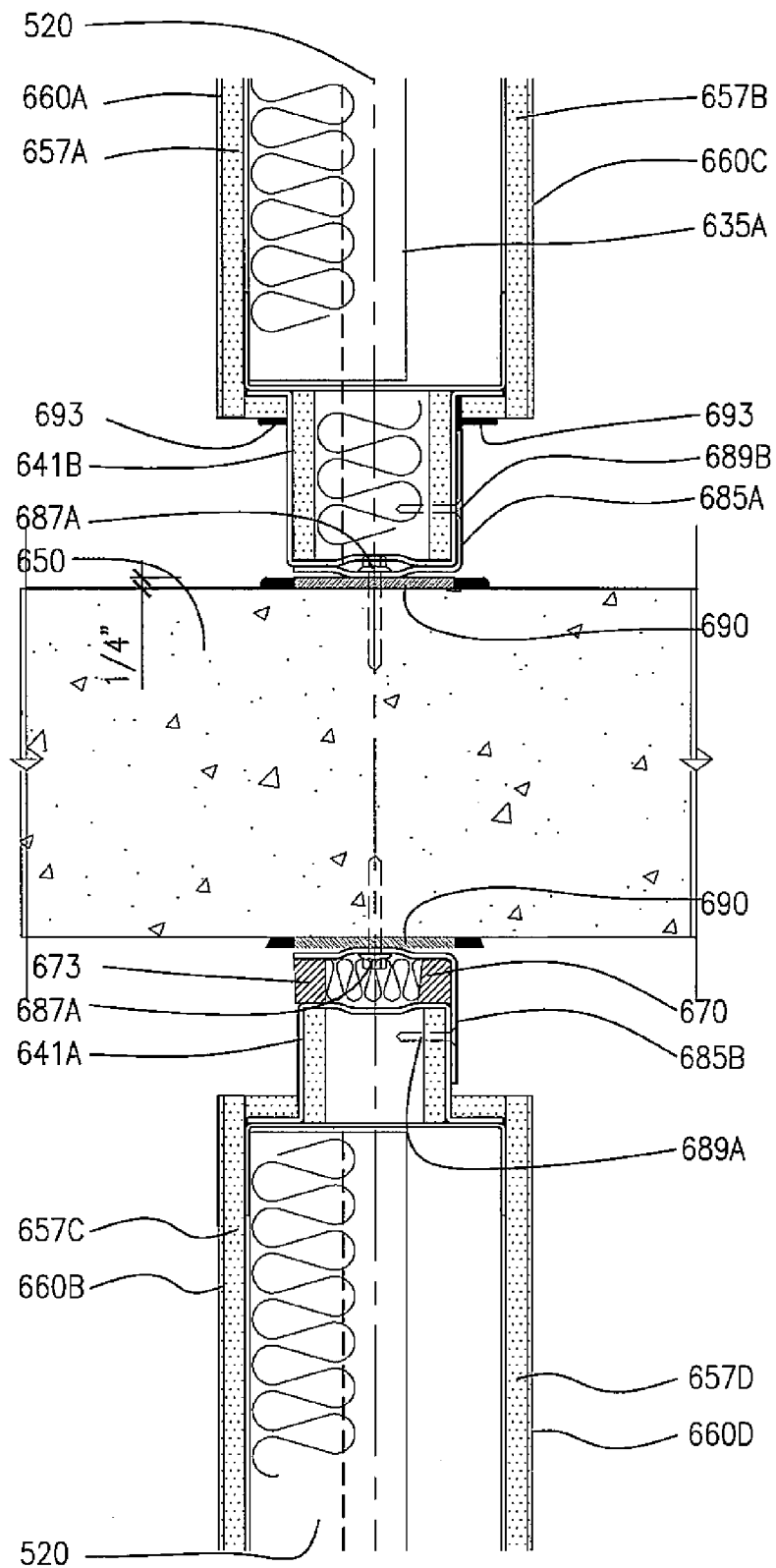

FIG. 23 illustrates cross-sectional details of additional steps to secure the demising walls to the floor and ceiling slab.

Figure 24:
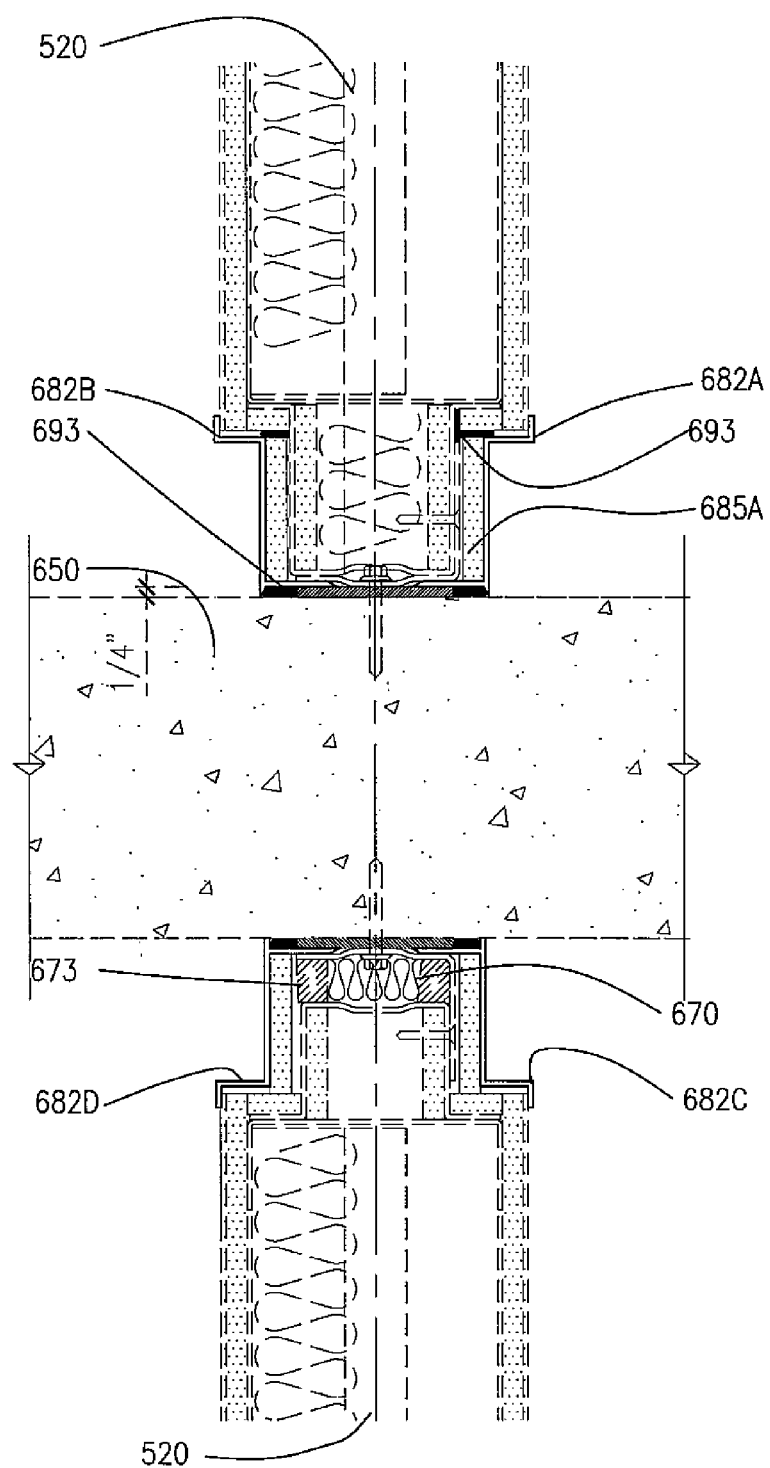

FIG. 24 illustrates cross-sectional details of additional steps to secure the demising walls to the floor and ceiling slab.

Figure 25A:
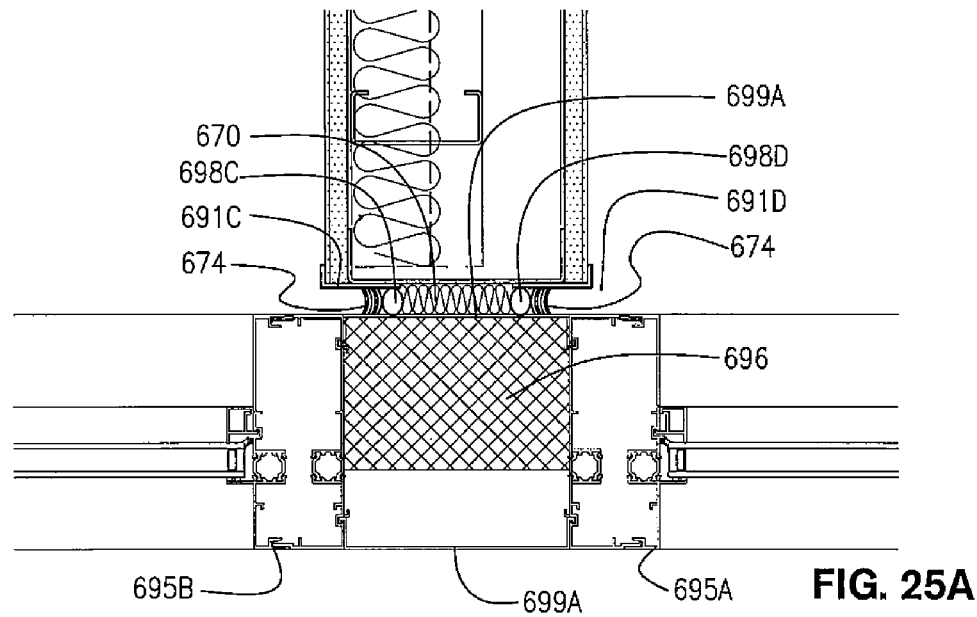
Figure 25B:
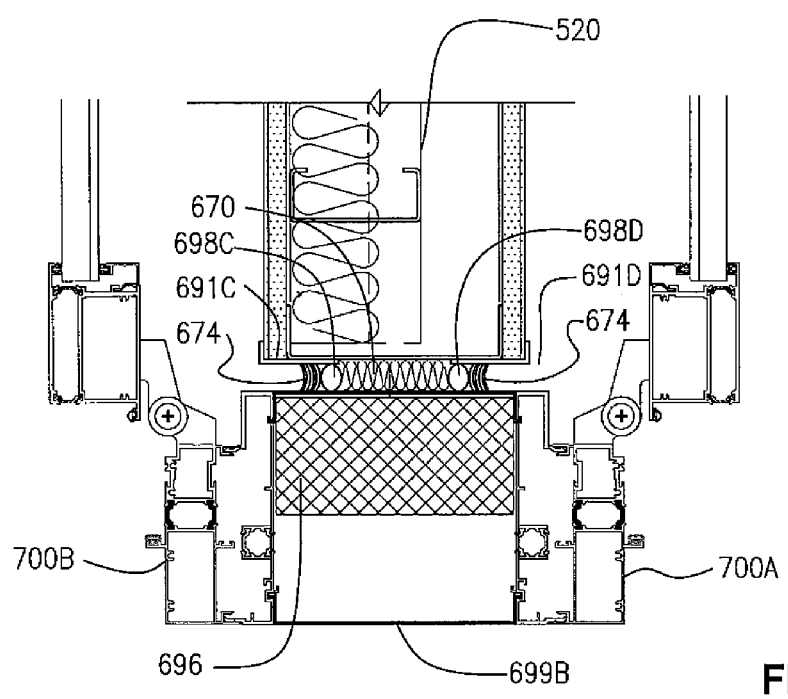

FIG. 25A-B illustrate cross-sectional details of a demising wall interfacing with an exterior window wall and entry door assembly after attaching the exterior wall to the floor and ceiling slab.

Figure 26A:
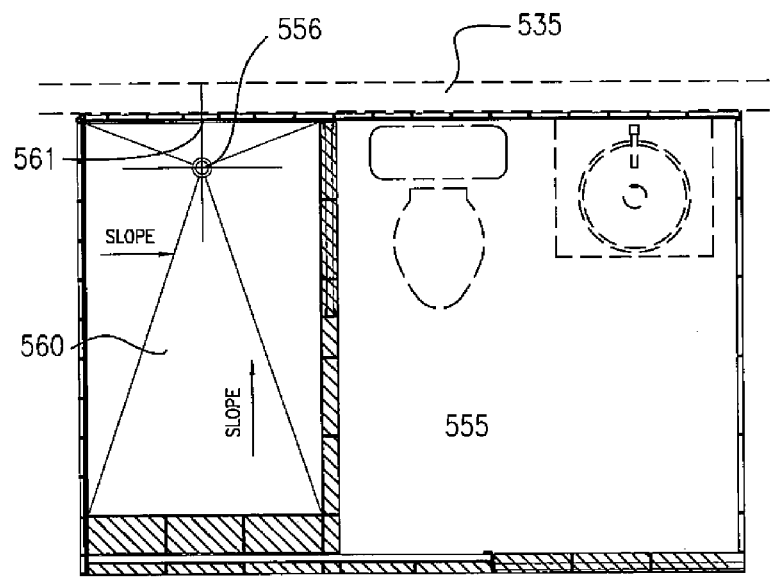
Figure 26B:
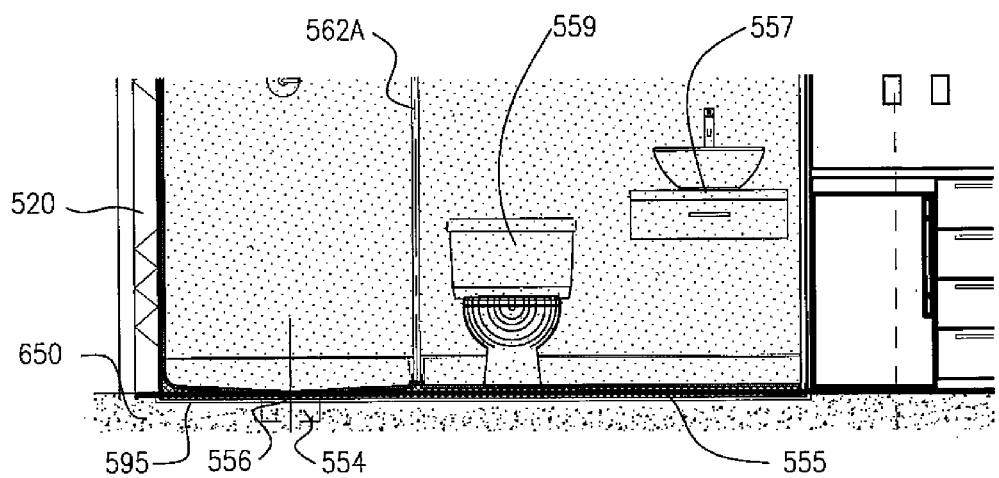

FIGS. 26A-B illustrate top and side views of a bathroom floor pan securely attached to a recessed floor and ceiling slab.

Figure 27:
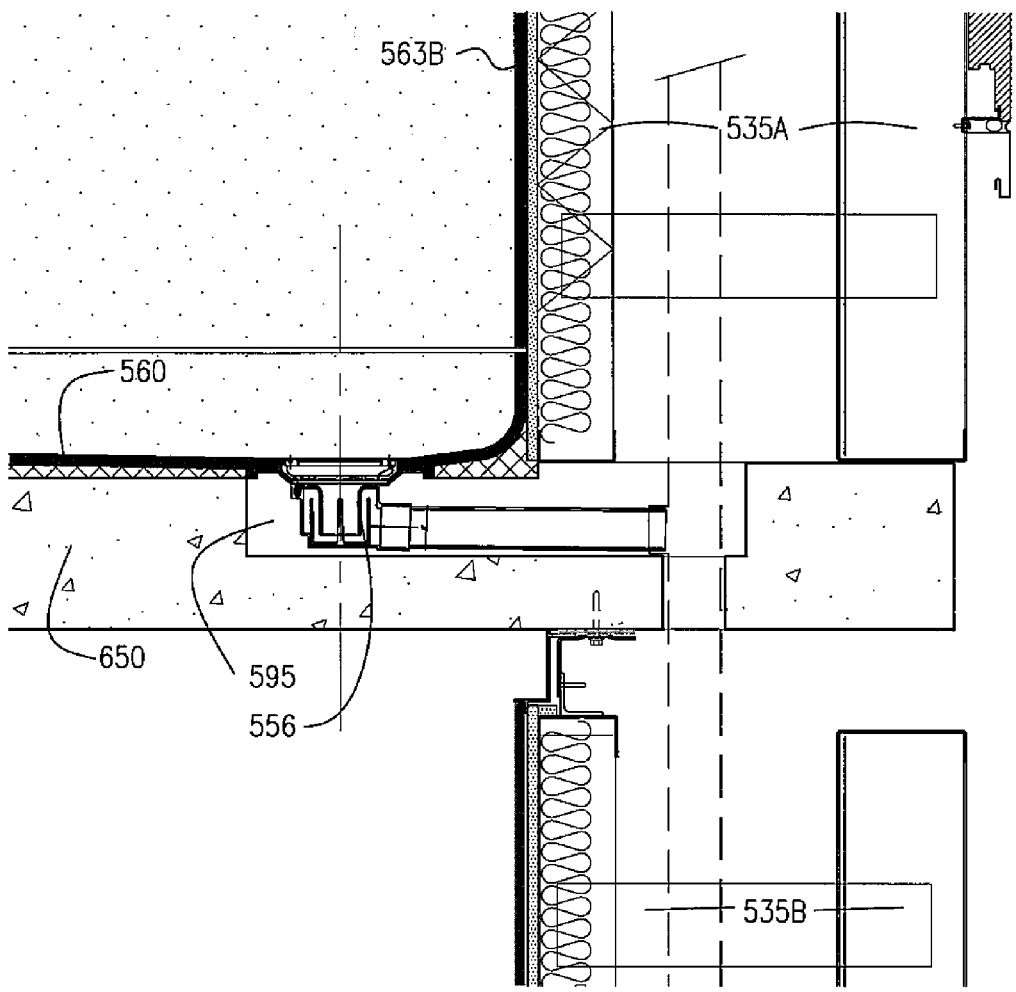

FIG. 27 illustrates cross-sectional details of a utility wall above and beneath the floor and ceiling slab for interior plumbing assembly.

FIG. 28 illustrates a side view of the utility wall without bath and kitchen components in place as well as the utility wall with bath and kitchen components in place.

Figure 29:
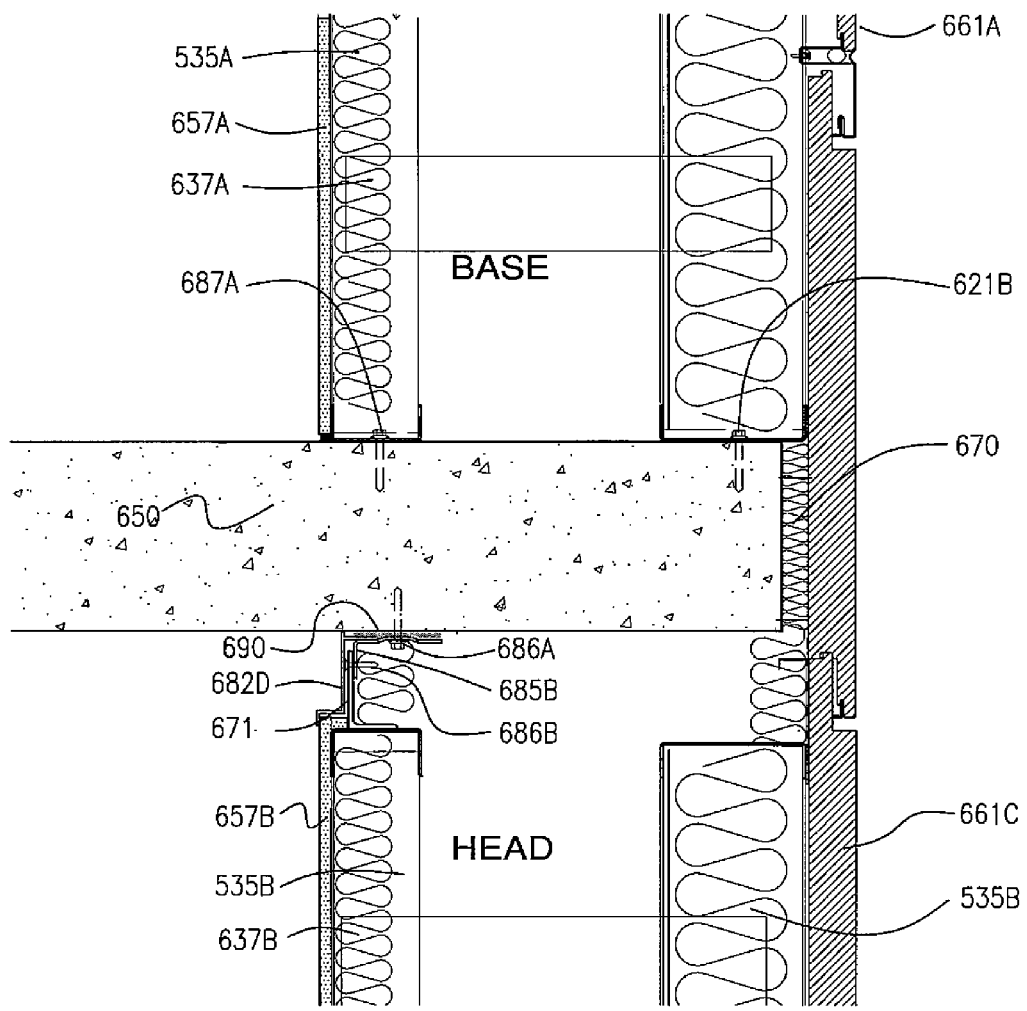

FIG. 29 illustrates cross-sectional details of utility walls attached to the floor and ceiling slab.

Figure 30:
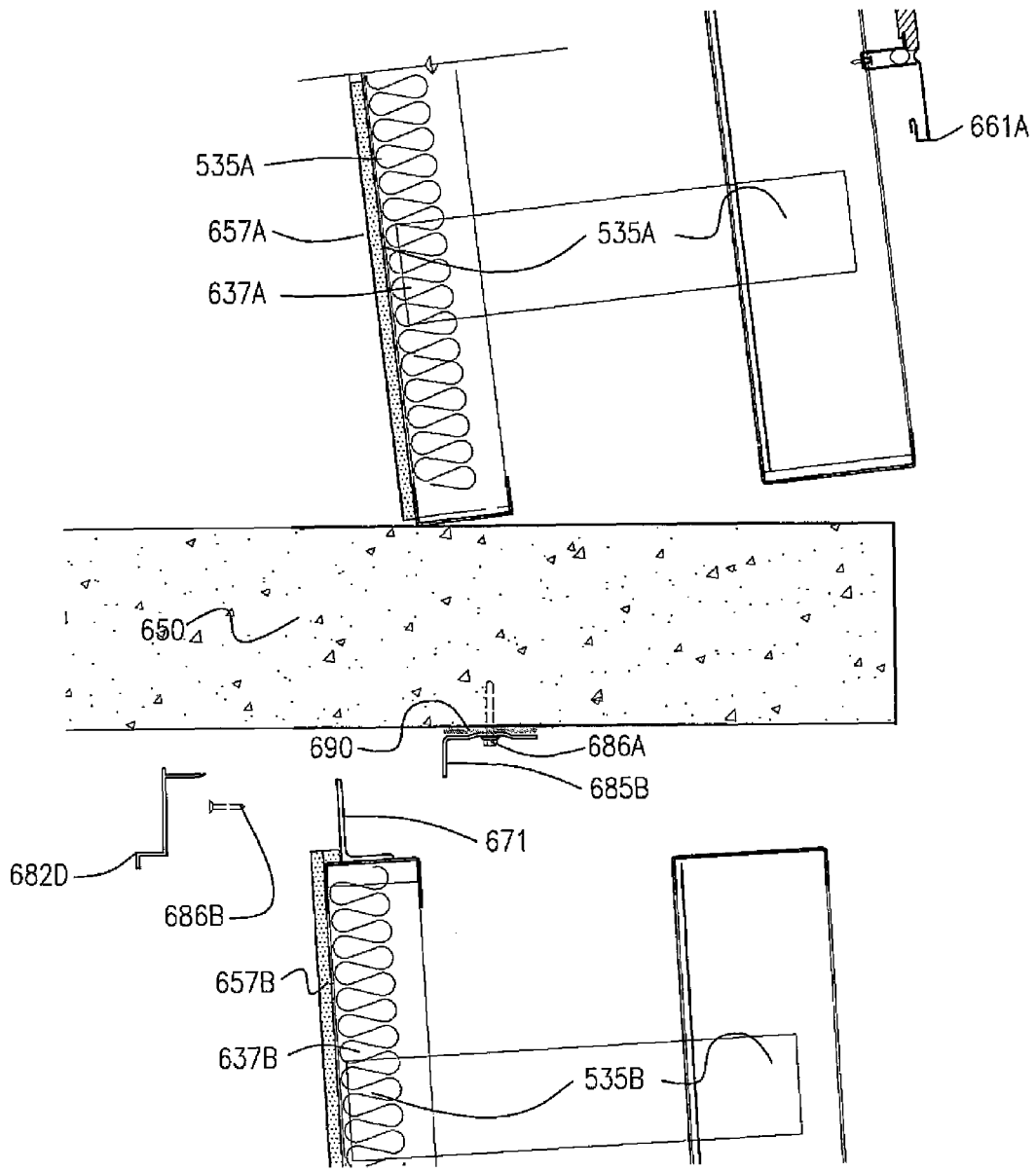

FIG. 30 illustrates cross-sectional details of utility walls before attaching to the floor and ceiling slabs.

Figure 31:
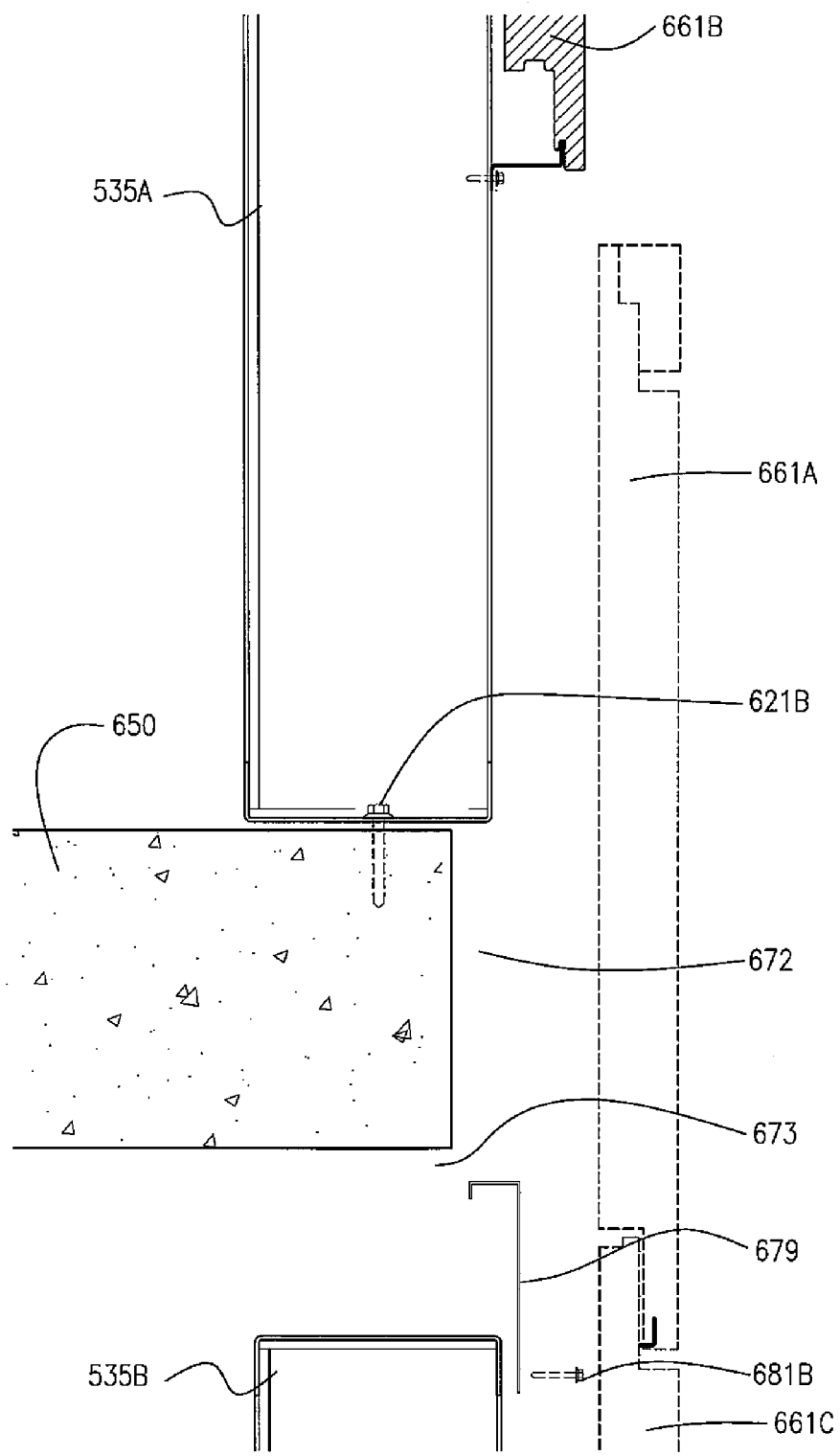

FIG. 31 illustrates cross-sectional details of a utility wall before attaching to the exterior sides of units.

Figures 32A, 32B:
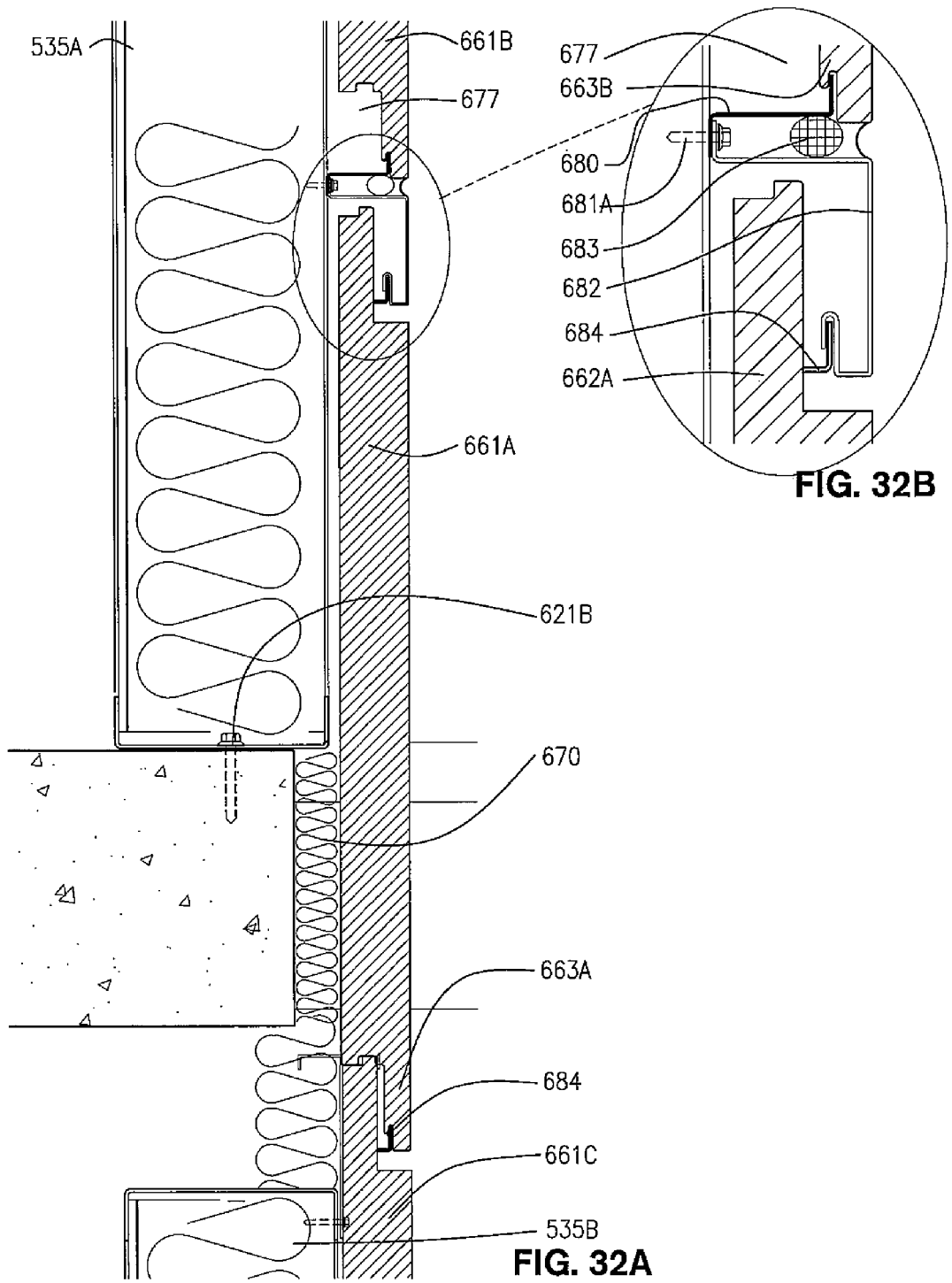

FIG. 32 illustrates cross-sectional details of a utility wall after attaching to the exterior sides of units.

Figures 33A, 33B, 33C:
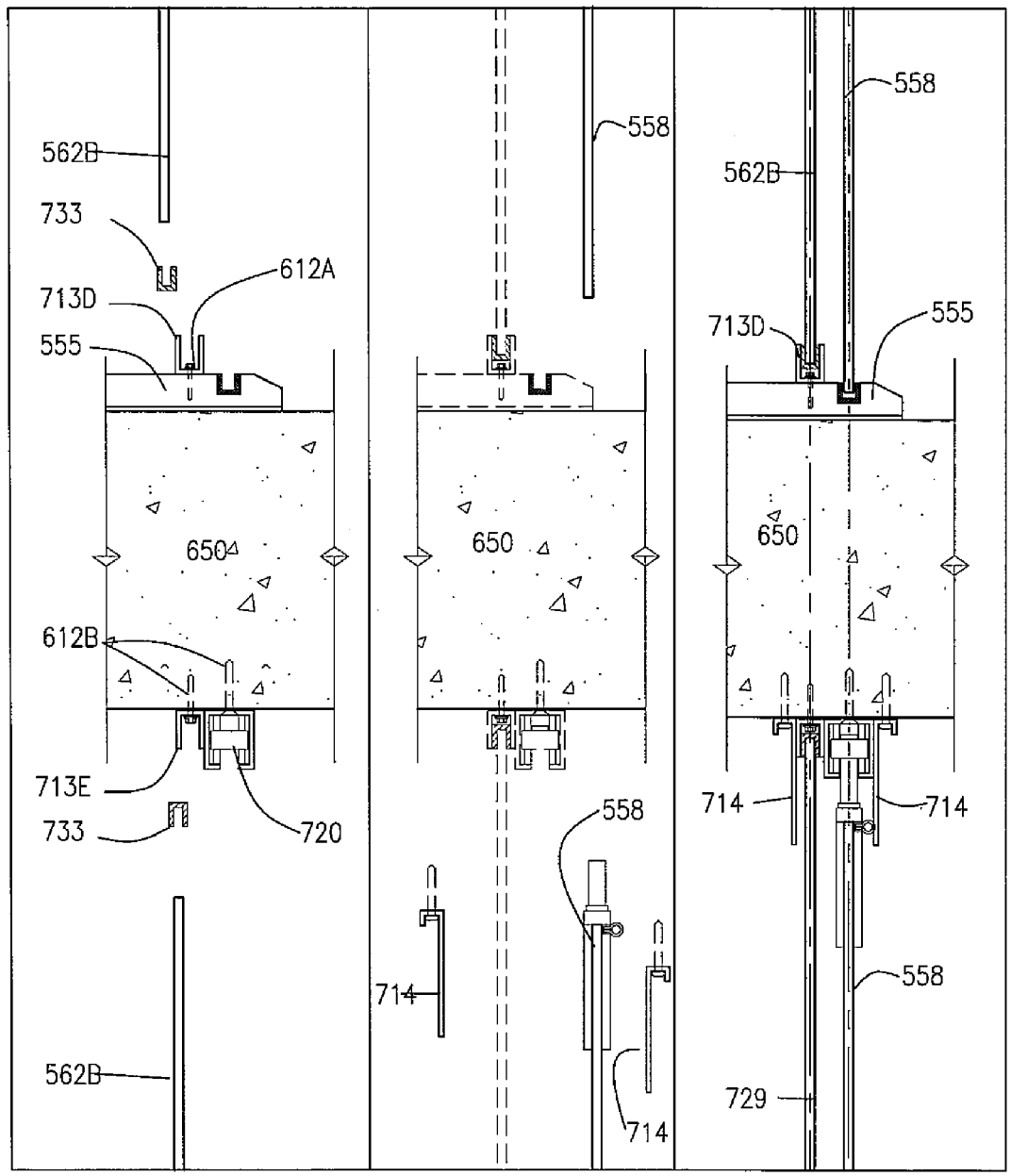

FIGS. 33A-C illustrate cross-sectional details of interior partitions, entry doors and assembly of bathroom components.

FIG. 34 illustrates a top view of an entry way with utility walls and demising walls installed.

FIGS. 35A-D illustrate a side view of an entry way and attachment to the walls and floor slab.

Figure 36:
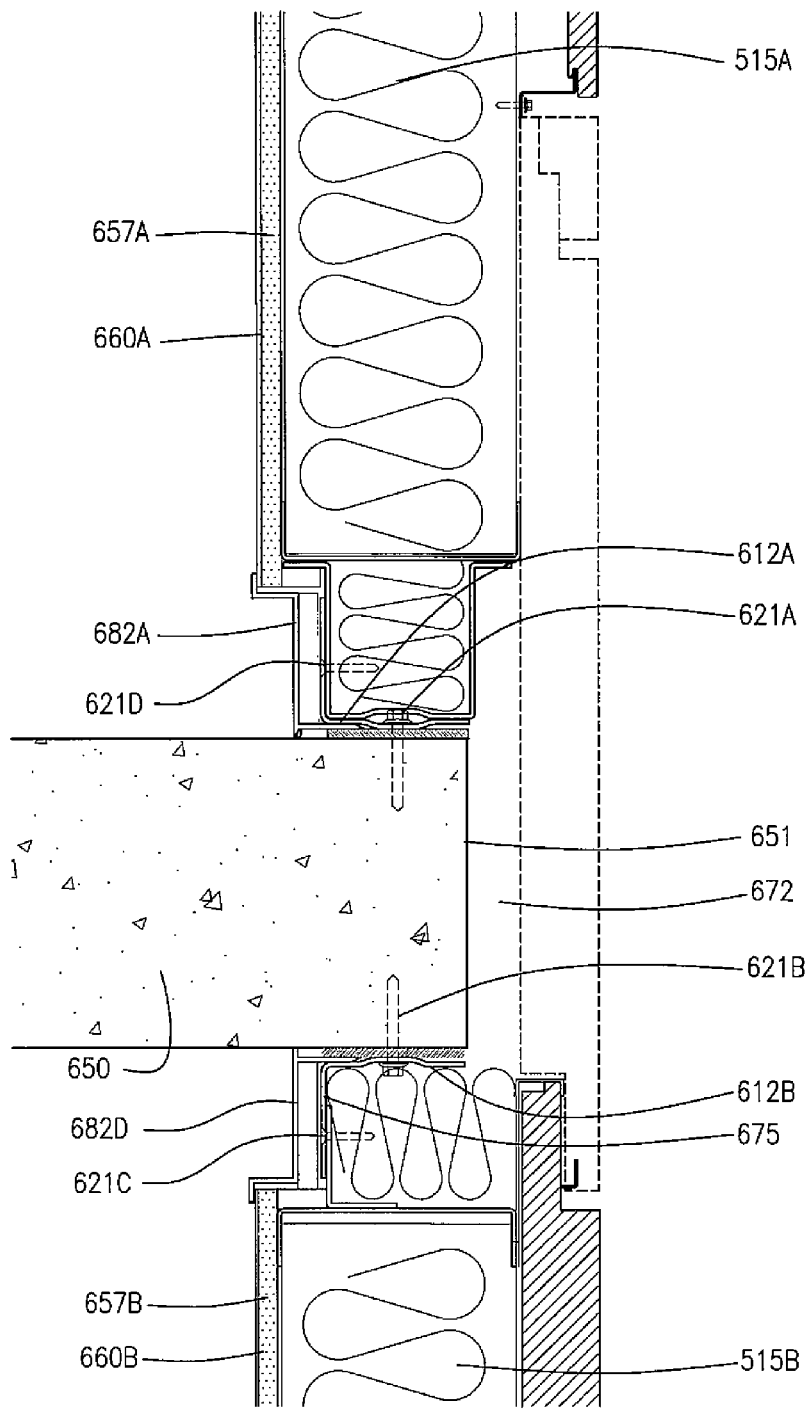

FIG. 36 illustrates cross-sectional details of end walls before attaching to the exterior wall panels.

Figures 37A, 37B:
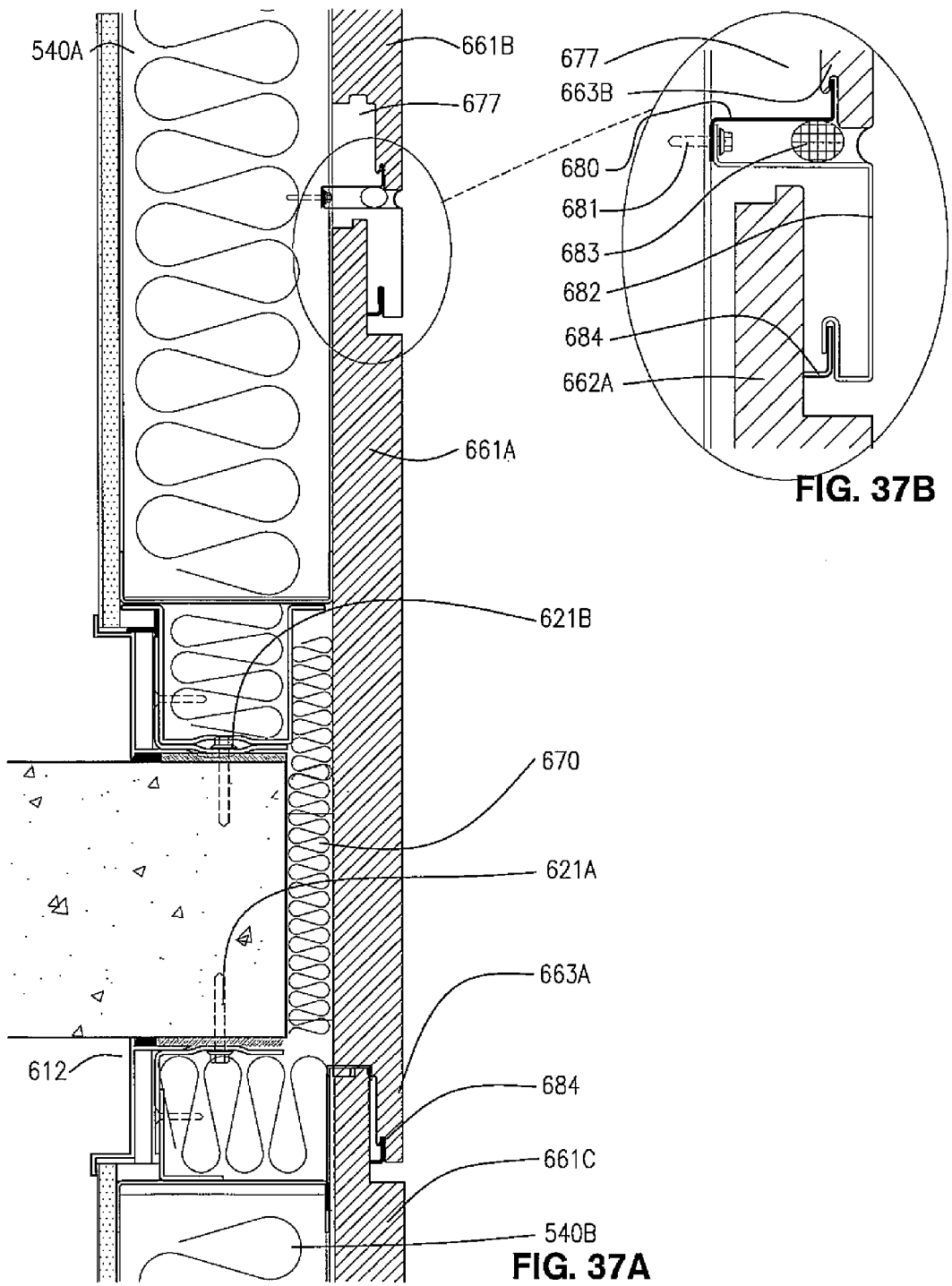

FIGS. 37A-B illustrate cross-sectional details of end walls of FIG. 36 after attaching to the floor and ceiling slabs and exterior wall panels.

Figure 38:
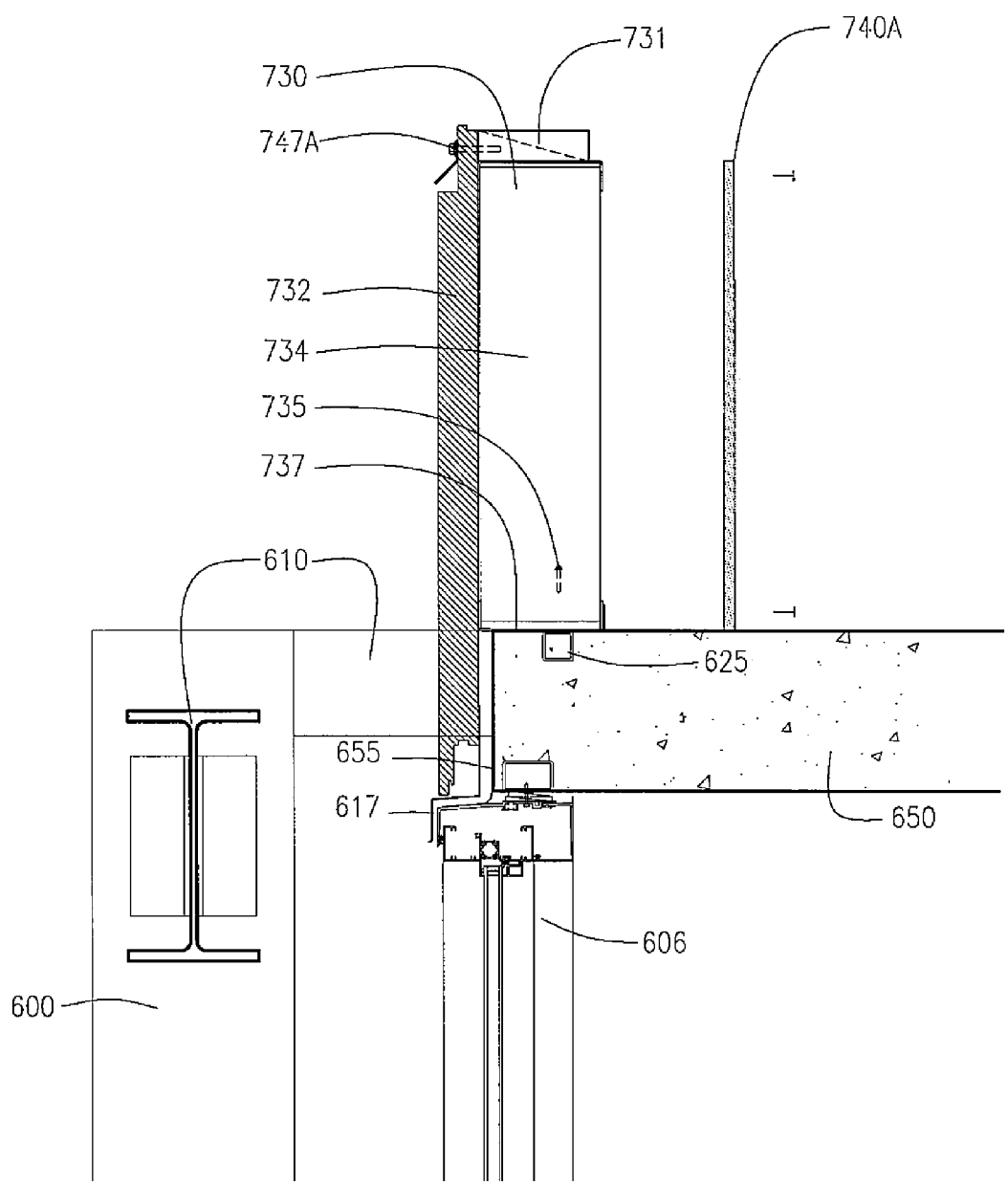
Figure 39:
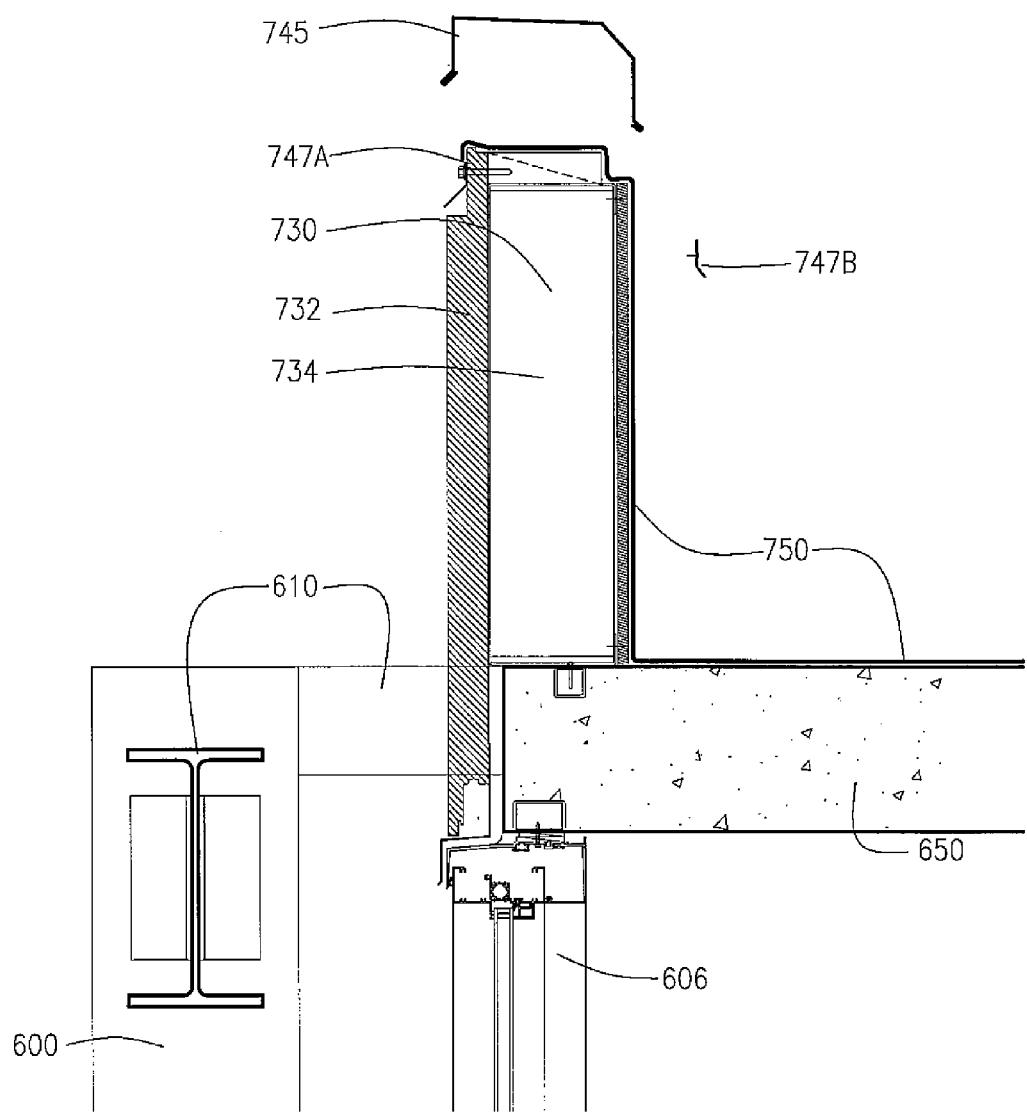

FIGS. 38-39 illustrates cross-sectional details of installing a parapet wall component over a roof.

Figure 40:
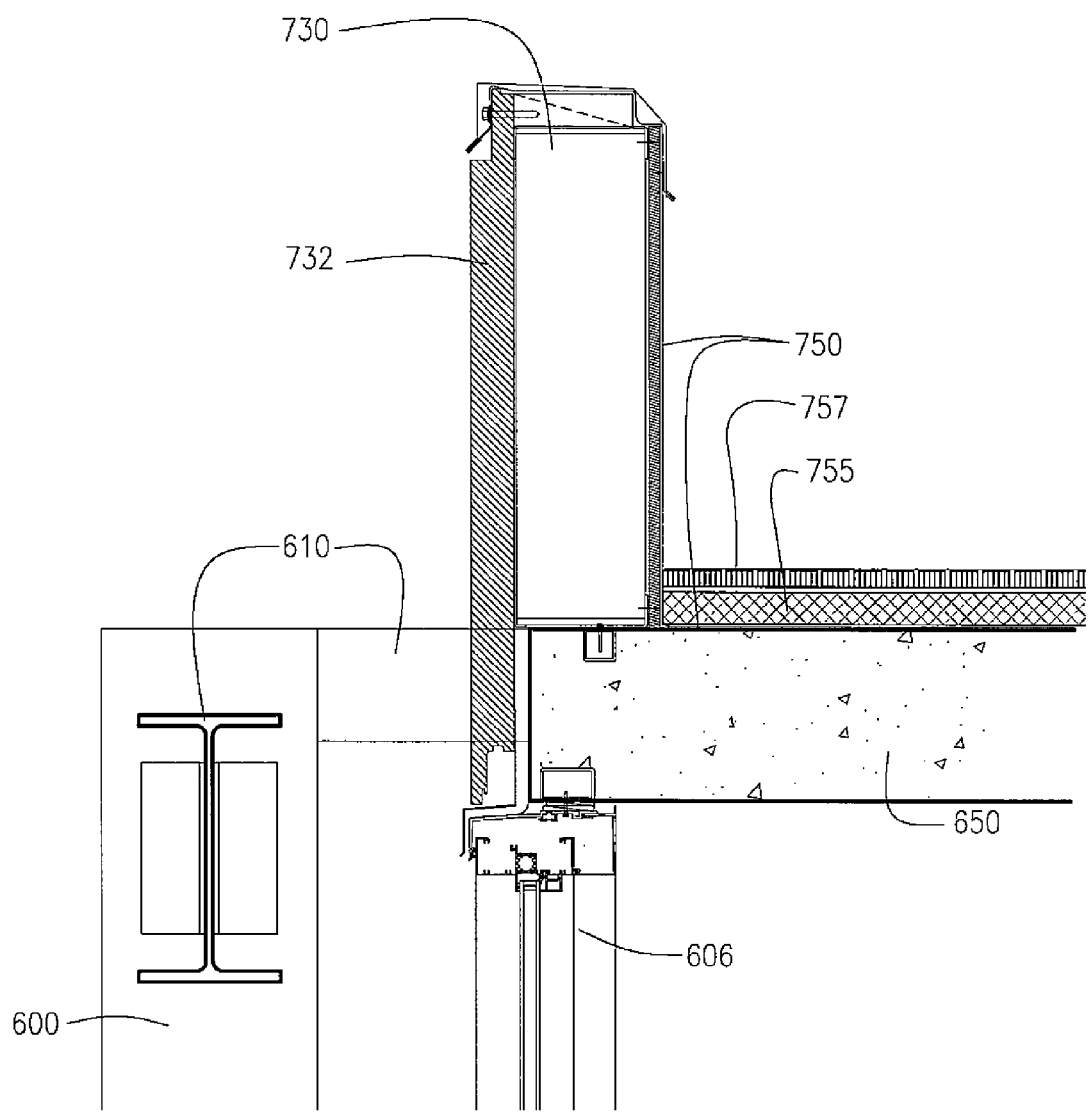

FIG. 40 illustrates cross-sectional details of installing a garden roof drain next to the parapet wall component.

Figure 41:
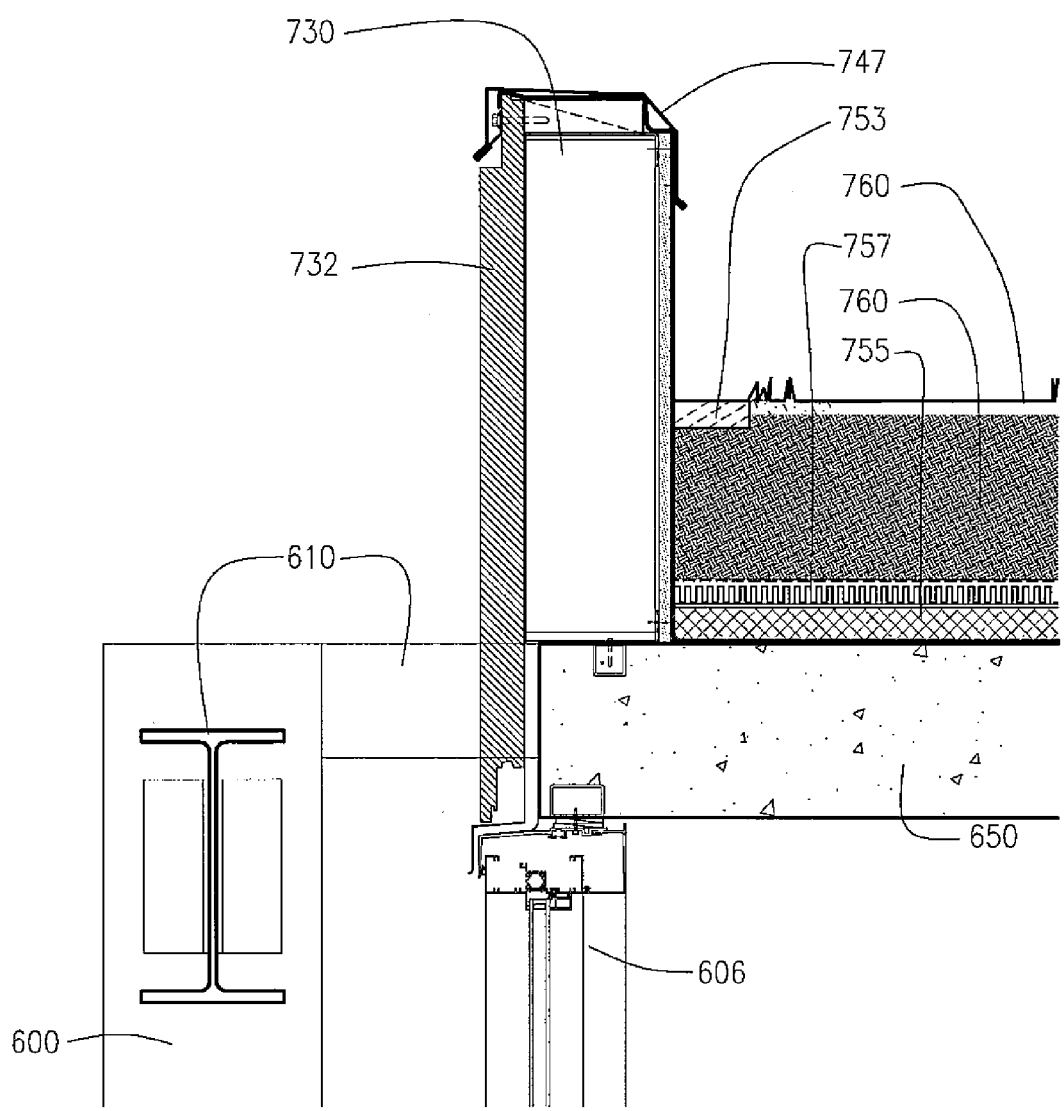

FIG. 41 illustrates cross-sectional details of a complete garden roof assembly.

Figure 42:
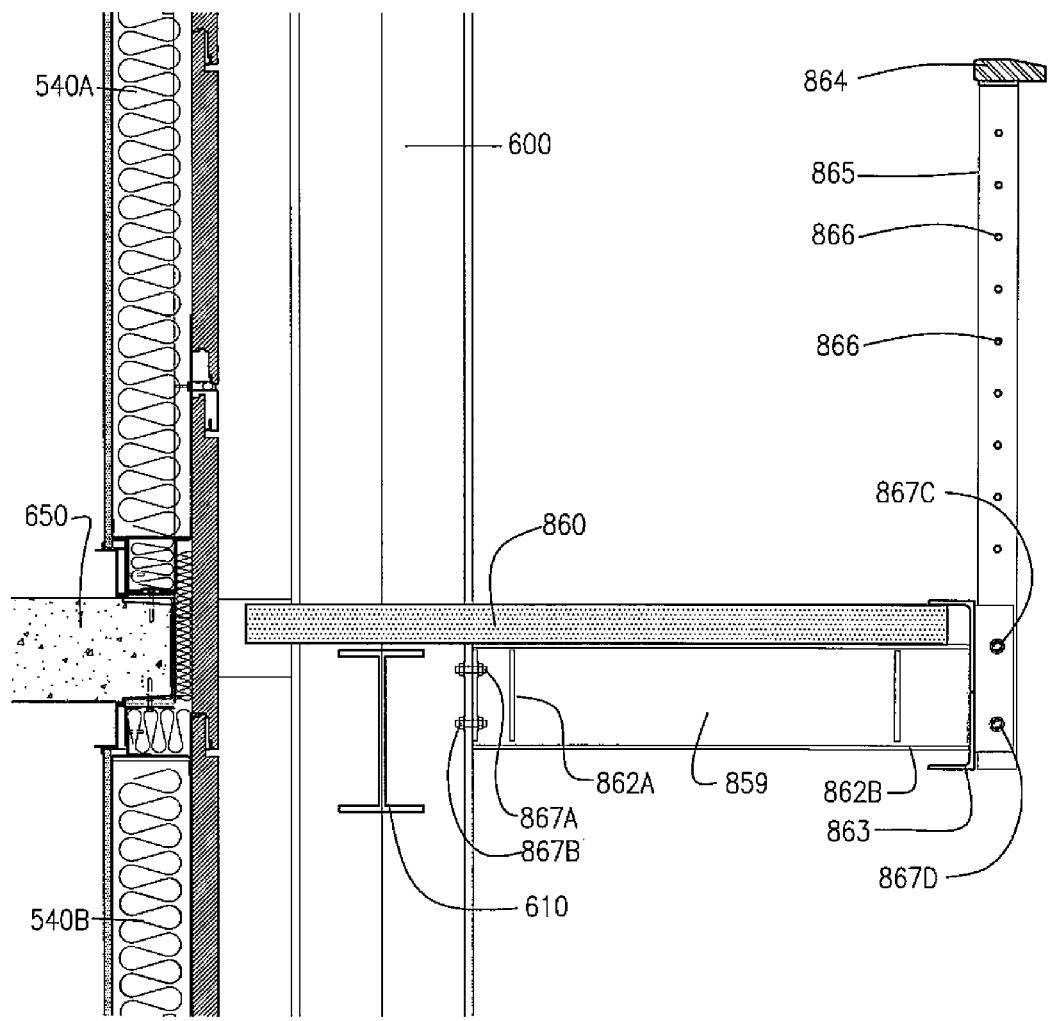
Figure 5:
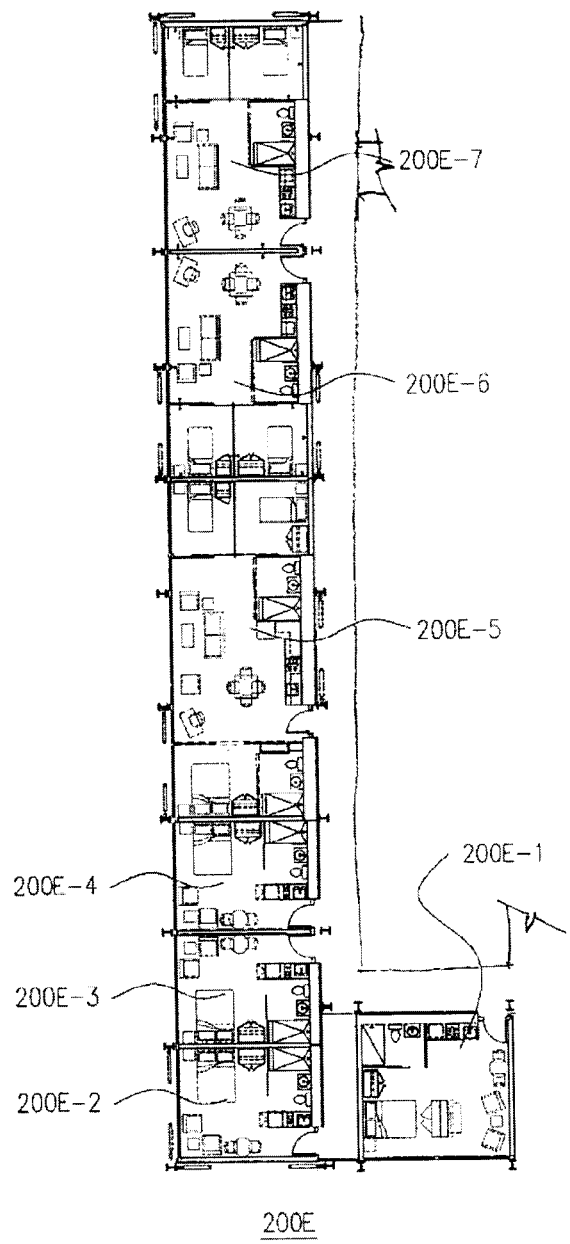

FIG. 42 illustrates cross-sectional details of constructing exterior common walkways.

DETAILED DESCRIPTION OF THE INVENTION

Before describing the invention and the figures, some of the terminology should be clarified. Please note that the terms and phrases may have additional definitions and/or examples throughout the specification. Where otherwise not specifically defined, words, phrases, and acronyms are given their ordinary meaning in the art. Exemplary embodiments may be better understood with reference to the drawings, but these embodiments are not intended to be of a limiting nature.

As used herein, "exterior window wall" refers to a pre-fabricated and pre-bundled wall unit with pre-assembled sections with insulated aluminum and glass exterior, unitized window wall system. The exterior window wall is an aluminum and glass panel with an operable window unit. The exterior window wall may include an integral sliding door and railing to create an open wall with a flush 'Juliet' balcony. A first type of exterior window wall is used in a straight configuration. A second type of exterior window wall is used in corner units located adjacently to a building's corners. A third type of exterior window wall, also referred to as "the exterior wall panel" that is a pre-fabricated and pre-bundled wall unit with pre-assembled sections with insulated aluminum and glass exterior, unitized window wall system and a fixed opaque window assembly positioned directly adjacent to unit doors at the ends of a building. All of the exterior window walls are fully weather-sealed and able to provide at least an R-value of 20. An R-value refers to a measure of thermal resistance that is typically used in the building industry.

As used herein, "exterior wall" refers to a pre-fabricated, pre-bundled, and non-utility wall unit with pre-assembled sections that includes electrical wiring, vapor barrier and thermal insulation with a finished interior surface. The exterior wall may include plumbing for sprinklers.

As used herein, "end wall" refers to a pre-fabricated, pre-bundled, and non-plumbing wall unit with pre-assembled sections that includes electrical wiring, vapor barrier and thermal insulation with a finished interior surface. The end wall is very similar to the exterior wall except that the end wall has a significantly different configuration, typically used as the end wall for a building. The end wall may include plumbing for sprinklers.

As used herein, "demising wall" refers to a pre-fabricated, pre-bundled, and pre-finished wall unit with pre-assembled sections that includes electrical wiring and may include electrical radiant heat with an approximate length of 20 feet. The demising wall may include plumbing for sprinklers.

As used herein, "utility wall" refers to a pre-fabricated and pre-bundled wall with pre-assembled sections that includes kitchen and bath wall plumbing, a unit's electrical service panel, exhaust vents/fans, and any associated electrical and communications distribution wiring for the adjacent walls. The utility wall's plumbing includes the kitchen and bath supply, waste lines and vent piping. The utility wall has a finished interior surface and contains pre-installed exhaust vents/fans and vent trims. The utility wall further includes thermal insulation, and encapsulates a unit's plumbing chase. The utility wall has a finished exterior surface, and may include fire-rated wall board and insulation to act as integral air and vapor barrier.

As used herein, "parapet wall" refers to a pre-manufactured, pre-finished, and pre-assembled wall with approximately 16 to 18 feet at the top portion of the exterior wall that connects to a roof slab and accommodates a building's roofing and garden roof conditions.

As used herein, "entry door," refers to a pre-fabricated, pre-bundled entry door unit with operable re-light panel, inner and outer frames, and all associated door hardware with pre-assembled sections that includes electrical wiring and may include plumbing for sprinklers as rapid installation and to be set in place at the final exterior wall or next to the utility walls. A threshold is provided for installation after the entry door is in place.

As used herein, "exterior walkway" refers to a pre-fabricated, pre-bundled walkway with pre-assembled sections that supports railing and decking for rapid installation.

As used herein, "bathroom floor pan" refers to a single pre-cast and pre-fabricated unit with a sloped shower floor and integral drain that is set in place. The bathroom floor pan is constructed for easy delivery and rapid installation.

As used herein, "kitchen unit" refers to a pre-fabricated and pre-assembled kitchen unit that includes cabinets, preinstalled plumbing, plumbing connections, electrical wiring, vent ducting, countertops, at least one sink, exhaust vents/fans and light fixtures to be installed in the kitchen on the utility walls.

As used herein, "bathroom vanity" refers to at least one sink and preinstalled plumbing to be installed in the bathroom on the utility walls.

As used herein, "cabinets" refers to premanufactured and preassembled cabinets with integral exhaust fans and light fixtures to be installed in the kitchen and bathroom on the utility walls.

Figure 1:
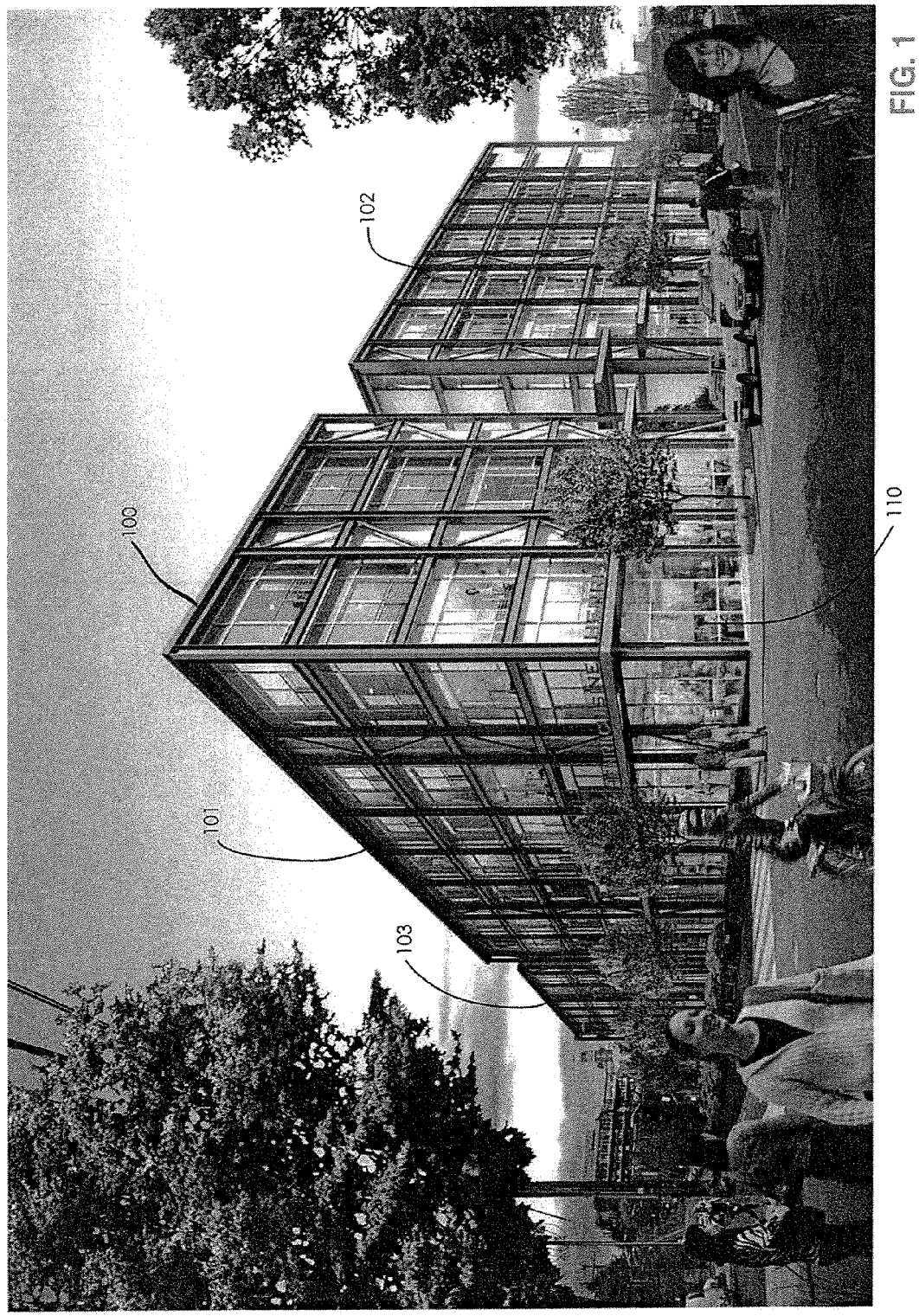
FIG. 1 illustrates a multi-story building according to an embodiment of the present invention.

Referring now in detail to the drawing figures, FIG. 1 illustrates an exemplary embodiment of a building 100 built according to the construction system and method as described in the present invention. FIG. 1 illustrates an exemplary five-story building 100 that is part of a development including several residential buildings 101, 102, 103 with a plaza or retail floor 110 at street level for commercial activity and secure, below-grade parking underneath the building 100. All of the residential buildings 101, 102, 103 in this development are to be constructed using the same construction system and method of the present invention.

Figure 2:
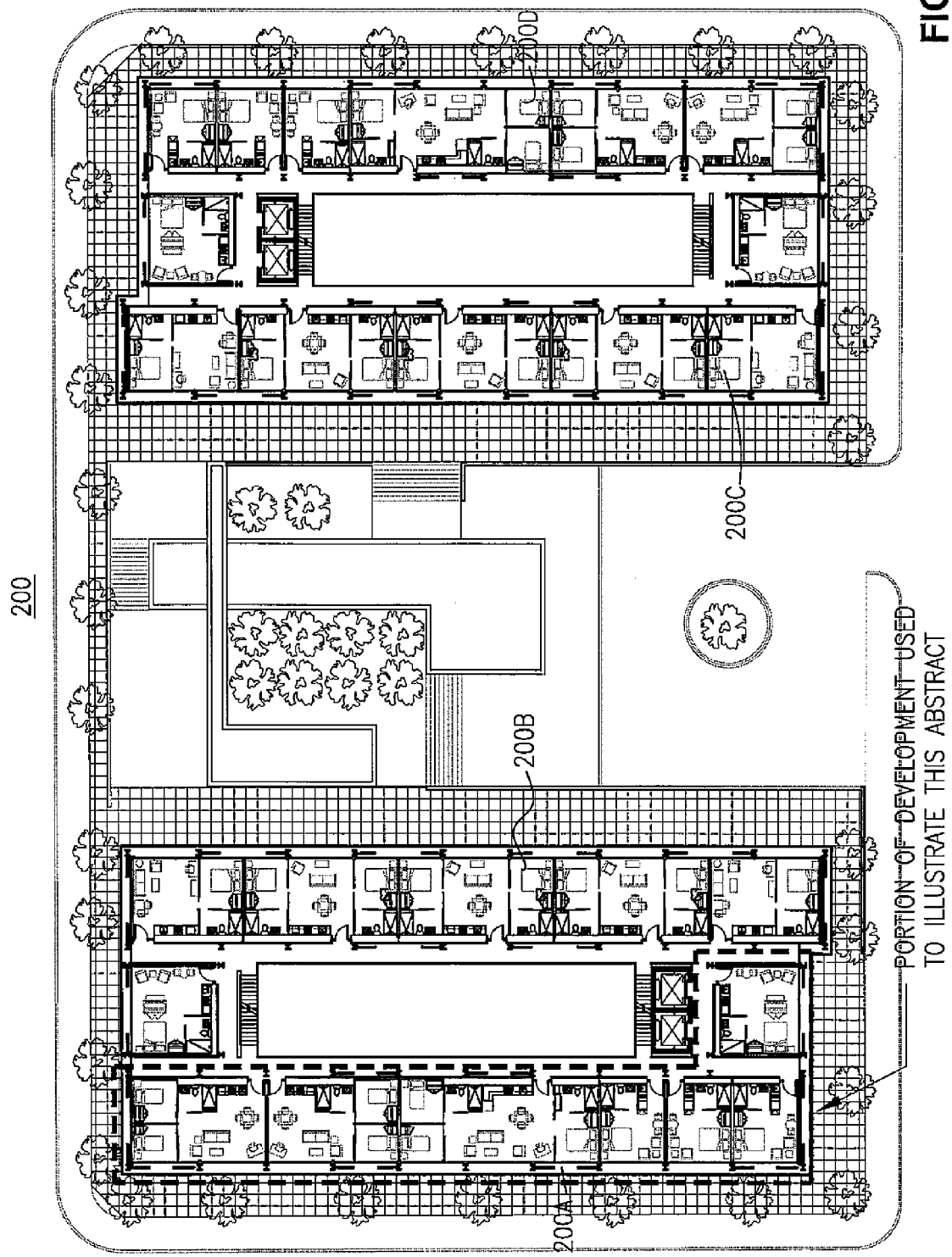
FIG. 2 illustrates a building plan with various floor plans of the building of FIG.
Figure 3:
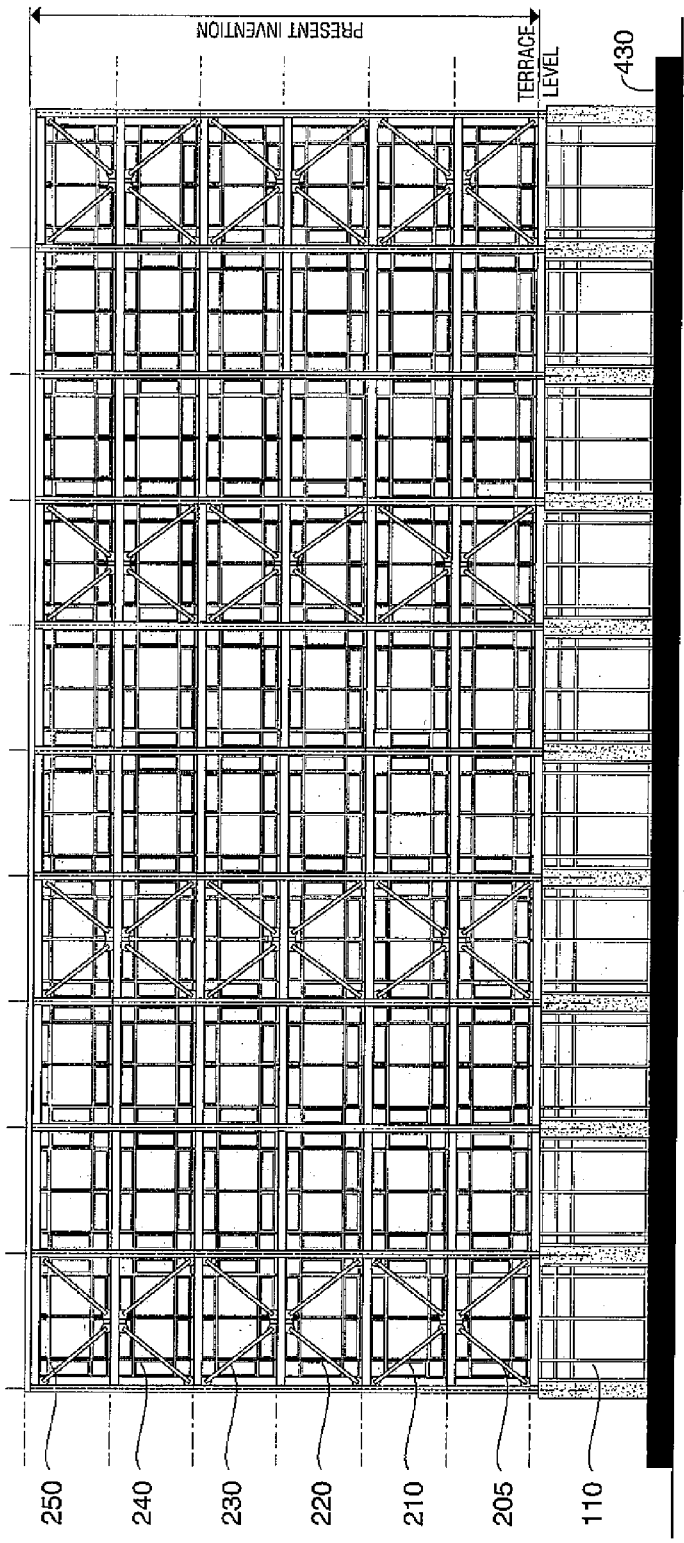
FIG. 3 illustrates a side elevation view of the multi-story building of FIG. 1.
Figure 4:
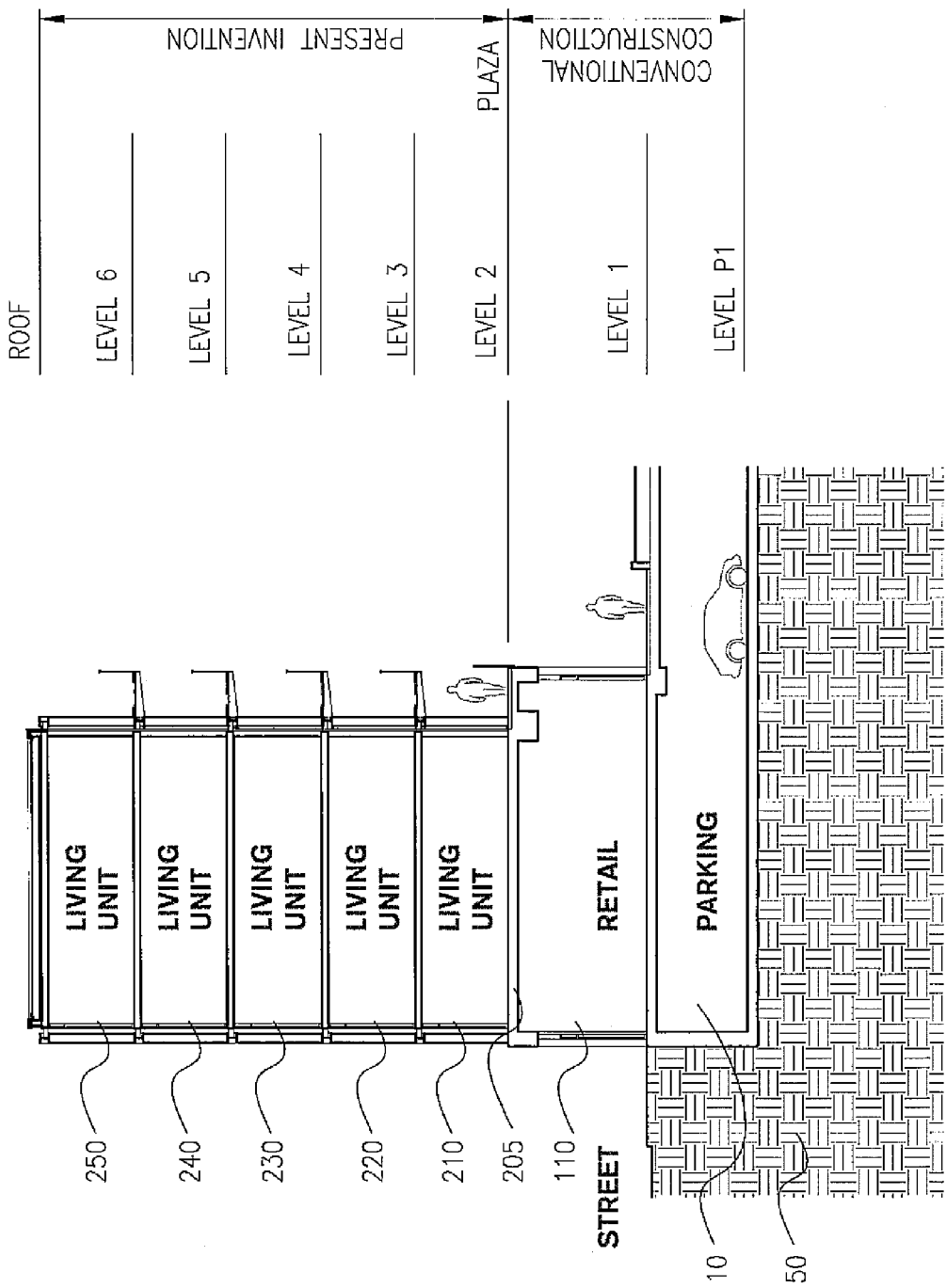
FIG. 4 illustrates a side sectional view of an exemplary portion of the multi-story building of FIG. 1.

FIG. 2 illustrates a building plan 200 with four variations of floor plans 200A-D of the exemplary building 100 of FIG. 1. As shown in FIG. 2, all of the buildings share common exterior walkways. FIG. 3 illustrates a side elevation view of an exemplary six-story building. This exemplary building comprises first through fifth levels of residential units 210, 220, 230, 240, 250 above a main, retail floor 110 for commercial development at the street level and a level of below-grade parking (shown in FIG. 4). FIG. 4 illustrates another side sectional view of an exemplary portion of the multi-story building of FIG. 1 with an approximate height of sixty-five feet. As shown in FIGS. 3 and 4, the main, retail floor 110 for commercial activity is shown with residential levels 210, 220, 230, 240, 250 above the retail floor 110. Every residential level from first through fifth levels 210, 220, 230, 240, 250 is identical in building floor plan and configuration. However, the present invention is not limited to identical building floor plan and configuration for every floor and allows the number bedrooms in any given residential unit and the layout of the units on any given floor to be modified by simple relocation of a demising wall. These modifications to the layout of the units or number of bedrooms also do not require changing out of the window wall components. However, depending on the specific circumstances, there may be additional modifications to the exterior walls to accommodate different floor plans and layout of the units for various floor levels. A parking level 10 at below-grade 50 is shown for parking cars for commercial and residential use.

Figure 5:
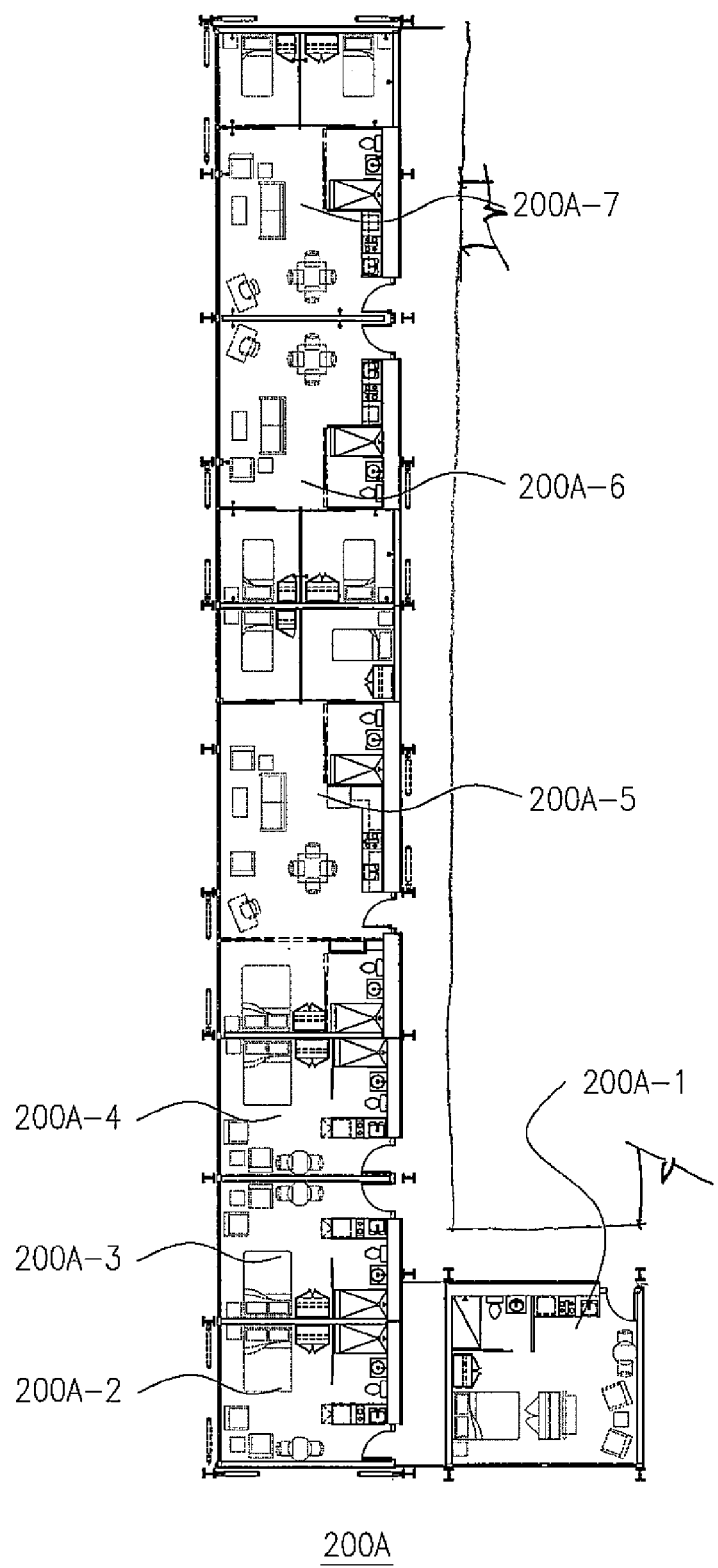
FIG. 5 illustrates a floor plan of an exemplary portion of the various floor plans of FIG. 2.
Figure 6:
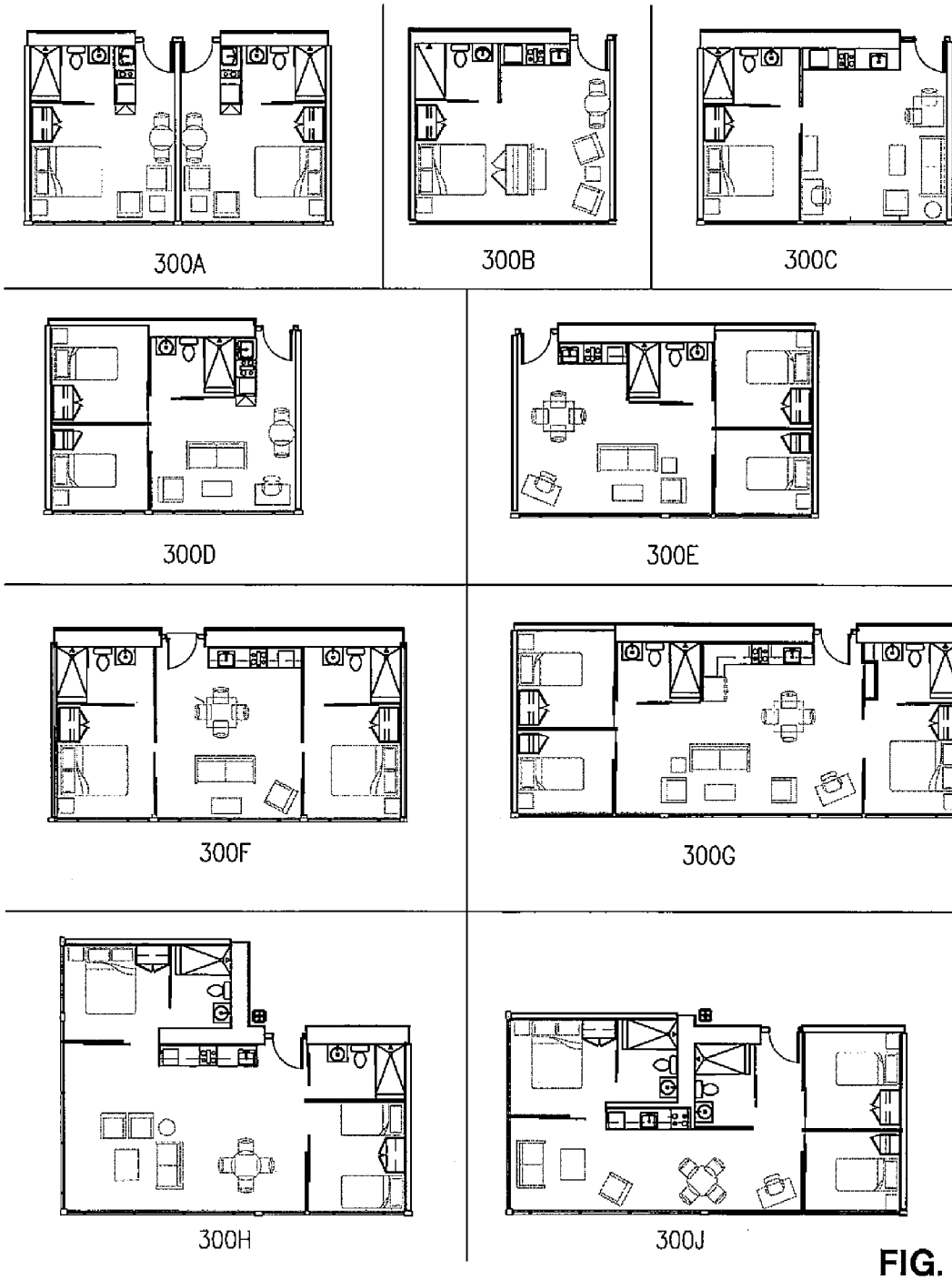
FIG. 6 illustrates various embodiments of a single unit for the building of FIG. 1.

FIG. 5 illustrates a floor plan 200A from FIG. 2 of the building plan 200. The floor plan 200E of the building plan 200 illustrates four, different layout types of units 200E-1 to 200E-7. FIG. 6 illustrates exemplary floor plans 300A-J of the different types of units and layout variations to be implemented into any floor level 210, 220, 230, 240, 250 of a multi-story building 100. An efficiency floor plan 300A is illustrated in the first exemplary unit type. A studio floor plan 300B is illustrated in the second exemplary unit type. A one-bedroom plan 300C, as possible corner units, is illustrated in the third exemplary unit type. A two-bedroom efficiency floor plan 300D, as possible units, is illustrated in the fourth exemplary unit type. A two-bedroom plan 300E, as possible end units, is illustrated in the fifth exemplary unit type. In 300F, a two-bedroom with two bathrooms is illustrated in the sixth exemplary unit type. A three-bedroom with three beds 300G, as possible end units, is illustrated in the seventh exemplary unit type. A two-bedroom with two bathroom floor plan 300H on a corner is illustrated in the eighth exemplary unit type. A three-bedroom with two bathroom floor plan 300J on a corner is illustrated in the ninth exemplary unit type.

Figure 7:
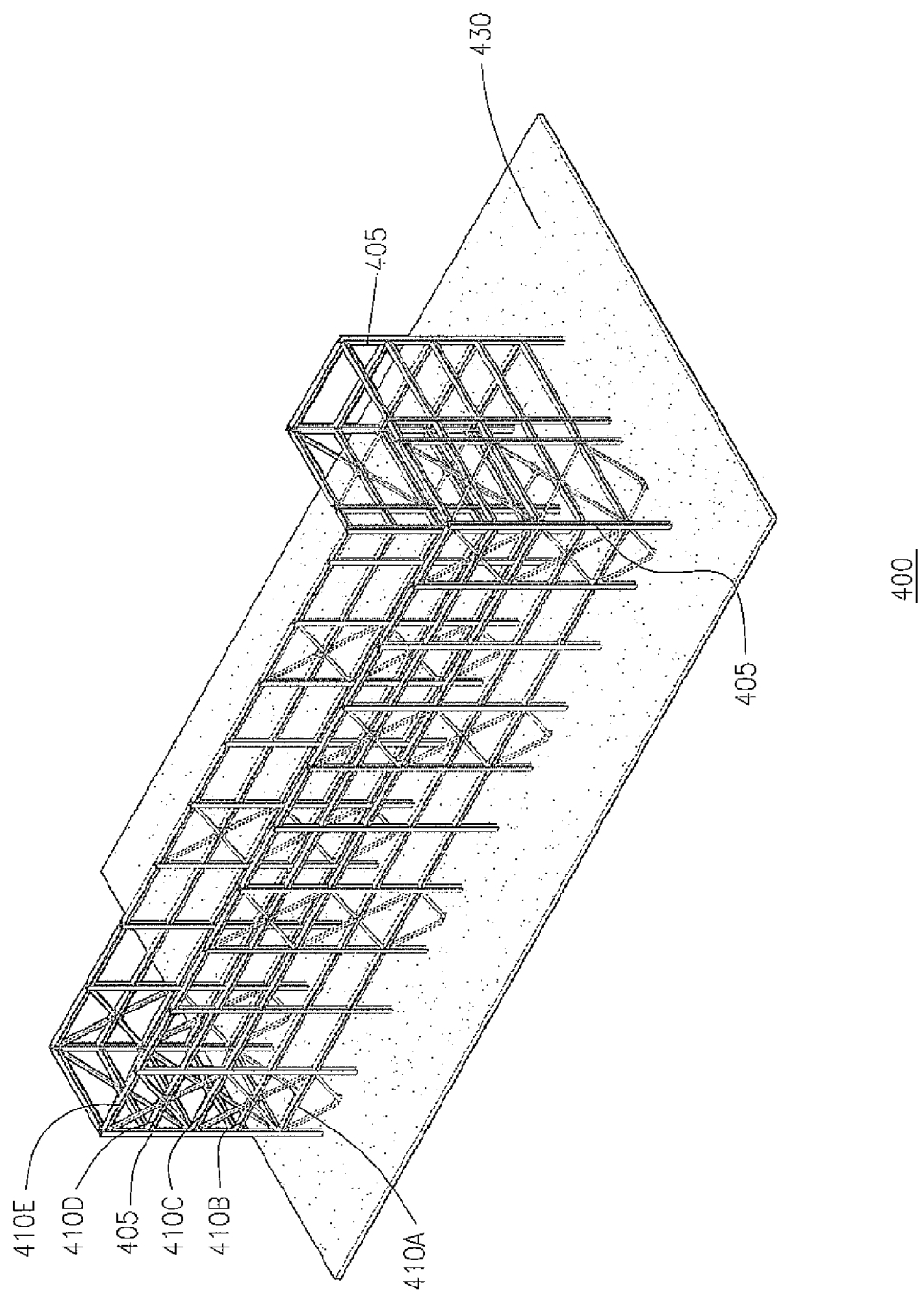
FIG. 7 illustrates the structural framing of the multi-story building of FIG. 1.
Figure 8:
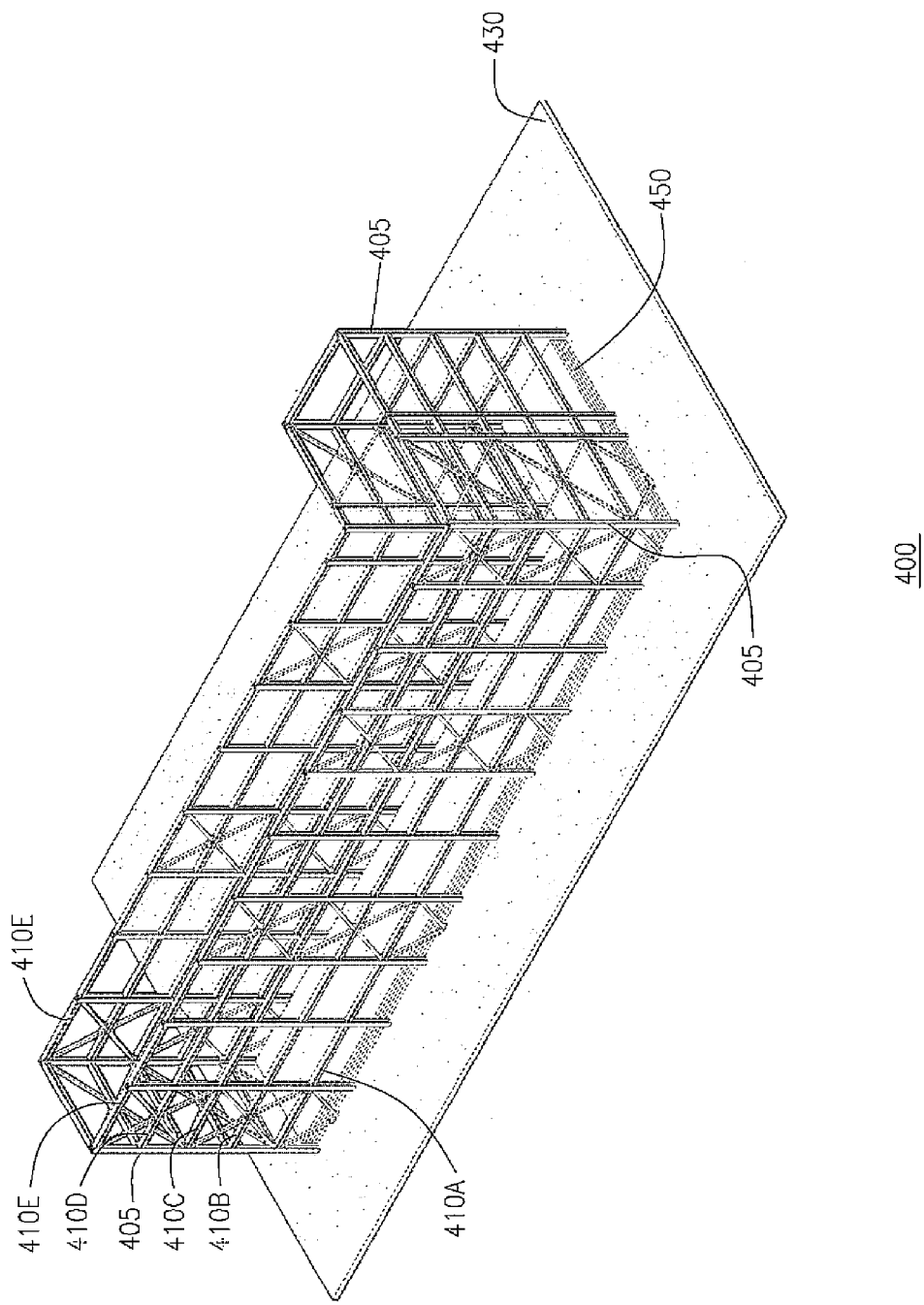
FIG. 8 illustrates the structural framing for the floor and ceiling assembly before the floor and ceiling slabs are assembled into place.
Figure 9:
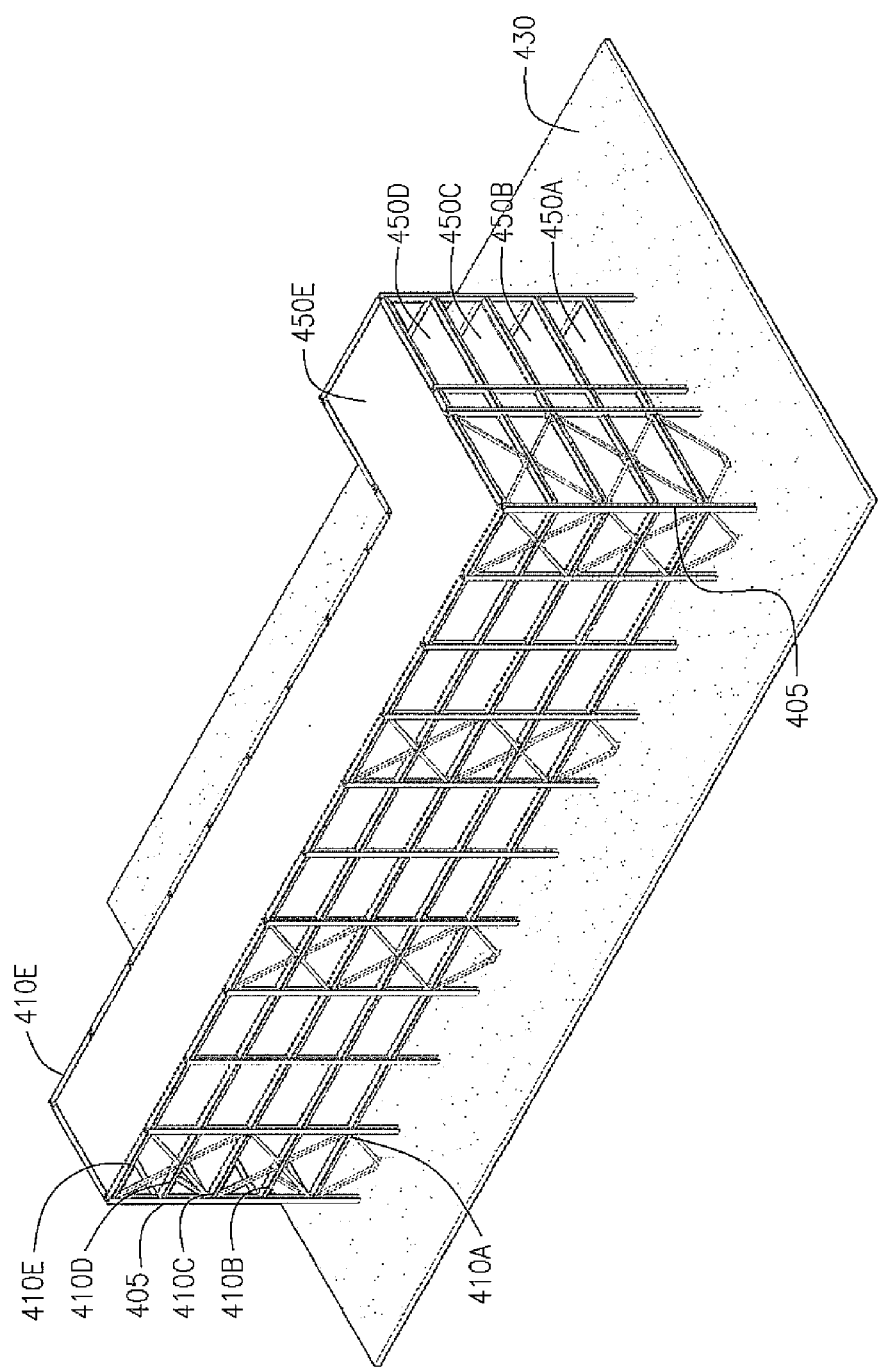
FIG. 9 illustrates the structural framing for the floor and ceiling assembly after the floor and ceiling slabs are assembled into place.

The construction of the multi-story building 100 is described in detail for the load bearing assembly of the structural frame 400, and floor and ceiling slabs 450. More specifically, FIG. 7 illustrates the structural frame 400 of the exemplary multi-story building 100 of FIG. 1. The structural frame 400 material of the present invention is preferably steel even though other materials with similar strength and durability may be used for constructing the building 100. The structural frame 400 can also be made out of concrete or concrete masonry unit. Therefore, utilizing steel or concrete for the structural frame 400 is not meant to be limiting. Vertical columns 405 and lateral bracing are used for this load bearing assembly of the structural frame 400. Structural steel framing occurs only at the perimeter of the building's slabs. All primary steel framing members are positioned exterior to the building for providing support. Any number of structural framing can be delivered only to be limited in size by shipping or trucking restrictions. The steel framing 400 is delivered to the site in as-complete-of-an-assembly as possible. Vertical columns 405 are commonly hoisted by crane and bolted and braced into place. The steel frame 400 only occurs above the terrace level 210. All of the perimeter steel framing 400 for the building 100 is placed prior to pouring any of the building's slabs 450 (as shown in FIGS. 8-9) above the terrace level 210. The horizontal support columns 410A-E are used to hoist and support the building's slabs 450 at their finished elevations which will be described in more detail in FIGS. 8-9.

For preconstruction and excavation prior to building the structural frame 400, conventional methods of surveying, excavation and shoring may be utilized that are appropriate for the existing soil/ground conditions and preferred depth required for excavation. For example, deeper excavation requires shoring and possible below-grade waterproofing. Shoring may be constructed using concrete or wood depending on the best option for the area. Locating, trenching and extending the existing utilities to the new structure utilize conventional methods of construction and occur in conjunction with excavation and construction of the foundation.

For foundation construction, including basements, if applicable, footing is first applied and spread and matted evenly. Any forming, reinforcing, and casting of footings and foundation walls utilize conventional methods of concrete construction. For basements formwork and reinforcing of below-grade walls may utilize conventional slip-form concrete construction. Slip-form construction refers to a method by which large towers or bridges are built from concrete by pouring concrete into a form and moving the hardened concrete. Typically, slip-form construction minimizes the materials used in formwork and labor, and reduces the amount of concrete waste produced. Slip-form construction also allows for the foundation walls to be erected with the rapid speed with minimal amount of concrete waste. Unlike other concrete methods, slip-form construction does not produce overshot concrete structures and requires very little clean-up or hauling away of waste concrete product. All site utilities will be extended to the building's service points while staged and protected for future connections. Similarly for elevator and stair foundation, excavation and forming of the foundation for the elevator and stair systems are carried out in conjunction with the rest of the building's excavation and forming. Formwork is properly placed, reinforcement added, and the foundation concrete may be placed and finished.

For concrete slab on grade construction, conventional construction practices are utilized. A slab-at-grade may occur either at the basement level or at grade level if no basement is built. Utilities are extended so that they are 6 to 8 feet above the top of the slab either at the basement level or at grade level. Once this step is finished, the steps of placing the backfill, providing compaction, installing gravel, positioning vapor barrier if required for local geotechnical review and securing the slab reinforcement to be followed by placing and finishing the concrete slab. If a particular design incorporates below-grade parking, the step of constructing a ramp is to be implemented. Alternatively, the step of constructing a ramp can occur after the slab-on-grade is positioned into place. Typically, the ramp's formwork is placed and followed by the step of securing and installing of the slab reinforcement. After these steps, the ramp's concrete slab may be placed and finished.

Assuming that only one level of parking is constructed below-grade, the steps of positioning the shoring and forming the slab at-grade level are carried out after the basement slab and ramp are placed. Afterwards, the steps of securing slab reinforcement, any block-outs, or sleeves required for the building's mechanical, plumbing, electrical, communications, site planter drainage, irrigation, parking control systems and electrical connections for security and lighting are implemented. The steps of pouring, finishing and sealing concrete are then implemented. If commercial or retail level is being considered for the at-grade level, then the concrete slab at the second story is placed by conventional shoring and forming methods.

For constructing a plaza 110 for retail at the street level with an exterior courtyard, a residential terrace may be constructed at the level immediately above the retail level as shown in FIGS. 1, 3-4. Conventional methods for cast-in-place concrete construction are used for all construction up to, and including the terrace level slab. Cast-in-place concrete construction has been in use for foundations, slabs-on-ground, structural support such as walls, beams, columns, floors, roofs, large portions of bridges, pavements, and other infrastructures by transporting concrete in its unhardened state to the site for placement in forms. Similar to previous conventional methods, the step of placing slab reinforcement, any block-outs or sleeves required for the building's mechanical, plumbing, electrical and communications systems as well as any walkway drains, and electrical connections for security and lighting are implemented. Once reinforcement and block-outs are placed, concrete can be placed, finished and sealed. All columns for the plaza at the street/retail level 110 utilize cast-in-place concrete construction. The reinforcement for the columns is placed first. Thereafter, the column formwork is placed before pouring the concrete for forming the columns. These steps are carried out prior to erecting any shoring for the terrace slab 205. Shoring is then placed to support any decking made of wood or other similar materials and other formwork for the terrace slab 205 at the second story level above the plaza/retail level 110. This step is followed by the step of placing the slab reinforcement, any block-outs or sleeves required for the building's mechanical, plumbing, electrical and communications systems as well as for any courtyard drains, irrigation supply lines and electrical connections for security and lighting. Once the reinforcement and block-outs are placed, the terrace slab of concrete 205 is placed, finished and sealed.

The next sequence of steps involves installation of elevators and stairs. The pre-fabricated, pre-bundled stairs with pre-assembled sections is delivered to the site. Lower sections of the stairs are set and anchored into place simultaneously with the placement of the street level slab or at-grade slab 430. The logical installation of the stairs will track closely with the installation of the building's vertical columns 405. Installation of the structural framing for the elevator enclosure will track in conjunction with installation of the rest of the building's vertical columns 405.

FIGS. 8-9 illustrate the steps of forming the floor and ceiling slabs 450 and placing the floor and ceiling slabs 450 at each level by lifting up the slabs 450A-E and securing the slabs 450A-E at its appropriate elevation level. The floor and ceiling slabs 450 above the plaza/retail level 110 utilize a method of construction wherein the slab formwork is reused. Determining whether the slabs are poured one-on-top-of-the-other and hoisted to their appropriate elevation, or the roof slab is placed first and then the formwork is lowered after the placement of each slab, depends on a general contractor's decision based on the local conditions and logistics of each site. The preferred method is pouring the slabs 450 one-on-top-of-the-other which are then hoisted to their appropriate elevation level. In the preferred method, a bond braking solution is applied to the surface of the lower slab between each pour of the slab to ensure adequate separation between the slabs 450A-E. Each floor slab 450A-D will use steel channels as an edge form. These channels are cast into the slab 450A-D to create the finished edge of the slab 450A-D.

Upon constructing the structural steel columns, the casting of the typical floor and roof slabs may begin. If using the plaza/retail level 110 slab as a base, the building's typical floor slabs and the roof slab are poured one on-top-of the other, using the slab 450 below as the formwork for the slab 450 above. All of the slabs 450 will remain stacked on the plaza/retail level 110 surface until the slabs 450 have cured and reached the desired design strength. Upon curing, the slabs 110 are ready to be hoisted or lifted up to their finished elevation via a series of strand jacks mounted on the load bearing steel framing. Upon creating all of the slabs 450, each of the floor and ceiling slabs 450 will then be lifted or hoisted up to the appropriate elevation level via strand jacks that are mounted on each horizontal column 410A-410E so that every slab 450 is securely positioned and attached at every level of the building so that a plurality of non-weight bearing walls 505, 520, 535, 510, 515 (as described later), a plurality of interior components 555, 525, 562, 565, 567, 568, 559, 557, 571, 570, 573 (as described later) and a plurality of exterior components 730, 800, 803, 815 (as described later) are installed at every level in between a floor slab and a ceiling slab 450A-E at each level.

The present construction system and method of constructing energy efficient multi-story buildings with a plurality of units comprises: premanufacturing a plurality of non-weight bearing walls, the plurality of non-weight bearing walls with finished exterior including all electrical, insulating, plumbing and communications components; premanufacturing a plurality of interior components adapted to connect to the plurality of non-weight bearing walls; premanufacturing a plurality of exterior components adapted to attach to exterior surfaces of the multi-story building; transporting the premanufactured and prefinished plurality of non-weight bearing walls, the plurality of interior components, and the plurality of exterior components to a building site; preparing a foundation for the multi-story building at the building site for providing support to a plurality of load-bearing structural columns; constructing the plurality of load-bearing structural columns of the building at the building site; forming floor and ceiling slabs to attach to the plurality of structural columns at each level of the building; lifting each of the floor and ceiling slabs to attach to each of the plurality of structural columns at the each level while installing stairs and elevators to attach to the plurality of structural columns and the floor and ceiling slabs; installing the plurality of non-weight bearing walls and the plurality of interior components between the floor and ceiling slabs at the each level of the building; installing the plurality of exterior components on exterior surfaces of the building; and installing stairs and elevators to attach to the plurality of structural columns and the floor and ceiling slabs; wherein the plurality of non-weight bearing walls, the plurality of interior components, and the plurality of exterior components are assembled and installed to provide the energy efficient multi-story building with the plurality of units with different floor plans and optionally a retail level with underground parking.

Using the first method of construction, the step of installing the plurality of non-weight bearing walls, the plurality of interior components and the plurality of exterior components for a plurality of standard single units comprises: installing exterior window walls on exterior sides of the plurality of standard single units and partially enclosing each of the plurality of standard single units; installing demising walls in a perpendicular direction interfacing with the exterior window walls and partially enclosing the each of the plurality of standard single units; installing utility walls on the interior sides of the plurality of standard single units in a perpendicular direction interfacing with the demising walls and connecting with the demising walls to completely enclose the each of the plurality of standard single units; installing end walls on the exterior sides of the plurality of standard single units at ends of the building in a parallel direction as the demising walls and completely enclosing the each of the plurality of standard single units located at the ends of the building; installing bathroom floor pans into a preformed recess within the floor and ceiling slabs in the each of the plurality of standard single units; connecting utilities and plumbing fixtures to the utility walls; installing entry doors adjacently positioned by the utility walls; installing interior partitions within the each of the plurality of standard single units for separating rooms and configuring the each of the plurality of standard single units; installing kitchen and bathroom components to the utility walls; installing roof components on top of the building; and assembling exterior walkways depending on the building's configuration.

An alternative method may include lifting the top or roof slab 450E (also referred to as a first ceiling slab) all the way to the top at roof of the building. Immediately after securing the first ceiling slab 450E, a plurality of non-weight bearing walls 520, 535, 510, 515, except for the exterior window walls 505, (as described later) and some of the plurality of interior components 555, 559, 557, 571, 570, 573 (as described later), including the bathroom floor pans 555, kitchen and bathroom components 559, 557, 570, 571, 573 are installed on a second slab 450D beneath the first slab 450E that is not yet lifted and securely attached to the first slab 450E. Upon installation of the plurality of non-weight bearing walls 520, 535, 510, 515 (as described later) and some of the plurality of interior components 555, 559, 557, 571, 570, 573 (as described later), and upon loading of the exterior window walls 505 and rest of the plurality of interior components 525, 562, 565, 567, 568 on the second slab 450D below, the second slab 450D with the plurality of non-weight bearing walls 505, 520, 535, 510, 515, the second slab 450D is lifted or hoisted up under the first slab at the top 450E and securely attached to the first slab 450E to make the top floor or level.

Upon securely attaching the second slab 450D to the first slab 450E, the loaded exterior window walls 505 and the rest of the plurality of interior components 525, 562, 565, 567, 568, including the entry doors 525 and interior partitions 562, 565, 567, 568 are installed to the first slab 450E to complete the top level of the building. A plurality of non-weight bearing walls 520, 535, 510, 515, except for the exterior window walls 505 and some of the plurality of interior components 555, 559, 557, 571, 570, 573, including the bathroom floor pans 555, kitchen and bathroom components 559, 557, 570, 571, 573 are again installed on a third slab 450C beneath the second slab 450D. Similar to the previously described process for constructing the top level, the exterior window walls 505 and the rest of the plurality of interior components 525, 562, 565, 567, 568 are loaded on the third slab 450C below, and the third slab 450C with the plurality of non-weight bearing walls and the plurality of interior components, whether installed or loaded, is lifted up or hoisted up under the second slab 450D to make a level beneath the top level. The exterior window walls 505 and the rest of the plurality of interior components 525, 562, 565, 567, 568 are installed to the second slab 450D after the third slab 450C is securely attached to the second slab 450D. This process of installing and loading the plurality of non-weight bearing walls and the plurality of the interior components is repeated until all the levels of the building is completed. A plurality of exterior components 730, 800, 803, 815 (as described later) are installed on exterior surfaces of the building after the plurality of non-weight bearing walls and plurality of interior components are completely installed.

A method of constructing an energy efficient multi-story building with a plurality of units comprises: (a) premanufacturing a plurality of non-weight bearing walls, the plurality of non-weight bearing walls with finished exterior including all electrical, insulating, plumbing and communications components; (b) premanufacturing a plurality of interior components adapted to connect to the plurality of non-weight bearing walls; (c) premanufacturing a plurality of exterior components adapted to attach to exterior surfaces of the multi-story building; (d) transporting the premanufactured and prefinished plurality of non-weight bearing walls, the plurality of interior components, and the plurality of exterior components to a building site; (e) preparing a foundation for the multi-story building at the building site for providing support to a plurality of load-bearing structural columns; (f) constructing the plurality of load-bearing structural columns of the building at the building site; (g) forming a plurality of floor and ceiling slabs to attach to the plurality of structural columns at each level of the building; (h) lifting a first slab from the plurality of floor and ceiling slabs up to top of the building; (i) installing the plurality of non-weight bearing walls other than exterior window walls and some of the plurality of interior components on a second slab located beneath the first ceiling slab; (j) loading the exterior window walls and rest of the plurality of interior components on the second slab; (k) lifting the second slab with the plurality of non-weight bearing walls and the plurality of interior components whether installed or loaded immediately beneath the first ceiling slab; (l) attaching securely the second slab to the plurality of structural columns located immediately below the first slab to form a top level; (m) installing the exterior window walls, the rest of the plurality of interior components to the first slab to complete the top level; (n) repeating steps (i) through (m) until all levels of the building are completed; (o) installing a plurality of exterior components on exterior surfaces of the building; and (p) installing stairs and elevators to attach to the plurality of structural columns and the floor and ceiling slabs; wherein the plurality of non-weight bearing walls, the plurality of interior components, and the plurality of exterior components are assembled and installed to provide the energy efficient multi-story building with the plurality of units with different floor plans and, optionally, a retail level with underground parking.

Using the second method of construction, the step of installing the plurality of non-weight bearing walls, the plurality of interior components, and the plurality of exterior components for a plurality of standard single units comprises: (a) installing demising walls and partially enclosing the each of the plurality of standard single units; (b) installing utility walls on the interior sides of the plurality of standard single units in a perpendicular direction interfacing with the demising walls and connecting with the demising walls to partially enclose the each of the plurality of standard single units; (c) installing end walls on the exterior sides of the plurality of standard single units at ends of the building in a parallel direction as the demising walls and substantially enclosing the each of the plurality of standard single units located at the ends of the building; (d) installing bathroom floor pans into a preformed recess within the floor and ceiling slabs in the each of the plurality of standard single units; (e) installing kitchen and bathroom components to the utility walls; (f) connecting utilities and plumbing fixtures to the utility walls; (g) loading exterior window walls, entry doors and interior partitions on the second floor slab before securely attaching the second slab to the plurality of structural columns located immediately below the first slab; (h) installing the exterior window walls on exterior sides of the plurality of standard single units and to the first slab completely enclosing each of the plurality of standard single units after securely attaching the second slab to the plurality of structural columns located immediately below first slab; (i) installing the entry doors adjacently positioned by the utility walls and to the first slab after securely attaching the second slab to the plurality of structural columns located immediately below the first slab; (j) installing the interior partitions within the each of the plurality of standard single units for separating rooms and configuring the each of the plurality of standard single units, and to the first slab after securely attaching the second slab to the plurality of structural columns located immediately below the first slab to complete the top level; (k) repeating steps (a) through (j) until all levels of the building are completed; (l) installing roof components on top of the building; and (m) assembling exterior walkways depending on the building's configuration.

Upon suspending the slab 450A-E at its appropriate elevation level, each slab 450A-E is bolted to the vertical columns 405 which are load bearing steel framing. For example, the first floor and ceiling slab 450A is held and supported by the vertical columns 405 at the first horizontal support column 410A. The second floor and ceiling slab 450B are held and supported by the vertical column 405 at the second horizontal support column 410B. The third floor and ceiling slab 450C is held and supported by the vertical columns 405 at the third horizontal support column 410C. The fourth floor slab 450D is held and supported by the vertical columns 405 at the fourth horizontal support column 410D. The fifth floor slab 450E is held and supported by the vertical columns 405 at the fifth horizontal support column 410E. Conventional steel reinforcing bars can be used in the slabs 450A-E. The span of the slab 450A-E is set at a distance that can be supported within the depth and width of the slab 450A-E. Upon placing the slabs 450A-E at appropriate elevation levels, they will fully support their spans without the use of supplemental beams or columns. Electric radiant heat coils can be incorporated into the concrete floor and ceiling slabs 450 to heat each unit.

The structural, floor and ceiling slabs 450A-E act as the finished floor slab for the unit above and the finished ceiling slab for the unit below. The floor and ceiling of the units are exposed surfaces of concrete slabs 450A-E. Acoustical isolation at the slabs 450A-E is achieved by requiring the tenant to provide throw rugs or other approved floor covering over minimal area of the slab 450A-E.

FIGS. 10A-B illustrate a components plan of an exemplary studio unit 300B for various walls and components before and after assembly. As shown in FIGS. 10A-B of the exemplary studio unit 300B, the studio unit 300B is enclosed by the exterior window walls 505B, exterior window wall panels 505G, demising walls 520A-B, utility wall 535. The studio unit 300B further includes interior components such as a kitchen unit 570, bathroom floor pan 555, bathroom vanity 557, toilet 559, shower base 560 with first and second bathroom wall finishes 563A-B and its first and second shower partitions 562A-B, and reconfigurable partition 565 separating the bathroom from the kitchen area. The exterior window wall panels 505G are used as fillers and positioned inbetween the exterior window walls 505B. On the opposing side of the exterior window walls 505A-B in a parallel direction, the utility wall 535 is installed for connecting the bathroom and kitchen components. The entry door 525 is positioned at the right lower-hand corner of the utility plumbing walls 535 for easy entry into the studio unit 300B.

Each of the demising walls 520A-B is positioned directly opposite of each other in a parallel direction to enclose the studio unit 300B. The bathroom floor pan 555 contains a toilet 559, a bathroom vanity 557, and a shower base 560. The bathroom floor pan 555 is positioned in the left-hand corner against the utility wall 535 and the second demising wall 520B next to the kitchen island 575. The shower 566 (later shown in FIG. 26) is partitioned off by the first and second shower partitions 562A-B, and first and second bathroom wall finishes 563A-B. The bathroom is partitioned off by the sliding bathroom door 558 attached to the second shower partition 562B and reconfigurable partition 565 on the lateral side of the bathroom. Immediately adjacent to the bathroom, the kitchen unit 570 is installed against the utility wall 535 that has a stove 572, a kitchen sink 571, and cabinets (not shown in FIG. 10). Other internal furniture such as a bed, desks, chairs, dresser, coffee table, and couches may be placed anywhere.

FIGS. 11A-B illustrate component plans of an exemplary two-bedroom unit for various walls and components before and after assembly. As shown in FIGS. 11A-B of the exemplary two-bedroom unit 300E, the two-bedroom unit 300E is enclosed by exterior window walls 505A-C, exterior window wall panel 505G, demising walls 520A-B, and utility wall 535. The two-bedroom unit 300E further includes interior components such as a kitchen unit 570, bathroom floor pan 555, bathroom vanity 557, toilet 559, shower base 560 with bathroom wall finishes 563A-B and its first and second shower partitions 562A-B, reconfigurable glass partition 567 that separates the bedroom from the living room, and reconfigurable partitions 565A-C further separating each bedroom from the other. Each of the bedrooms can be closed off by closing the slidable bedroom doors 568A-B attached to the reconfigurable partitions 565A-B. Similar to the studio unit, the exterior window wall panel 505G is used as a filler and positioned inbetween the first and second exterior window walls 505A-B.

On the opposing side of the exterior window walls 505A-C and exterior window wall panel 505G in a parallel direction, the utility wall 535 is installed for connecting the bathroom and kitchen components. An exterior wall 510 is also installed adjacent to the utility walls 535 after the first entry door 525. The exterior wall 510 encloses a portion of the first bedroom of the two-bedroom unit 300E. The entry door 525 is positioned and installed at the corner of the utility walls 535 for easy entry into the unit 300E. An entry door 525 may also be located in the exterior wall 510.

The demising wall 520A-B is positioned directly between the units at the end of the exterior window walls 505A-B in a parallel direction to enclose the two-bedroom unit 300E. The bathroom floor pan 555 contains a toilet 559, a bathroom vanity 557, and a shower base 560. The bathroom floor pan 555 is positioned and installed in a pre-fabricated recess (as shown in later figures), wall finishes 563A-B in the middle area against the utility wall 535 next to the kitchen unit 570 with the kitchen sink 571, stove 572, countertop, and cabinets (as shown in later figures). The shower base 560 is partitioned off by the first and second shower partitions 562A-B. The bathroom is partitioned off by the sliding bathroom door 558 that is attached to the second shower partition 562B and reconfigurable partitions 565A-B on each lateral side of the bathroom. Immediately adjacent to the bathroom, the kitchen unit 570 is installed against the utility wall 535 that has the stove 572, sink 571, and cabinets. Other internal furniture such as a bed, desk, chair, dresser, coffee table, and couches may be placed anywhere.

Alternatively, FIGS. 11C-D illustrate component plans of a second exemplary two-bedroom unit for various walls and components before and after assembly. For example, the exterior wall 510 is interchangeable with different walls such as using two layers of exterior walls 510A-510B. The reconfigurable glass partition 567 that separates the bedroom from the living room is interchangeable with a regular reconfigurable partition 565A. Any of the layouts are flexible and walls as well as components can be changed around.

FIGS. 12-13 illustrate an overview of wall construction of the units of the present invention. In an effort to keep the construction as efficient as possible for on-site staging, storage of materials, walls and components are minimal. All of the fundamental elements of the building are delivered to the site as pre-fabricated and pre-finished components. These pre-fabricated and pre-finished components include all exterior walls, demising walls, interior partitions, all kitchen and bathroom units, and other components. Walls are typically delivered as large a component as possible and unless noted otherwise, are hoisted directly from the truck to their final location for immediate installation.

Figure 12C:
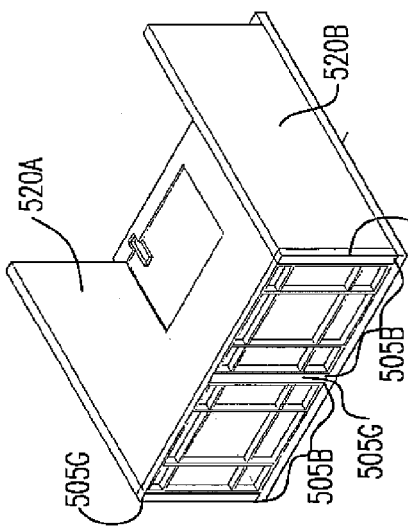
Figure 12B:
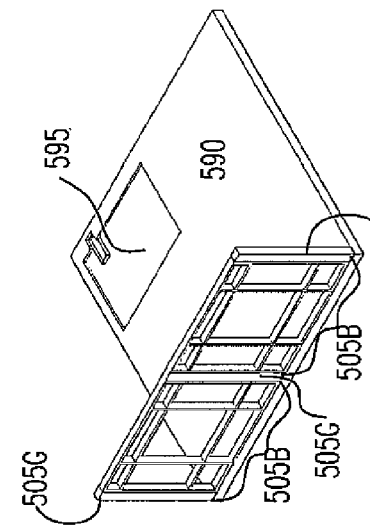
Figure 12A:
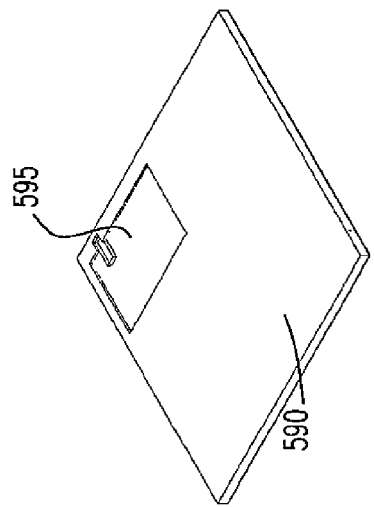

More specifically, FIGS. 12A-F illustrate a perspective view of different phases of assembling an exemplary studio unit and its interior components. FIG. 12A illustrates an exemplary studio unit floor 590 of the slab with a recess 595 for the bathroom floor pan 555. After the slabs 450 are in place the demising walls 520A-B are delivered to the site. Each of the demising walls 520A-B is hoisted as a single wall component and staged in the studio unit. In this particular embodiment, the demising wall 520 is single 19'-0" long component. However, depending on the overall plan, the dimensions of the demising wall 520 are easily changeable and not limited to these dimensions. The demising walls 520A-B are merely positioned and are not installed until installation of the exterior window wall 505 is complete. As shown in FIG. 12B, the demising walls 520A-B are delivered to the site as a preassembled, prewired and prefinished component with sprinklers.

Figure 12F:
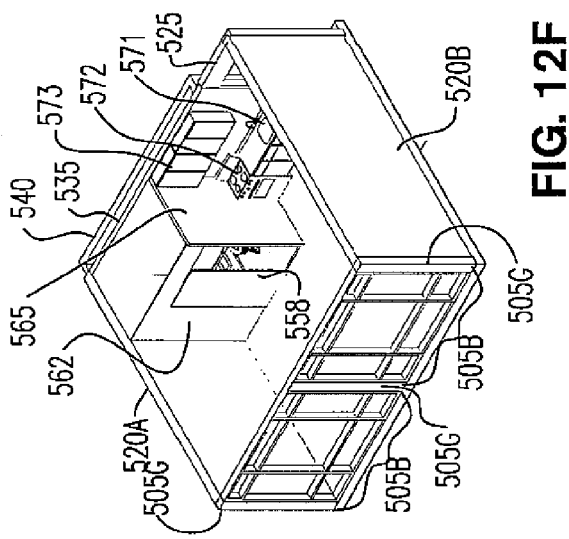
Figure 12E:
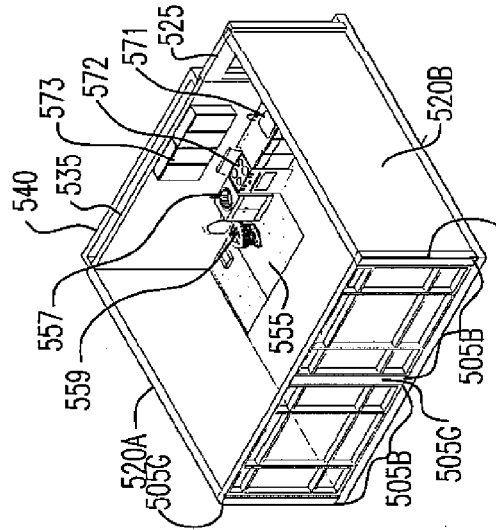
Figure 12D:
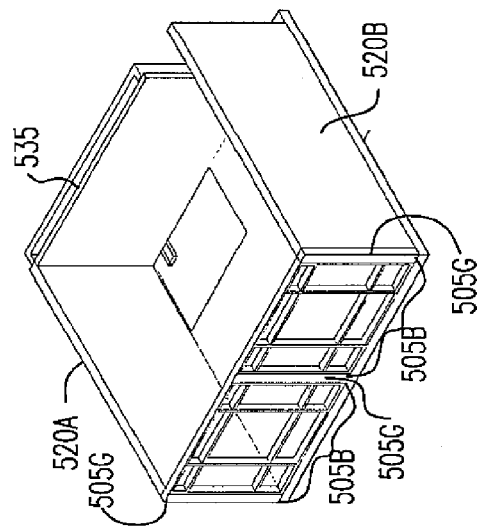

As shown in FIG. 12C, the demising walls 520A-B are installed to enclose the studio unit. In the next step as shown in FIG. 12E, the bathroom floor pan is fitted into the recess 595 before installing the bathroom and kitchen components. As shown in FIG. 12D, a utility wall 535 is installed so that a toilet 559 and a bathroom vanity 557 can be installed on top of the bathroom floor pan 555 and against the utility walls 535. Immediately adjacent to the bathroom, a kitchen unit 570 with a stove 572, cabinets 573, kitchen sink 571 with a countertop. As shown in FIG. 12F, the reconfigurable partition 565 separates the bathroom from the kitchen. The shower partition 562 separates the shower 566 and bathroom 553 from the living space area. The entry door 525 may be installed either after or before installation of the bathroom and kitchen components. The details of attachment of the demising walls 520A-B to the studio unit floor 590 or slab 450 are described in and more readily understood in FIG. 19.

FIGS. 13A-F illustrate a perspective view of different phases of assembling an exemplary two-bedroom unit. Similar to assembling the studio unit as shown in FIGS. 12A-F, the demising wall 520 that is delivered to the site as a preassembled, prewired and prefinished component is hoisted up to the unit and staged to be installed after installation of the exterior window walls 505A-C. As shown in FIG. 12B, the bathroom floor pan 555 is similarly fitted into the recess 595 for easily installing the bathroom components. A utility wall 535 is installed to enclose the two-bedroom unit. All the internal bathroom and kitchen components are similarly installed as described in FIG. 12. The two bedrooms are separated from each other by a first reconfigurable partition 565A. Each of the bedroom is separated from the living space by second and third reconfigurable partitions 565B-C. Each of the second and third reconfigurable partitions 565B-C have an attached sliding bedroom door 568 for privacy. The bathroom also has a sliding bathroom door 558 that is attached to the shower partition 562 that also separates the bathroom. The second reconfiguration partition 565B is interchangeable with a reconfigurable glass partition 567 for allowing more light into the bedroom. On the side of the utility walls 535, an entry door 525 within an exterior wall and an exterior wall 510 are installed to fully enclose the two-bedroom unit.

As shown in FIG. 13C-F, there are two types of insulated walls, including but not limited to the exterior window walls 505A-C. These exterior window walls 505 are delivered to the site as pre-assembled and pre-finished components for rapid installation. Exterior window walls 505A-C are installed on the exterior sides of the units one right after the other at the general contractor's discretion. Upon installing the exterior window walls 505A-D, they provide a fully weather-sealed, exterior wall system for the plurality of units.

FIGS. 14A-G illustrate side and top views of various configurations of the exterior window walls 505 for various units. The exterior window walls 505A, 505B, 505D, 505E and 505F have operable windows 509 for easily opening the windows for outside access. The operable windows 509 are swinging, sliding or other mechanisms by which windows are opened. In this exemplary embodiment, the exterior window wall 505C does not have a swinging or sliding window 509. The operable windows 509 may be opaque windows so that light is not easily penetrated or clear windows. Any of these exterior window walls 505 may be installed to accommodate different layouts of units. All of the exterior window walls 505 are delivered to the site for rapid installation.

FIGS. 15-16 illustrate sectional details of structural members for attaching exterior window walls 505, 605 to the structural frame 600, 610 and slab 650. The top and bottom exterior window walls 605A, 605B are each supported at the edges by support members 610A, 610B. In order to install exterior window walls 605A, 605B, an anchor 612 in the shape of an L with outer ledges bent inwardly is first placed and anchored to the slab 650 by vertically inserting a fastener 621A at the middle portion of the bottom side of the anchor 612 into the slab 650. The top anchor block 625A within the slab 650 receives and catches the first fastener 621A to firmly secure the anchor 612 to the slab 650. The anchor 612 is positioned on and anchored to the slab 650 to leave room for at least half of a large flashing 655 to fit on the remaining portion of the slab 650 towards the edge. Flexible, large flashing 655 is shaped around the adjacent components to make a step-like structure with two upper and lower horizontal portions and two upper and lower vertical portions. The flexible, large flashing 655, which is waterproof, is positioned immediately next to the anchor 612 so that the exterior, vertical side of the anchor 612 fits with the upper vertical side of the large flashing 655 and the lower horizontal portion of the large flashing 655 fits snugly on the slab 650. Half of the lower horizontal portion of the large flashing 655 protrudes out at the edge of the slab 650 as shown in FIGS. 15-16.

A slip member 630 is then anchored firmly to the underside of the slab 650 at the ceiling portion or the head portion of the exterior window wall 605B. The slip member 630 is shimmed so that it is perfectly level to receive the bottom exterior window wall 605B with the head support member 611B and rests at its exact elevation. The exterior window walls 605A, 605B are constructed to allow approximately 5/8" of shim space at the top and bottom for leveling and alignment. A third fastener 621C is used to attach a head wedge 615B to the underside of the slab 650. The bottom anchor block 625B within the slab 650 receives and catches the third fastener 621C to firmly secure the slip member 630 to the slab 650. The small flashing 617 is used to seal the head wedge 615B. Upon anchoring the slip member 630A to its proper position under the slab 650, the exterior window wall 605B with the head support member 611B is inserted into the slip member 630A. Upon securing the head portion of the exterior window wall 605B with the slip member 630B, the bottom portion of the exterior window wall 605A is positioned tightly against the anchor 612 and at the bottom side (not shown in this figure) of the exterior window wall 605B. As shown in FIG. 16, a bottom wedge 615A is attached on top of the slab 650 with the large flashing 655 inbetween before positioning the exterior window wall 605A against the anchor 612.

The exterior window walls 605 already have integrated insulating panels 630 which are already included during manufacturing. Therefore, the exterior window walls 605 are installed and enclosed by trims 617 without a need to place any insulating panels 620 around the horizontal columns 610 to insulate the slab 650 and the exterior window walls 605A-B from outer air and moisture. The completely assembled exterior window walls 605A-B are shown in FIG. 16.

The next method of constructing a building is installing end walls 515, particularly when a unit is located in the middle of a building 101, 102, 103. A living unit that is located in the middle of a building 101, 102, 103, is enclosed between two demising walls 520 that are parallel to one another. In this case, both the demising walls 520A-B with its structural members are placed one after the other. However, for a living unit that is located at the end of a building 101, 102, 103, the end unit requires installation of an end wall 515 in lieu of a second demising wall 520B or an exterior window wall 505, 605. The preferred sequence is to install the end wall 515 with its structural members immediately following installation of the exterior window walls 505, 605 as shown in previous FIGS. 15-16. This sequence of events helps to enclose the construction as soon as possible.

FIG. 36 illustrates cross-sectional details of end walls 515A-B, before attaching a final panel 661A made of metal or other similar materials to the exterior surfaces of the end walls 515A-B and floor and ceiling slab 650 located inbetween. FIGS. 37A-B illustrate cross-sectional details of end walls of FIG. 36 after attaching the final panel 661A to the exterior surfaces of the end walls 515A-B and floor and ceiling slab 650 located inbetween. An exemplary end wall 515 is composed of 3 5/8" metal stud framing with batt insulation, sprinkler plumbing, electrical, and communications components. The wiring and plumbing are pre-installed at a factory and connected at the site. The interior side of the end wall 515 receives a layer of fire-rated, inner wall panel 657A-B with a finished panel 660. The inner wall panel 657A-B is preferably a 12 mm magnesium oxide board, however, other types of fire-rated wall panels with safety mechanisms may be used and is not meant to be limiting. The finish for the inner wall panel 657A-B may be determined from several options that are available and attached over the interior side of the end wall 515 at a factory to pre-manufacture the end walls 515. An exemplary finish is a finished panel 660 over the inner wall panel 657A-B. Examples of a finish would include stain, paint, an additional layer of magnesium-oxide board, wood vaneer, wood paneling, plaster, metal, wallpaper, and cork among others. The exterior side of the end wall 515 receives a pre-finished metal panel 661 that is also insulated. Furthermore, pre-finished trims 682A-B cover the interior bottom and head portions of the end walls 515A-B. Removable, pre-finished trims 682A-B are placed to conceal the wall insulation and connections of the head and bottom portions of the end walls 515A-B.

A base anchor 612A is securely attached to the slab 650 using a first fastener 621A that is drilled vertically down into the slab 650 for receiving the bottom portion of the end wall 515A. A second anchor 612B is also drilled upwardly into the slab 650 to securely attach the head anchor 612E to the underside of the slab 650. The end wall 515 utilizes a thermally insulated anchors 612A-B that are securely attached to the slab 650 prior to installing the end wall 515A-B. The end walls 515 are suspended via a crane and moved into place from the exterior of the building. The end wall 515A is set onto the slab 650 and secured into place via access from the interior face of the building. Simultaneously, the head portion of the end wall 515B is placed into the slip member 630 and secured in place. In order to secure the head portion of the end wall 515B to the anchor 612B, a third fastener 621C is securely inserted horizontally through the vertical side of the anchor 612B and into the end wall 515B. The vertical portion of the anchor 612B has pre-punched slots (not shown in figures) through which the third fastener 621 is screwed horizontally to accommodate vertical movement of the end wall 515B due to vibration of the slab 650. Consequently, a horizontal gap 673 allows slight, vertical deflection of the slab 650. A vertical gap 672 also allows horizontal movement of the slab 650. These gaps 672, 673 may be filled with fire safing materials 670 prior to attaching the metal panel 661.

A final insulated metal panel 661A and a painted sheet metal trims 665A-B are installed once the end walls 515A-B are securely anchored into place. Normally, the metal panels 661B-C on the exterior side of the end walls 515A-B are pre-manufactured and already attached to the end walls 515A-B. However, the final metal panel 661A is attached after complete installation of the end walls 515A-B to conceal and insulate the exterior edge of the slab 650 located between the two end walls 515A-B.

FIG. 37B illustrates the cross-sectional details of connecting the final metal panel 661A to the other metal panels 661B-C that are already pre-attached to the two end walls 515A-B. The upper portion 662 and lower portion 663 of the metal panels 661 are oppositely identical in that the portions 662, 663 are protruding structures extending around 3" that may fit together with other metal panels 661. The width of the upper and lower portions 662, 663 is about half of the width of the metal panel 661. A clip member 680 shaped as a rigid S is attached to the end wall 515A by a fastener 681 inserted horizontally through the clip member 680 into the end wall 515A. The upper portion of the first clip member 680 that fits vertically into a small, space 677 of the lower portion 663B of the metal panel 661B and holds the lower portion 663B to the end wall 515A. A metal trim 682 is also attached to the end wall 515A by the same fastener 681 that holds the first clip member 680 to the end wall 515A. A latch 684 shaped as an L that protrudes out from the upper portion 662A of the final metal panel 661A. The metal trim 682 catches onto and over the latch 684 to hold the final metal panel 661A to the end wall 515A. Upon installing the final metal panel 661A and the metal trim 682, a backer rod 683 is sealed at the joint between the two metal panels 661A-B and over the panel fastener 681 to cover the joint. The installation of this final metal panel 661A and trim 682 complete the installation of the end walls 515A-B creating a weather-tight and water-tight system.

The next step of constructing a building for the present invention involves placing or installing the demising walls 520A-B as shown in FIGS. 19-25. FIG. 19 illustrates completely installed demising walls 520A-B to the floor and ceiling slab 650. As shown in FIG. 21, the exemplary demising wall 520 has a head section 641A and a base section 641B. The demising wall 520 is composed of staggered 3⅝" metal stud framing 635 with acoustical blanket insulation layer 637, electrical connections 639, sprinklers, and communications components. The acoustical insulation layer 637 is preferably 2" to 3" thick with weave-thru studs and has sound transmission class (STC) rating of at least 55 or higher. The life-safety wiring is pre-installed at the factory and connected at the site of constructing the walls 520 and building. Both sides of the demising wall 520 receive a layer of fire-rated, 12 mm magnesium oxide board finish. The finish for the finish panel 660 may be determined from several options that are available and attached over both sides of the demising wall 520 at a factory when the demising walls 520 are pre-manufactured. An exemplary finish is a finished panel 660A-D such as stain, paint, an additional layer of magnesium-oxide board, wood vaneer, wood paneling, plaster, metal, wallpaper, and cork among others. A preferred application for the inner wall panel 657 is a 12 mm magnesium oxide board, however, other similar fire-rated panels or materials may be used. The head and base sections 641A, 641B are each protected and lines with magnesium oxide boards on the inside for acoustical damping or that are preferably made of similar materials of strength and durability.

As shown in FIG. 22C, the first step of installing the demising wall 520 utilizes pre-finished, acoustically sealed support members 685A-B and fire-insulated, first and second base anchors 686A-B which are secured to the top and under sides of the floor and ceiling slabs 650. As shown in detail in FIG. 22A, the horizontal section of the L-shaped base support member 685A has a pre-drilled hole 688A to receive the base fastener 687A for securely attaching the base support member 685A to the slab 650. Therefore, the base support member 685A is securely attached to the top portion of the slab 650 by drilling the base fastener 687A through the hole 688A, the pad 690 and into the slab 650. The pad 690 is approximately 3½" long that is positioned immediately beneath the horizontal section of the base support member 685A. Adjacent to the pad 690, fire-sealant tape 693A-B is placed on each side of the pad 690 before drilling the base fastener 687A into the slab 650.

As shown in FIG. 23, upon securely attaching the support members 685 to the top and under sides of the slab 650, the entire demising wall 520A is set onto the base support member 685A and secured into place. Simultaneously, the head section of the demising wall 520B is placed adjacent to and inside the head anchors 686B and securely positioned into place. The next step is to insert a support fastener 689A horizontally from the vertical side of the head support member 685B through the demising wall 520B. In FIG. 20-23, the head support member 685B has pre-determined slots (not actually shown in figures) to allow vertical movement from slab 650 vibration after support fastener 689A attachment between the vertical side of the head support member 685B and the head portion of the second wall 641A. In FIG. 24, the next step is to cover the inner side of the demising wall 520A by attaching the trim 682, preferably made of metal or other similar materials. More specifically, the trim 682 is preferably made of aluminum. After the trim 682 is attached, the inner side of the demising wall 520A is backed by a magnesium oxide board. A trim fastener 678 is horizontally inserted into the demising wall 520A.

The next step is filling the horizontal gap 673 created between the underside of the slab 650 and the head portion of the demising wall 520B with fire safing materials 670. The next step is sealing any open spaces between the slab 650 and the base portion of the demising wall 520A with caulk, preferably fire-resistant caulk, to prevent any fire from getting through the space. Caulk or similar fire-resistant material is also used to seal the space between the horizontal portion of the head support member 685B and the head portion of the demising wall 520B whereby the fire safing materials 670 are inserted. This horizontal gap whereby the fire safing materials 670 are filled also allows vertical movement of the slab 650 due to vibration. Upon sealing the open spaces between the demising walls 520A-B and the slab 650, the first and second trims 682A-B are attached on each side of the demising wall 520B at the head portion. Removable, pre-finished pressure-fit trim 682 conceals bottom of the wall connections. The first and second trims 682A-B are substantially Z-shaped with an upper vertical portion and a lower vertical portion connected by an upper horizontal portion. The lower vertical portion also has a perpendicular, lower horizontal portion. The trims 682 also have a preattached fire rated, wall panel on the inside. The lower horizontal portions of the trims 682A-B are inserted between the slab 650, pad 690 and a horizontal portion of the already attached head support member 685B until the inner fire rated wall panel on the trims 682A-B touch the demising wall 520B as shown in FIG. 24. The pad 690 is preferably made of neoprene, however, other types of similar materials can be used. The removable, pre-finished, pressure-fit trims 682A-B conceal the fire-safing 670 and connections.

FIG. 25 illustrates top views and cross-sectional details of the interface between a demising wall 520 with exterior window walls 505 and entry doors 525. In FIG. 25A, a top view of the demising wall 520 interfacing with the exterior window walls 505 is illustrated. The first window member 695A is positioned on the right side of the closure panel 699A after attaching the exterior window walls 505 and window member 695A to the floor and ceiling slab 650 (as described in FIG. 15). Closure panel 699A with integral insulation 696 is slid into place attaching to the window member 695A and then attached at the floor and ceiling slab 650 (as described in FIG. 15). Next exterior window wall 505 with a second window member 695B is placed to the left of the closure panel 699A and secured in the same manner. The first and second window members 695A-B on each side of the closure panel 699A are approximately 10" long and positioned to support the exterior window walls 505 against the demising wall 520. Upon secure attachment of the exterior window walls 505A-B, the demising wall 520 is positioned and secured. Upon secure attachment of the demising walls 520, the rods 698A-D, fire safing 670, trims 691C-D, and fire caulking 674 are provided between the demising wall 520 and the exterior window walls 505A-B. Similarly, the rods 698A-D, trims 691C-D, and fire safing 670 and fire caulking 674 are inserted between the demising wall 520 and the closing panel 699B once the demising walls 520 and entry doors 700A-B are securely positioned perpendicularly. The first door member 700A is positioned on the right side of the closure panel 699B after attaching the exterior window walls 525 and first window member 700A to the floor and ceiling slab 650 (as described in FIG. 35). Closure panel 699 with integral insulation 696 is slid into place attaching to the entry doors 700A and then attached at the floor and ceiling slab 650 (as described in FIG. 35). Next window wall 525 with a second window wall member 700B is placed to the left of the closure panel 699B and secured in the same manner. The entry doors 525A-B are attached on the door members 700A-B on each side of the closure panel 699B. The entry doors 525A-B, more specifically the door portions are swinging doors, are hingedly attached to the door members 700A-B of the closure panel 699B.

FIG. 27 illustrates cross-sectional details of utility walls 535 installed above and beneath the floor and ceiling slab 650 for interior plumbing assembly. The recess 595 for the bathroom floor pan 555 extends underneath the utility wall 535 to allow the drain 556 to connect to a waste-line plumbing inside of the plumbing chase to avoid exposing drain lines at the ceiling slab 650 of the unit below. Each unit 300A-H as shown in FIG. 6 has a utility wall 535 at the end of every kitchen and bathroom. The utility wall 535 houses common mechanical, plumbing and electrical risers that serve the units 300A-H. All of the utilities to and from the units are accessed at the utility wall 535.

The next step of constructing a building is placing or installing utility walls 535. FIG. 29 illustrates cross-sectional details of utility walls 535 attached to the floor and ceiling slab 650. These utility walls 535 are delivered to the site as pre-assembled, pre-plumbed, pre-wired and pre-finished components. As shown in FIG. 29, the utility walls 535 are finished on one side with the fire-rated, inner wall panels 657A-B and the other side with outer metal panels 661A-C. Other possible cladding materials comprise metal panel, cementitious board, phenolic resin board, wood siding, gypsum reinforced fiber cement panels, precast concrete panels, and ceramic tile. The exemplary utility wall 535 is composed of 20 GA metal stud framing 635 at 16" in the center, inner wall panels 657A-B preferably made of 12 mm magnesium oxide board with a water resistant finish on the inner side of the utility wall 535A-B. The utility wall 535 further includes an integrated 2½" acoustical blanket insulation layer 637A-B within the utility wall 535. The utility walls 535 arrive on site with all the wall plumbing associated with the kitchen sink 571, toilet 559, shower 566 already in place. The utility walls 535 also include all plumbing supply, vent and drain lines, shower valves 551, shower head 561 and associated trim. The utility walls 535 further contain the unit's electrical panel 577. The other side of the utility wall 535 is composed of 3⅖" 20 GA metal stud framing at 16" on center, ⅝" fire-rated wall board and, in the preferred application from a range of 2" to 3", if local climate requires it, integrated insulated metal panels with integral air and vapor barrier. The alternative exterior finish includes a layer of ½ cement board with a water resistant finish. Other exterior finish materials include cementitious board, phenolic resin board, wood siding, gypsum reinforced fiber cement panels, precast concrete panels, and ceramic tile.

Installation of the utility walls 535 utilizes a pre-finished, acoustically sealed head bracket member 685A that is substantially shaped as an L, a head anchor 686A at the head portion of the utility wall 535 which are securely attached to the ceiling slabs 650 with a pad 690 inbetween the head bracket member 685A and the ceiling slab 650. Installation of the utility walls 535 further utilizes base anchors 687A-B at the base portion of the utility walls 535 to securely attach to the floor slabs 650. First, the utility wall 535 is set onto the bathroom floor pan 555 of the floor slab 650 as shown in FIGS. 29-30 and secured into place by anchoring the utility wall 535 to the floor slab 650. A first base anchor 687A and a second base anchor 687B through a top anchor block 625 are injected into the floor slab 650 to anchor the utility wall 535 over the bathroom floor pan 555 of the floor slab 650.

Simultaneously, a head anchor 686A is drilled upwardly into the slab 650 by permanently attaching a head bracket member 685B to the underside of the slab 650 for attaching a utility wall 535B. The head anchor 686A may be a bolt or similar attachment means to securely attach the head bracket member 685B to the slab 650. The head portion of the utility wall 535A-B is then securely tilted into the head bracket member 685B while aligning the vertical portion of the angle member 671 with the vertical portion of the head bracket member 685B. The utility wall 535 utilizes a thermally insulated head bracket member 685B that is securely attached to the slab 650 prior to installing the utility wall 535A-B. As shown in FIG. 29-30, the utility wall 535 is tilted during installation of the wall 535 to catch the second head anchor 686B in the slots (not shown in this figure.) on the vertical side of the angle member 671 and through the head bracket member 685B attached above. As shown in FIGS. 29-30, the base portion of the utility wall 535 is anchored directly to the slab 650 via first and second base anchors 687A-B drilled vertically into the slab 650. A horizontal gap 673 created between the underside of the slab 650 and head portion of the utility wall 535 allows slight, vertical deflection of the slab 650. A vertical gap 672 created between the edge portion 651 of the slab 650 and a first metal panel 661A also allows horizontal movement of the slab 650. These horizontal and vertical gaps 672, 673 may be filled with fire safing materials 670 prior to attaching the metal panel 661B.

As shown in FIG. 29, a second head anchor 686B is drilled through the vertical portions of the angle member 671 and the head bracket member 685B in a horizontal direction or perpendicular to the first head anchor 686A to attach the angle member 671 of the utility wall 535B to the head bracket member 685B. The angle member 671 has pre-punched slots on the vertical portion of the L shape to allow any screw, fastener or other means to attach the angle member 671 of the demising wall 535B to the head bracket member 685B to accommodate any vertical movement of the utility wall 535B caused by the vibrational movement of the slab 650. Upon attaching the angle member 671 to the head bracket member 685 at the head portion, a prefinished trim 682D, preferably with a backer board, substantially shaped as a Z or a step-like structure is placed over the head anchor assembly to cover the connections. The inner portion of the utility wall 535 that is adjacent to the shower 566 have a water resistant finish with a metal flashing to prevent water from entering between the bathroom floor pan 555 of the floor slab 650 and the utility wall 535.

Upon securing the utility walls 535, insulated metal panels 661A-C are installed once the utility walls 535A-B are securely anchored into place. Normally, the metal panels 661B-C on the exterior side of the utility walls 535A-B are pre-manufactured and already pre-finished by being attached to the exterior side of the utility walls 535A-B. However, the final metal panels 661A, 661C are attached after complete installation of the utility walls 535A-B to conceal and insulate the exterior edge 651 of the slab 650 located between the two utility walls 535A-B. FIG. 32 illustrates the cross-sectional details of connecting the final metal panel 661A, 661C to the other metal panel 661A that is already pre-attached to the two utility walls 535A-B. The upper portion 662 and lower portion 663 of the metal panels 661 are oppositely identical in that the portions 662, 663 are protruding structures extending out around 3" that may fit together with other, symmetrical metal panels 661. The width of the upper and lower portions 662, 663 is about half of the width of the metal panel 661.

An angle-shaped panel attachment angle 679 is first secured to the utility wall 535B with a fastener 681B as shown in FIG. 31 to allow for the attachment of the final metal panel 661C. A clip member 680 shaped as a rigid S is attached to the utility wall 535A by a panel fastener 681A inserted horizontally through the clip member 680 into the utility wall 535A. The upper portion of the first clip member 680 that fits vertically into a small, space 677 of the lower portion 663B of the metal panel 661B and holds the lower portion 663B to the utility wall 535A. A trim 682 is also attached to the exterior surface of the utility wall 535A by the same fastener 681 that holds the first clip member 680 to the utility wall 535A. The trim 682 is preferably made of metal but other similar materials can be used and is not meant to be limiting. A latch 684 shaped as an L that protrudes out from the upper portion 662A of the final metal panel 661A. The metal trim 682 catches onto and over the latch 684 to hold the final metal panel 661A to the exterior plumbing wall 540A. Upon installing the final metal panel 661A and the metal trim 682, a backer rod 683 is sealed at the joint between the two metal panels 661A-B and over the panel fastener 681 to cover the joint. The installation of this final metal panel 661A and trim 682 complete the installation of the utility walls 535A-B creating a weather-tight and water-tight system.

The next step of constructing a building is connecting utility components and installing fixtures. All of the unit's utility connections occur at the utility walls 535. The electrical and communications main lines run vertically in the utility wall 535. At each unit, the electrical service feeds directly into the utility wall's 535 breaker panel. Wiring connections to other wall components occur via pre-installed wiring. Electrical and communications connections are carried out at the time of installation of each adjacent utility wall 535. In FIG. 28A, a side view of the utility wall 535 is shown without the bath and kitchen components in place. The bathroom floor pan 555 with the drain 556 is set in grout first after installing the utility wall 535. The utility wall 535 has first and second vents 576A-B located respectively in the bathroom 553 and kitchen 569 on top portions of the utility wall 535. The utility wall 535 also has first and second plumbing 580A-B for supply and waste for connecting the bathroom vanity 557 and sink 571A with a sink and kitchen unit 570. There are a plurality of outlets 581A-H located in the utility wall 535 for the bathroom 553 and kitchen 569. The utility wall 535 that arrives on-site also has pre-integrated shower head 561 and shower valves 551.

Figure 28B:
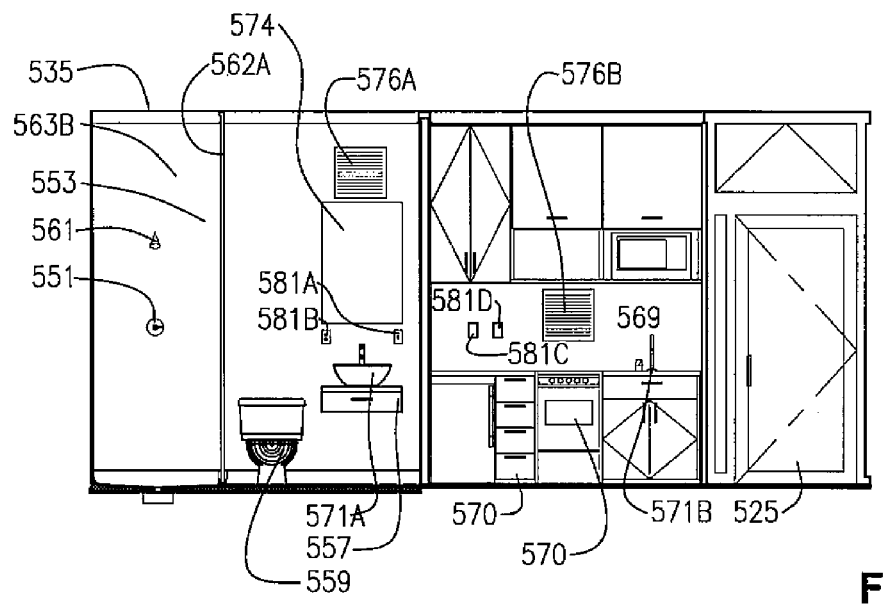
Figure 28A:
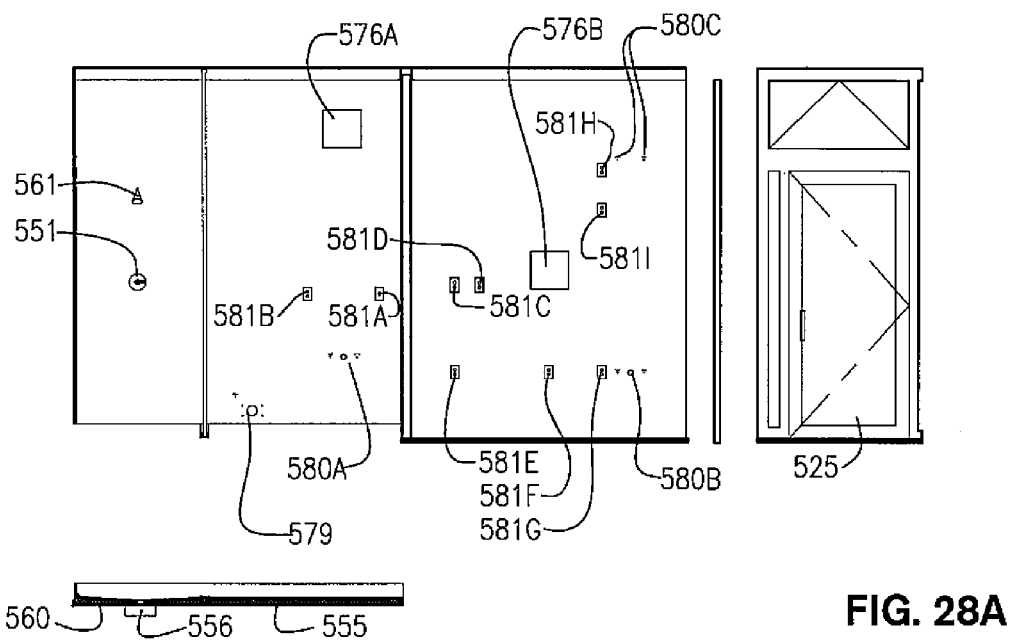

FIG. 28B illustrates the utility wall 535 with bathroom and kitchen components installed on the utility wall 535. Installation of plumbing fixtures occur immediately after utility connections are made to the utility wall 535. Sinks 571A-B are pre-installed in the bathroom vanity 557 and kitchen unit 570. Cabinets 573A-B are delivered and installed immediately after the utility wall 535 is installed. All wiring within a given unit feed back to the unit's electrical panel 577.

The next step of constructing a building is inserting a bathroom floor pan 555 and a shower base 560 with an integral drain 556 into a recess 595 within the floor slab 650. The recess 595 or depression is cast into the slab 650 and shaped to receive the bathroom floor pan 555 and shower base 560. The bathroom floor pan 555 is a pre-cast, pre-formed component with an integral shower base 560 and sloping floors towards the drain 556 for directing water to the drain 556. The bathroom floor pan 555 is field set in grout after the installation of the utility wall 535. In FIG. 26B, the first shower partition 562A is shown to divide the shower 566 portion from the bathroom 553 portion. The toilet 559 and bathroom vanity 557 are also shown. The next step of construction is placing exterior walls 510. Living units that are 30 feet and wider may have a room against the exterior wall 510 at the chase wall side of the unit. If these rooms are to be used as bedrooms, building code may require that a door or window be provided that is large enough to accommodate egress. In these types of conditions, exterior walls 510 can be used. The exterior wall 510 is composed and anchored in exactly the same manner as the end walls 515 as shown in FIGS. 36-37. The exterior walls 510 are provided in a different configuration than the end walls 515 since the exterior walls 510 have a window or door included. Similar to the end walls 515, exterior walls 510 are composed of 3⅝" metal stud framing 635 with batt insulation layer 637, electrical, communications, and life safety wiring which are installed at the factory and connected at the site. The interior side of the exterior wall 510 receives a layer of 12 mm magnesium oxide board or a finish panel 660 (finish to be determined from the several options available) attached over the wall board. The exterior side of the exterior wall 510 receive a pre-finished insulated metal panel 661. The alternative exterior finish materials include cementitious board, phenolic resin board, wood siding, gypsum reinforced fiber cement panels, precast concrete panels, and ceramic tile. The exterior wall 510 utilizes a thermally insulated head anchor 612 with a pre-finished trim 682. These anchors 612 are secured to the ceiling and floor slab 650.

Similar to the end walls 515, the exterior walls 510 are suspended via a crane and moved into place from the exterior of the building. The exterior walls 510 are set onto the floor slab 650 and secured into place. Simultaneously, the head portion of the exterior wall 510 is placed adjacent to the anchor 612 and secured into place. The vertical side of the head anchor 612 has pre-punched slots to allow screw or fastener attachment to occur between the anchor 612 and the exterior wall 510 to accommodate vertical movement caused by vibration of the slab 650. An insulated metal panel 661 and removable, pre-finished metal trim 665 are installed at the head section to conceal the top of exterior wall 510 insulation and connections once the exterior walls 510 are securely anchored into place. The metal panel 661 conceals and insulates the vertical edge 651 of the slab 650. Upon installing the final metal panel 661A and the metal trim 682, a backer rod 683 is sealed at the joint between the two metal panels 661A-B and over the panel fastener 681 to cover the joint. The installation of this final metal panel 661A and trim 682 complete the installation of the exterior walls 510 creating a weather-tight and water-tight system.

The next step of construction is installing the entry door 525. The entry door 525 is a pre-assembled, pre-wired and pre-finished component. The entry door 525 comes with a door portion 705, inner frame 707 to house the door portion 705, outer frame 706 to support the entry door 525, and an operable relight panel 704 positioned above the door portion 705. All associated hardware for the door portion 705 is pre-installed except for thresholds or covers 710 to prevent bottom draft, an outer frame 706, and a closure panel 699. The closure panel 699 is preferably made of aluminum, however, other types of materials can be used to enclose the door assembly. The entry door 525 may come in a right-hand or a left-hand door configuration to accommodate different unit layouts. The entry door 525 has an operable relight panel 704 above the door portion 705. Electrical connections to be made between walls such as the demising wall 520 and the utility wall 535 are made in the cavity between the door portion 705 and the operable relight panel 704. As shown in FIGS. 34-35, the entry door 525 is anchored to the floor via anchor clips 703A-B provided at each side, and the anchor clips 703A-B are used to attach the frames 706, 707 to the floor slab 650.

Upon installing the entry door 525, the anchor clips 703A-B are concealed under the unit's cover 710.

The operable relight panel 704 of the entry door 525 is anchored to the ceiling slab 650 above via a head anchor 612 which is secured to the ceiling slab 650. Attachment of the removable panel 704 of the entry door 525 is very similar to the head connection of the exterior window walls 505, 605 as shown in FIG. 15. The top of the entry door 525 is placed adjacent to the head anchor 612 and securely attached in place. The head anchor 612 has pre-punched slots to allow screw attachment to occur between the anchor 612 and the entry door 525 to accommodate vertical movement caused by vibration of the slab 650. The connection at the head of the entry door 525 is covered by the removable panel 704 placed above the door. The wall cavity above the door houses the electrical connections linking the outlets in the demising wall 520 to the electrical service in the plumbing chase.

Figure 35A:
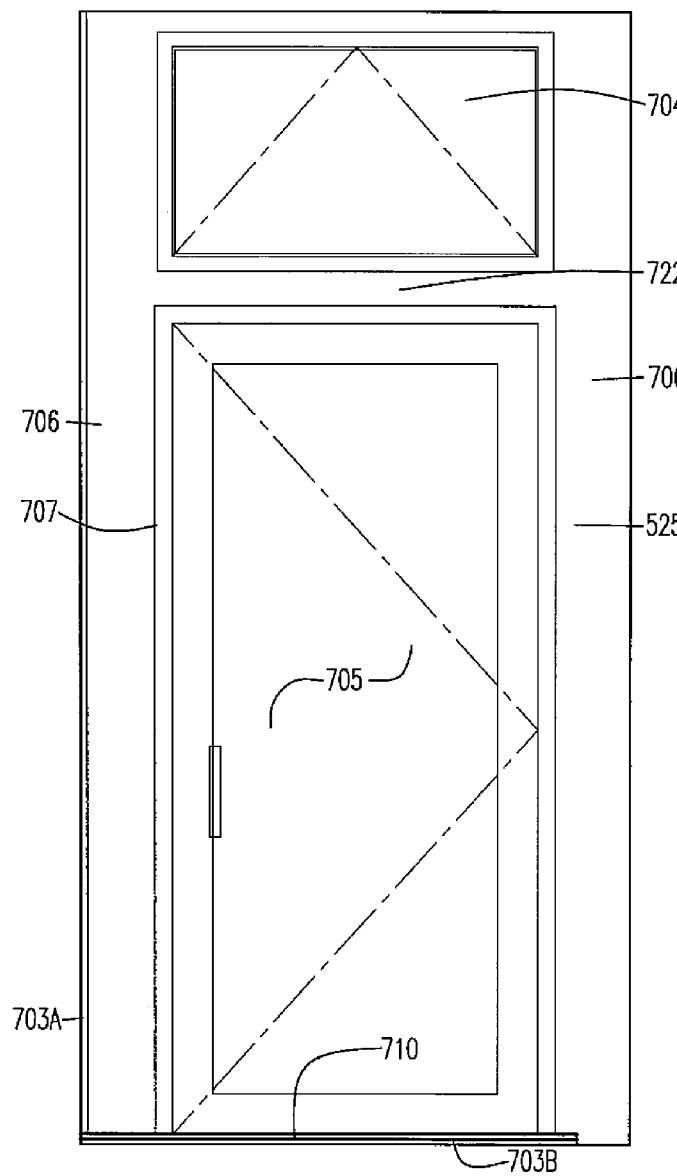
Figure 35D:
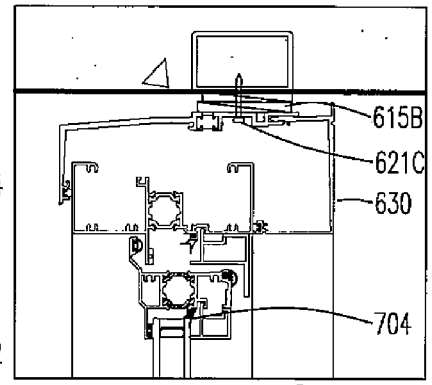
Figure 35C:
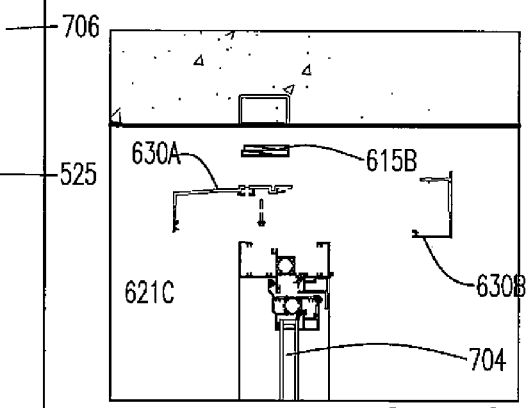
Figure 35B:
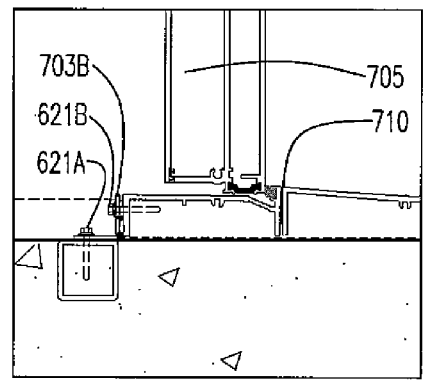

FIGS. 35B-D illustrate attaching the head and base portions of the entry door 525 to the floor and ceiling slab 650. The base portion of the entry door 525 is first set above the floor slab 650 so that the bottom portion 702 of the entry door 525 is sitting in a perpendicular direction from the bottom anchor block 625B as shown in FIG. 35B. The L-shaped anchor clip 703 is touching the front, bottom portion 702 of the entry door 525 and also sitting perpendicularly above the bottom anchor block 625B so that first and second fasteners 621A-B are drilled into the bottom portion 702 of the entry door 525 and bottom anchor block 625B within the floor slab 650. The cover 710 then is installed over the bottom portion 702 of the entry door 525 to make the ground level gradually declining from the door portion 705 to the floor slab 650. At the head portion of the entry door 525, a first slip member 630A substantially L-shaped and a second slip member 630B substantially C-shaped are connected at the top end to be anchored firmly to the underside of the slab 650 at the ceiling portion or the head portion of the entry door 525. The slip member 630 is shimmed so that it is perfectly level to receive the head entry door 525 with the head support member 611B and rests at its exact elevation. The entry doors 525 are constructed to allow approximately 5/8" of shim space at the top and bottom for leveling and alignment. A third fastener 621C is used to attach a head wedge 615B, positioned between the top anchor block 625A and the two slip members 630 to the underside of the slab 650. The top anchor block 625A within the ceiling slab 650 receives and catches the third fastener 621C to firmly secure the first and second slip members 630 to the slab 650. The slip members 630 in turn securely hold both inner and outer sides of the entry door 525 by attaching on both sides as shown in FIGS. 35C-D. A small flashing 617 is used to seal the head wedge 615B.

Upon anchoring the slip members 630A-B to its proper position under the slab 650, the entry door 525 with the head support member 611B is inserted into the slip members 630A-B. Upon securing the head portion of the entry door 525 with the slip members 630A-B, the bottom portion of the entry door 525 is positioned tightly against the anchor 612 and at the bottom side (not shown in this figure.) of the entry door 525. As shown in FIG. 35, a bottom wedge 615A may be attached on top of the slab 650 with the large flashing 655 inbetween before positioning the entry door 525 against the head anchor 612. The wall cavity above the entry door 525 houses the electrical connections linking the outlets in the demising wall 520 to the electrical service in the utility wall 535.

Figures 34A, 34B:
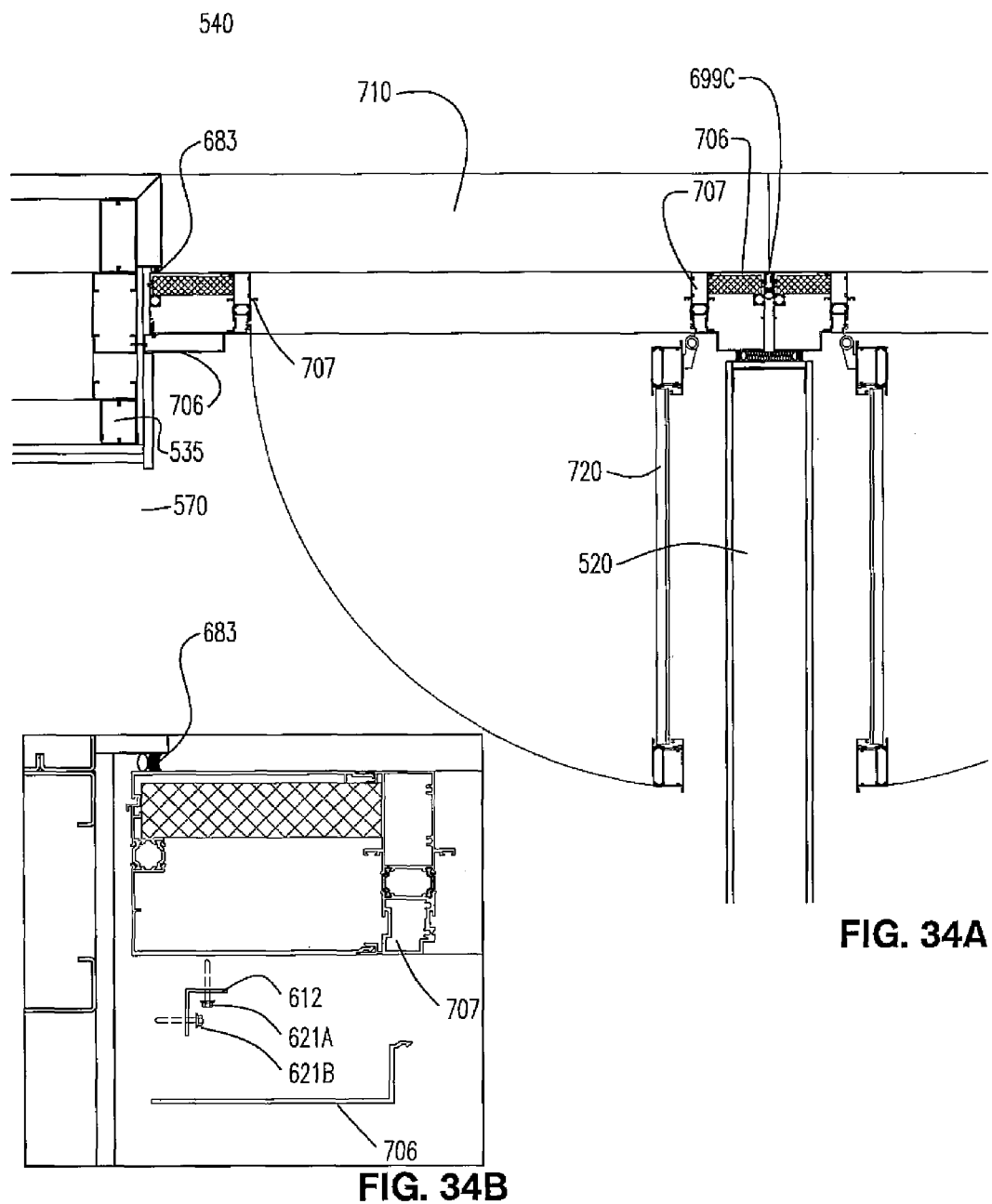

FIGS. 34A-B illustrate top views of the entry doors 525 attached adjacent to the utility wall 535 and perpendicularly attached to the demising wall 520. Two entry doors 525 are currently shown to be installed side by side next to each other. The door portions 705A-B are shown to be swinging doors which are currently open. The door portions 705A-B can be made of glass or any other type of materials. FIG. 34B illustrates a detailed and magnified top view of the outer frame 706 connecting adjacent to the utility wall 535. The head anchor 612 shaped as an L is placed at the perpendicular corner created between the utility wall 535 and the inner frame 707 of the entry door 525 so that the first fastener 621A is drilled through the anchor 612 into the inner frame 707 while the second fastener 621B is drilled through the anchor 612 in a perpendicular direction from the first fastener 621A into the utility wall 535. The anchor 612 therefore anchors the entry door 525 against the right side of the utility wall 535 as shown in FIG. 34B. Upon anchoring the entry door 525 to the utility wall 535, the outer frame 706 is attached over the inner frame 707 to conceal the attachments of the entry door 525 to the utility wall 535. Furthermore, a rod 683 and sealant are used in a channel created between the outer surface of the entry door 525, more specifically the inner frame 707, and the utility wall 535 whereby the entry door 525 was inserted into place before anchoring adjacently to the utility wall 535. On the right side of the entry door 525 whereby the first entry door 525A is adjacently attached to a second entry door 525B and interfacing perpendicularly with a demising wall 520, a closure panel 699C is placed inbetween the two entry doors 525A-B so prevent the space to be left open. As shown in FIG. 34, the closure panel 699C is inserted and attached between the two entry doors 525A-B, more specifically two outer frames 706A-B of the two entry doors 525A-B.

The next step of construction is installing interior partitions 562, 565, 567 and bedroom doors 568 for separating rooms or configuring rooms with different layouts as shown in FIGS. 17-18. Interior partitions 562, 565, 567 and bedroom doors 568 are minimal. In most cases, the interior partitions 562, 565, 567 and bedroom doors 568 are removable, and the location of the partitions is easily adjustable. The two main exemplary types of partitions include 3/8" tempered glass and 3" thick, full-height reconfigurable partitions. Shower partitions 562 for the bathroom are full height 3/8" tempered and frosted glass panels that fit into a head track 713A and are held in place via wall anchors. A sliding bedroom door 568 mounted on a sliding door track 715 at the head portion and sitting over a sliding door guide 716 may also be provided as shown in FIGS. 17-18. Head anchors 612B and bottom anchors 612A are brushed aluminum and attach directly to or drill into the surface of the floor and ceiling slabs 650 as shown in FIGS. 17-18.

At the head portion of the partitions 562, 565, 567 and bedroom doors 568 whereby they attach to the bottom side of the ceiling slab 650, a rigid C-shaped receptor channel 713A is attached to the bottom side of the ceiling slab 560 using a first head anchor 612B. The receptor channel 713A is approximately 2" deep and 2" wide so that the top portion of the partition 565 is inserted at least half way to 3/4" into the receptor channel 713A. Before inserting the partition 565 into the receptor channel 713A and set in place, shims 718 are placed between the vertical portions of the receptor channel 713A and the top portion of the partition 565 to create friction and to provide additional support for securely holding the partition 565 in place. At the receptor channel 713 of the head portion, a continuous rubber glazing gasket 719 will be inserted between channel and partition to secure the panel onto place. Sealant will be provided at vertical wall joints where the glazing acts as a shower enclosure. The partition 565 is anchored to the walls via edge angles (not shown in this figure.).

Figures 17A, 17B:
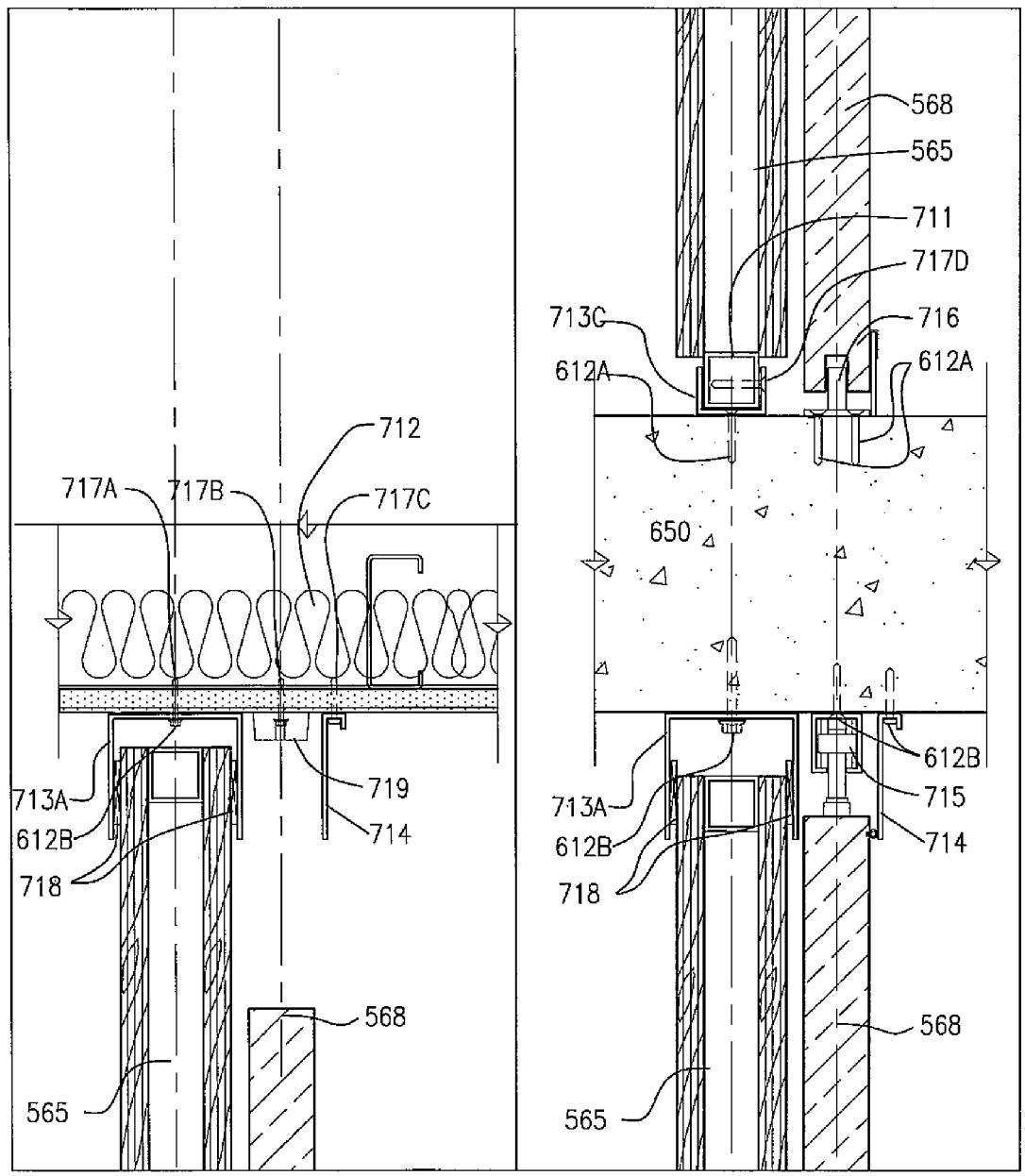

A sliding bedroom door 568, whether made of glass or other materials, is attached to a sliding door guide 715 previously attached to the ceiling slab 650 via a second head anchor 612B. The sliding door guide 715 basically guides the sliding bedroom door 568 at the top portion so that it can slide open and close easily. The sliding bedroom door 568 is suspended from a sliding door track 715 mounted to the underside of the ceiling slab 650. The protruding structure 733 from the top portion of the sliding bedroom door 568 extends into the sliding door track 715 and to catch the sliding door track 715. A trim 714, preferably made of aluminum or other types of materials, is used to attach the top portion of the sliding bedroom door 568 to the underside of the ceiling slab 650 via a second head anchor 612B as shown in FIG. 17B. The top part of the trim 714 is attached directly to the ceiling slab 650 and the bottom, side portion of the trim 714 is attached to top, side part of the sliding bedroom door 568 by linking the hook 748.

At the bottom portion of the partition 565 and bedroom door 568, a bottom receptor channel 713C is attached to the floor slab 650 by a bottom anchor 612A to insert a partition base member 711. The partition base member 711 is fully positioned within the bottom receptor channel 713C so that a third fastener or fastening means 717D is horizontally drilled through the bottom receptor channel 713C and into the partition base member 711 for securely attaching the bottom portion of the partition 565. Furthermore, a sliding door guide 716 is adjacently positioned on the floor slab 650 next to the bottom receptor channel 713C and attached to the floor slab 650 by drilling two bottom anchors 612A through the flat portions of the sliding door guide 716 and into the floor slab 650. The sliding bedroom door 568 has a groove 738 that fits over the protruding sliding door guide 716. An attachment member 739 that extends below the end of the sliding door 568 keeps the sliding door 568 above the ground of the floor slab 650 for easy sliding of the door 568. The majority of the weight of the sliding door 568 will be carried on rollers in ceiling-mounted track 715. This mechanism is typically used between the kitchen and bathroom. The partitions 565 may also be used to help establish privacy between bedrooms. A 4" thick reconfigurable glass wall system will be used where partitions 565 are called for between living and dining areas and bedrooms. In these applications, the sliding aluminum and glass doors are suspended from a sliding door track that is supported by the wall system's vertical mullions.

The next step of construction is installing kitchen and bathroom components. As shown in FIGS. 28A-B, toilets 559 are installed on the utility wall 535. Bathroom vanities 557 arrive on site pre-assembled with the sink 571A and associated out-of-wall plumbing pre-installed and ready for immediate connection to the building's systems. The shower base 560 and floor drain 556 are integral parts of the bathroom floor pan 555 as shown in FIG. 26. Kitchen units 570 are pre-fabricated, pre-finished kitchen wall and base cabinets. These kitchen units 570 arrive at the site pre-drilled and trimmed for plumbing, electrical connections and vent ducting. Cabinets 573B have integral exhaust fans and light fixtures to be installed on the utility wall 535. Dishwasher and under-counter refrigerator are also delivered to be installed on the utility wall 535.

The next step of construction is installing parapet wall 730 for the roof as shown in FIGS. 38-39. In a preferred application, the installation of the parapet wall 730 and the roof membrane 750 occur simultaneously with the installation of the interior partitions 562, 565, 567. This is one of several options for a unitized prefabricated system of enclosing the roof of the building that could include panelized overhangs, shading devices, canopies, solar panels and/or fabric tent structures. Therefore, this example is not to be limiting in nature. The top tier of the exterior window walls 505, 605, 606 is the parapet wall 730. The exemplary parapet wall 730 is an 18" high wall that connects to the roof slab 650 and accommodates the building's roofing membrane flashing and garden roof conditions. Upon placement or installation of all of the building's typical exterior window walls 505, 605, 606 and/or exterior walls 510, the parapet walls 730 and associated parts arrive at the site in components of reasonable length to be immediately installed. The parapet wall 730 consists of 6 inch, 20 GA metal stud framing at 16" on center with an integrated, insulated panel 732 on one side only. The integrated, insulated panel 732 is preferably made of metal, however, other similar materials may be used. Alternative exterior finish materials include cementitious board, phenolic resin board, wood siding, gypsum reinforced fiber cement panels, precast concrete panels, and ceramic tile. The parapet wall 730 typically has integral flashing to prevent water penetrations between the parapet wall 730 and the top of the exterior window walls 505, 605, 606. Exemplary parapet walls 730 are approximately 10 feet long. As shown in FIG. 38, the parapet wall 730 is securely anchored on top of the roof slab 650 directly through the bottom track 737 to the roof slab 650 by drilling a fastener 735 or similar structure into the slab 650.

Upon installing and anchoring the parapet wall 730, exterior sheathing 740A is applied on the opposite side of the insulated panel 732 to the roof side of the parapet wall 730. As shown in FIG. 39, after applying the exterior sheathing layer 740A, the roof membrane 750 is applied on top of the parapet wall 730 over the block 731 and also over the sheathing layer 740A on the vertical side of the parapet wall 730. In FIGS. 39-40, a flashing cap member 745 is attached over the cap support member 746 on top of the parapet wall 730. The cap support member 746 is placed on top of the parapet wall 730 and the cap latch member is attached to the upper, roof side of the parapet wall 730. The cap support member 746 supports the top, horizontal part of the flashing cap member 745 while the cap latch member 747 catches the vertical part on the roof side of the flashing cap member 745. The top portion of the insulated panel 732 catches the vertical part on the exterior side of the flashing cap member 745 to tightly keep the flashing cap member 745 over the parapet wall 730.

The next step of construction is installing the roof. The majority of the building's roof is a flat membrane roof. In one of the exemplary applications, the roof area has a garden roof system. The garden roof system is a low-maintenance, green roof system which helps reduce the site storm water run-off flow rates. This garden roof system uses high quality recycled materials and improves air quality via the creation of oxygen and the reduction of dust. The cover provided by the planting 770 minimizes the impact from UV and varying temperatures on the surrounding environment and increases the life of the roof. Sloped roofing may be used in selective locations such as independent walkways, areas with stairs and elevator landings.

Translucent roof panels may be used at sloping roofs to allow as much natural light as possible to the areas below. Any run-off from the roof surfaces are collected and stored as gray water for irrigating the plants on the green roof and in-the-site landscape. In one of the exemplary applications, an Insulated Roof Membrane (IRMA) also called a Protected Roof Membrane (PMR) System may be installed after the parapet wall 730 is installed. A monolithic, thermoplastic roofing membrane 750 is placed directly on the concrete roof slab 650. This monolithic, thermoplastic roofing membrane 750 is a fully adhered, seamless, self-healing membrane that can be mopped onto the top of the roof slab 650. Upon applying the roofing membrane 750, the roof is covered with a fiberglass-reinforced protective layer or root barrier, and additionally covered with a layer of CFC-free, closed cell rigid insulation as an air barrier. The thickness of the insulation layers are determined by the local environment and governing thermal design values.

As shown in FIGS. 40-41, the rigid insulation layer 755 over the roofing membrane 750 is covered by a water retention mat 757 that provides drainage and aeration for the planting 770. The mat 757 also retains some of the run-off water and provides plant irrigation via capillary action. This mat 757 is further covered with soil filter fabric and then a minimum of 8 inches of lightweight engineered soil or growth media 760. The lightweight growth media 760 is further covered with a wind barrier planting fabric. The wind barrier planting fabric reduces soil erosion and dust while allowing the planting 770 to grow. The planting 770 is a shallow, pre-packaged, root drought-tolerant planting. If an irrigation system is to be installed, the irrigation system can be installed in conjunction with the placement of growth media 760. Plants used in the planting 770 are typically of shallow root and drought-tolerant variety. The planting 770 may be delivered to the site in pre-planted blankets or in pre-planted modular grids.

The next step of construction is assembling exterior walkways. The application of the exterior walkways are determined by the overall building configuration and the need for structural framing adjacent to the face of the building. In another embodiment wherein the building takes on a rectilinear or L-shape scenario, all sides have diagonal bracing. In FIG. 42, this scenario is illustrated whereby the building takes on a rectilinear or L-shape scenario. In these conditions, there is continuous horizontal beam 803 framing on all elevations. The horizontal beam 803 framing acts as drag struts for the braced frames and helps provide torsional restraint for the vertical columns 800 under jacking loads. For the rectilinear and L-shape scenarios, a column support member 815 or a bolt-on system may be used for all exterior walkways. The column support member 815 is bolted to the horizontal beam framing system. Alternatively, common walkways can be part of the unit floor slab 850 and utilize the same support system as the unit slabs 850. In these conditions, a thermal brake is cast into the slab 850 under a unit's exterior wall 810. The extension of the slab 850 helps reduce reinforcing requirements in the main portion of the slabs 850, and there is no horizontal beam 803 framing to interfere with lifting.

The steps described in FIGS. 19-42 describe the sequence of assembling a standard sized studio unit 300B, 300C or FIG. 6. Utilizing standard walls is easily modifiable in creating a unit with multiple bedrooms and bathrooms as described in the next steps for two and four bedroom units.

Two and Four Bedroom Units:

A typical two-bedroom unit is one and half times longer than a studio unit. Four-bedroom units are typically twice the size of a standard studio unit. There are also standard plans for two and three-bedroom corner units and efficiency units as shown in FIG. 6. Standard wall and partition components are available which accommodate the larger units. If the overall plans for the building include a mix of unit types, the following sequence of assembly is applicable for multiple bedroom units.

The first step of constructing multiple bedroom units is delivering and staging of demising walls 520 as described in FIGS. 19-25. As previously described in FIGS. 19-25 for standard application, the demising walls 520 are delivered to the site and staged in each unit for installation immediately after installation of the exterior window walls 505. As also described in FIG. 13, the demising wall 520 is installed after installation of the exterior window walls 505.

As previously described in FIGS. 13 and 15-18, the next step of constructing multiple bedroom units is installing the exterior window walls 505. The sequence for the delivery and installation of the exterior window walls 505 and components are described for the standard applications in FIGS. 15-18. Immediately after installing the exterior window walls 505, demising walls 520 are placed and installed as described in FIGS. 13-14 and 19-25.

The next step of constructing multiple bedroom units is placing end walls 515 for units as described in FIGS. 36 and 37. The longer two- and four-bedroom units utilize the same utility walls 535 as a standard studio unit. However, in order to accommodate the longer multi-bedroom unit, an additional exterior wall 510 is to be provided. The exterior walls 510 are composed and anchored in exactly the same manner as the end walls 515. The exterior walls 510 are to be provided in a different configuration than the end walls 515 and may have a window or door included. If the exterior wall 510 encloses a bedroom then the building code may require that a door or window be provided that is large enough to accommodate egress within the exterior wall 510. The exemplary exterior wall 510 is composed of 3⅝" metal stud framing with batt insulation, electrical, communications, and life safety wiring which are installed at the factory and connected at the site. The interior side of the exterior wall 510 receives a layer of 12 mm magnesium oxide, inner wall panel 657 with a finished panel 660 (finish to be determined from the several options available) that is attached over the inner wall panel 657. The exterior side of the exterior wall 510 receives a prefinished, insulated metal panel 661. The exterior wall 510 system utilizes a thermally insulated head anchor 612 with a prefinished trim 665. These anchors 612 are securely attached to the ceiling slabs 650 to hold the exterior walls 510 as shown in FIG. 36.

The exterior wall 510 is then suspended via a crane and moved into place from the exterior of the building. The exterior wall 510 is set onto the floor slab 650 and secured into place via access from the exterior face of the building. Simultaneously, the head portion of the exterior wall 510 is placed into the slip member 630 and secured in place. In order to secure the head portion of the exterior wall 510 to the head anchor 612, a fastener 621 is securely inserted horizontally through the vertical side of the anchor 612 and into the exterior wall 510. The head anchor 612 further has pre-punched slots to allow any screw or fastener attachment to occur between the anchor 612 and the inner wall panel 657 to accommodate vertical movement caused by slab 650 vibration. Removable, prefinished, metal head trim 665 is placed to conceal the top of the exterior wall 510 insulation and connections. Upon anchoring the exterior wall 510 into place, a final, insulated metal panel 661 and a painted sheet metal trim 682 are installed on the outer surface of the exterior wall 510. The final metal panel 661 conceals and insulates the edge 651 of the floor and ceiling slab 650. As shown in FIG. 37, a rod 683 and sealant are set at the joint between the two exterior metal panels 661 once the final panel 661 and trim 682 are in place.

The next step of construction is placing the utility wall 535 as previously described for the standard application in FIGS. 28-30. The next step of constructing multiple bedroom units is connecting utility components and installing fixtures. The sequence of the utility connections and placement of the plumbing fixtures are previously described for the standard application in FIGS. 10-13 and 30.

The next step of constructing multiple bedroom units is inserting a bathroom floor pan 555 with an integral drain 556 into a recess 595 within the floor slab 650 as standard application and previously described in FIGS. 26 and 27.

The next step of constructing multiple bedroom units is installing the entry door 525 and its associated parts. Installation of the entry door 525 is previously described for the standard application in FIGS. 34 and 35. The next step of constructing multiple bedroom units is installing interior partitions 562, 565, 567 for separating rooms or configuring rooms with different layouts as described in FIGS. 10-13, 17, 18 and 33. The next step of constructing multiple bedroom units is installing kitchen and bathroom components as previously described in FIGS. 10-13, 26, and 30.

The next step of constructing outer structures such as the parapet wall 730 for the roof, roof, and exterior or common walkways are the same as previously described in FIGS. 38-42.

It should be noted that relative terms are meant to help in the understanding of the structures and are not meant to limit the scope of the invention. Similarly, the term "head" is meant to be relative to the term "base," and the term "top" is meant to be relative to the term "bottom." It should also be noted that the term "right" is meant to be relative to the term "left," and the term "horizontal" is meant to be relative to the term "vertical." Furthermore, the present invention is described in terms of perpendicular and parallel in direction, the terms are not meant to be limiting. It should be further noted that although the present invention is described in terms of first and second walls, the terms are not meant to be limiting. It should be further noted that although the present invention is described using certain structures such as fasteners, however, any other types of means can be used to attach the walls.

The terms and expressions that have been employed in the foregoing specification are used as terms of description and not of limitation, and are not intended to exclude equivalents of the features shown and described. This application is intended to cover any adaptations or variations of the present invention. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention which, as a matter of language, might be said to fall therebetween.

What is claimed is:

1. A multi-story building, the multistory building comprising:
    at least two monolithic slabs, each slab spanning an entire story of the multi-story building;
    an exterior visible load-bearing steel structural frame located around the perimeter of the monolithic slabs, wherein the exterior visible load-bearing steel structural frame provides lateral outermost planar surfaces of the multi-story building that are offset and external to any outermost planar surfaces provided by premanufactured non-weight bearing walls, wherein the exterior visible load-bearing steel structural frame includes horizontal and vertical support members, wherein all of the horizontal and vertical support members are arranged around the perimeter of the monolithic slabs, and wherein each of the at least two monolithic slabs are supported by the vertical support members and a respective horizontal support member;
    premanufactured non-weight bearing walls, the non-weight bearing walls having a finished exterior and including at least one of electrical, insulating, plumbing or communications components;
    wherein each of the premanufactured non-weight bearing walls attach to two monolithic slabs; and
    wherein the monolithic slabs, the exterior visible load-bearing steel structural frame, and the premanufactured non-weight bearing walls are arranged to form units in the multi-story building.

2. The multi-story building of claim 1, wherein the units comprise standard single units or mixed units, the mixed units comprising at least one of studios, units having one bedroom, and units having multiple bedrooms.

3. The multi-story building of claim 1, wherein the non-weight bearing walls comprise at least one of:
    premanufactured, prefinished and preassembled exterior window walls comprising windows, insulation and weather seal;
    premanufactured, prefinished and preassembled end walls comprising electrical wiring, vapor barrier, insulation, studs for framing and sound barrier, and fire-rated interior surfaces;
    premanufactured, prefinished and preassembled exterior walls comprising electrical wiring, vapor barrier, insulation, studs for framing and sound harrier, and fire-rated interior surfaces;
    premanufactured, prefinished, preassembled and prewired demising walls comprising electrical wiring, insulation, studs for framing and sound barrier, and fire-rated interior and exterior surfaces; or
    premanufactured, prefinished, preassembled, prebundled and preplumbed utility walls comprising electrical and communications connections for adjacent walls, an electrical service panel, kitchen and bath wall plumbing, fans, vapor barrier, insulation, plumbing chase, studs for framing, and a sound and air barrier with a water resistant exterior surface.

4. The multi-story building of claim 1, further comprising interior components, and wherein the interior components comprise at least one of:
    a precast, preformed and prefabricated bathroom floor pan wherein a preformed recess of a monolithic slab receives the bathroom floor pan;
    a preassembled, prewired and prefinished entry door installed between at least two non-weight bearing walls and attached to the monolithic slabs at a top portion and a bottom portion of the entry door;
    a premanufactured, configurable, removable and adjustable interior partition installed on an interior side of the non-weight bearing wall of the unit; or
    a premanufactured, prefinished and preassembled kitchen and bathroom component installed on a utility wall of the unit.

5. The multi-story building of claim 4, wherein the precast, preformed and prefabricated bathroom floor pan further comprises a shower base and an integral drain.

6. The multi-story building of claim 4, wherein the preassembled, prewired and prefinished entry door comprises a door portion, an inner frame and an outer frame, preinstalled hardware with either a right-hand or left-hand door configuration, an operable relight panel, and electrical connections to be made with at least one non-weight bearing wall.

7. The multi-story building of claim 4, wherein the premanufactured, configurable, removable and adjustable interior partition further comprises preassembled attachment members and attaches to an interior side of at least one non-weight bearing wall and to the monolithic slabs.

8. The multi-story building of claim 4, wherein the kitchen and bathroom component comprises at least one of:
- a premanufactured, prefinished and preassembled kitchen unit with cabinets, countertops, preinstalled plumbing, plumbing connections, electrical wiring, vent ducting, and exhaust fans and light fixtures;
- a premanufactured, prefinished and preassembled bathroom vanity with at least one sink and preinstalled plumbing; or
- a premanufactured and preassembled cabinet with an integral exhaust fan and a light fixture;
- wherein the premanufactured, prefinished and preassembled kitchen unit, the bathroom vanity and the cabinet install on an inner side of a utility wall.

9. The multi-story building of claim 1, further including exterior components comprising a roof component and a prefabricated, prebundled exterior walkway with preassembled sections that support railing and decking.

10. The multi-story building of claim 9, wherein the roof component comprises a premanufactured, prefinished and preassembled parapet wall comprising studs for framing, an exterior surface with siding, and integral flashing to prevent water penetration, and wherein the roof component is installed on top of the building.

11. The multi-story building of claim 1, wherein the monolithic slabs form finished floors and ceilings of the units.

12. The multi-story building of claim 1, wherein the at least two monolithic slabs fully support their spans within the exterior visible load-bearing steel structural frame.

13. A multi-level building comprising:
- premanufactured non-weight bearing walls;
- multiple monolithic slabs, each slab spanning an entire level of the multi-level building; and
- an exterior visible load-bearing structural frame comprising vertical columns and horizontal beams located around the perimeter of the monolithic slabs, wherein the exterior visible load-bearing structural frame provides lateral outermost planar surfaces of the building that are offset and external to any outermost planar surfaces provided by premanufactured nonweight bearing walls;
- wherein a top surface of a first monolithic slab forms a floor of at least an upper unit of the multi-level building, and a bottom surface of the first monolithic slab forms a ceiling of at least a lower unit of the multi-level building, wherein the upper and lower units are further defined in part by respective ones of the premanufactured non-weight bearing walls.

14. The multi-level building of claim 13, wherein the monolithic slabs are mounted directly to the exterior visible primary load-bearing structural frame to create multiple building levels.

15. The multi-level building of claim 14, wherein at least one of the monolithic slabs spans the entire interior surface area defined by the exterior visible primary load-bearing structural frame free of additional interior load-bearing structural framing.

16. The multi-level building of claim 14, wherein the monolithic slabs are mounted directly to only vertical columns of the exterior visible primary load-bearing structural frame.

17. The multi-level building of claim 16, wherein a space exists between an edge of the monolithic slabs and the horizontal beams of the exterior visible primary load-bearing structural frame.

18. The multi-level building of claim 17, further comprising premanufactured exterior window walls that cover and seal the monolithic slab edges.

19. The multi-level building of claim 14, wherein the monolithic slabs include anchor blocks within the monolithic slabs.

20. The multi-level building of claim 14, wherein the monolithic slabs include steel channels as an edge form.

21. The multi-level building of claim 13, wherein the premanufactured non-weight bearing walls attach to both the floor and the ceiling formed by the multiple monolithic slabs.

22. The multi-level building of claim 13, wherein each premanufactured non-weight bearing wall attaches to at least one other non-weight bearing wall and to both the floor and the ceiling formed by the multiple monolithic slabs.

23. The multi-level building of claim 13, wherein the monolithic slabs are supported by the vertical columns and at least a respective horizontal beam.

24. The multi-level building of claim 13, wherein the multiple monolithic slabs support their spans within the exterior visible load-bearing structural frame.

\* \* \* \* \*

UNITED STATES PATENT AND TRADEMARK OFFICE
CERTIFICATE OF CORRECTION

| | | |
|---|---|---|
| PATENT NO. | : 8,950,132 B2 | Page 1 of 3 |
| APPLICATION NO. | : 12/796603 | |
| DATED | : February 10, 2015 | |
| INVENTOR(S) | : Collins et al. | |

It is certified that error appears in the above-identified patent and that said Letters Patent is hereby corrected as shown below:

In the Drawings:

In Fig. 5, Replace the Figure with the attached Replacement sheet.

In the Specification:

In Column 4, Line 10, delete "FIG." and insert -- FIG. 1. --, therefor.

In Column 4, Line 43, delete "FIG." and insert -- FIGS. --, therefor.

In Column 4, Line 59, delete "FIG." and insert -- FIGS. --, therefor.

In Column 5, Line 25, delete "illustrates" and insert -- illustrate --, therefor.

In Column 10, Line 17, delete "slabs 110" and insert -- slabs 450 --, therefor.

In Column 16, Line 18, delete "FIG." and insert -- FIGS. --, therefor.

In Column 16, Line 29, delete "505D," and insert -- 505C, 505D, --, therefor.

In Column 18, Line 1, delete "vaneer," and insert -- veneer, --, therefor.

In Column 18, Line 13, delete "612E" and insert -- 612B --, therefor.

In Column 19, Line 25, delete "vaneer," and insert -- veneer, --, therefor.

In Column 19, Line 58, delete "FIG." and insert -- FIGS. --, therefor.

In Column 20, Line 62, delete "walls 525" and insert -- walls 505 --, therefor.

In Column 20, Line 67, delete "wall 525" and insert -- wall 505 --, therefor.

Signed and Sealed this
Eleventh Day of August, 2015

Michelle K. Lee
*Director of the United States Patent and Trademark Office*

CERTIFICATE OF CORRECTION (continued)
U.S. Pat. No. 8,950,132 B2

In Column 22, Line 13, delete "FIG." and insert -- FIGS. --, therefor.

In Column 22, Line 15, delete "figure.)" and insert -- figure) --, therefor.

In Column 25, Line 57, delete "figure.)" and insert -- figure) --, therefor.

In Column 26, Line 52, delete "slab 560" and insert -- slab 650 --, therefor.

In Column 26, Line 67, delete "figure.)." and insert -- figure). --, therefor.

In Column 28, Line 1, delete "panels" and insert -- panels, --, therefor.

In the Claims:

In Column 32, Line 25, in Claim 3, delete "harrier," and insert -- barrier, --, therefor.